United States Patent
Schindler et al.

(10) Patent No.: US 11,668,828 B2
(45) Date of Patent: *Jun. 6, 2023

(54) DETECTOR FOR DETERMINING A POSITION OF AT LEAST ONE OBJECT

(71) Applicant: trinamiX GmbH, Ludwigshafen am Rhein (DE)

(72) Inventors: Patrick Schindler, Ludwigshafen (DE); Peter Schillen, Ludwigshafen (DE); Michael Eberspach, Ludwigshafen (DE); Christian Lennartz, Ludwigshafen (DE); Robert Send, Ludwigshafen (DE); Ingmar Bruder, Ludwigshafen (DE); Heiko Hengen, Kandel (DE); Lars Diesselberg, Kandel (DE)

(73) Assignee: TRINAMIX GMBH, Ludwigshafen am Rhein (DE)

( * ) Notice: Subject to any disclaimer, the term of this patent is extended or adjusted under 35 U.S.C. 154(b) by 581 days.

This patent is subject to a terminal disclaimer.

(21) Appl. No.: 16/636,148

(22) PCT Filed: Aug. 28, 2018

(86) PCT No.: PCT/EP2018/073067
§ 371 (c)(1),
(2) Date: Feb. 3, 2020

(87) PCT Pub. No.: WO2019/042956
PCT Pub. Date: Mar. 7, 2019

(65) Prior Publication Data
US 2020/0371237 A1    Nov. 26, 2020

(30) Foreign Application Priority Data

Aug. 28, 2017  (EP) ................................. 17188161
Nov. 17, 2017  (EP) ................................. 17202202

(51) Int. Cl.
*G01C 3/08*      (2006.01)
*G01S 17/48*    (2006.01)
(Continued)

(52) U.S. Cl.
CPC .............. *G01S 17/48* (2013.01); *G01S 7/4802* (2013.01); *G02B 6/425* (2013.01)

(58) Field of Classification Search
None
See application file for complete search history.

(56) References Cited

U.S. PATENT DOCUMENTS 4,023,033 A    5/1977   Bricot et al.
4,469,945 A    9/1984   Hoeberechts et al.
(Continued)

FOREIGN PATENT DOCUMENTS

CA    2119330       9/1995
DE    25 01 124    8/1975
(Continued)

OTHER PUBLICATIONS

Petr Bartu et al, "Conformable Large-AreaPposition-Sensitive Photodetectors Based on Luminescence-Collecting Silicone Waveguides." *Journal of Applied Physics*, 107, 123101 (2010).
(Continued)

*Primary Examiner* — Mark Hellner
(74) *Attorney, Agent, or Firm* — Armstrong Teasdale LLP

(57) ABSTRACT

A detector for determining a position of at least one object is provided. The detector includes an evaluation device adapted to select at least one reflection feature of a reflection image, wherein the evaluation device is configured for determining at least one longitudinal region of the selected reflection feature of the reflection image by evaluating a combined signal Q from the sensor signals, wherein the evaluation device is adapted to determine at least one
(Continued)

displacement region in at least one reference image corresponding to the longitudinal region, wherein the evaluation device is adapted to match the selected reflection feature with at least one reference feature within the displacement region.

25 Claims, 6 Drawing Sheets

(51) Int. Cl.
*G01S 7/48* (2006.01)
*G02B 6/42* (2006.01)

(56) References Cited

U.S. PATENT DOCUMENTS

| | | | |
|---|---|---|---|
| 4,653,905 A | 3/1987 | Farrar et al. | |
| 4,675,517 A | 6/1987 | Shiomi | |
| 4,767,211 A | 8/1988 | Munakata et al. | |
| 5,235,377 A | 8/1993 | Ide et al. | |
| 5,323,222 A | 6/1994 | Kunishige | |
| 5,512,997 A | 4/1996 | Ogawa | |
| 6,118,119 A | 9/2000 | Ruschin | |
| 6,507,392 B1 | 1/2003 | Richards et al. | |
| 6,995,445 B2 | 2/2006 | Forrest et al. | |
| 7,855,778 B2 | 12/2010 | Yung et al. | |
| 9,741,954 B2 | 8/2017 | Bruder et al. | |
| 9,919,999 B2 | 3/2018 | Koenemann et al. | |
| 10,094,927 B2 | 10/2018 | Send et al. | |
| 10,290,817 B2 | 5/2019 | Battagliarin et al. | |
| 10,412,283 B2 | 9/2019 | Send et al. | |
| 11,143,736 B2 * | 10/2021 | Schindler | G01S 7/4817 |
| 2002/0075471 A1 | 6/2002 | Holec | |
| 2006/0044546 A1 | 3/2006 | Lewin et al. | |
| 2007/0176165 A1 | 8/2007 | Forrest et al. | |
| 2008/0013005 A1 | 1/2008 | Deane | |
| 2008/0106746 A1 | 5/2008 | Shpunt et al. | |
| 2008/0118143 A1 * | 5/2008 | Gordon | G06V 10/145 382/154 |
| 2008/0130005 A1 | 6/2008 | Waslowski et al. | |
| 2008/0240502 A1 | 10/2008 | Freedman et al. | |
| 2009/0066929 A1 | 3/2009 | Tropf | |
| 2010/0118123 A1 | 5/2010 | Freedman et al. | |
| 2010/0282309 A1 | 11/2010 | Pschirer et al. | |
| 2011/0248151 A1 | 10/2011 | Holcombe et al. | |
| 2015/0286340 A1 | 10/2015 | Send et al. | |
| 2016/0084650 A1 | 3/2016 | Hsu et al. | |
| 2016/0124074 A1 * | 5/2016 | Wonneberger | G01C 3/32 356/4.01 |
| 2016/0127664 A1 | 5/2016 | Bruder et al. | |
| 2016/0140786 A1 | 5/2016 | Wang et al. | |
| 2016/0377417 A1 | 12/2016 | Jovanovski et al. | |
| 2017/0039793 A1 | 2/2017 | Send et al. | |
| 2017/0074652 A1 | 3/2017 | Send et al. | |
| 2017/0082486 A1 | 3/2017 | Send et al. | |
| 2017/0123593 A1 | 5/2017 | Send et al. | |
| 2017/0205230 A1 | 7/2017 | Send et al. | |
| 2017/0237926 A1 | 8/2017 | Bruder et al. | |
| 2017/0250334 A1 | 8/2017 | Hermes et al. | |
| 2017/0263868 A1 | 9/2017 | Tanabe et al. | |
| 2017/0266554 A1* | 9/2017 | Marks | A63F 13/352 |
| 2017/0309828 A1 | 10/2017 | Tanabe et al. | |
| 2017/0363465 A1 | 12/2017 | Send et al. | |
| 2017/0363741 A1 | 12/2017 | Send et al. | |
| 2018/0003993 A1 | 1/2018 | Send et al. | |
| 2018/0007343 A1 | 1/2018 | Send et al. | |
| 2018/0017679 A1 | 1/2018 | Valouch et al. | |
| 2018/0031672 A1 | 2/2018 | Bruder et al. | |
| 2018/0044357 A1 | 2/2018 | Spielmann et al. | |
| 2018/0067213 A1 | 3/2018 | Send et al. | |
| 2018/0136319 A1 | 5/2018 | Send et al. | |
| 2018/0182980 A1 | 6/2018 | Lennartz et al. | |
| 2018/0210064 A1 | 7/2018 | Send et al. | |
| 2018/0231376 A1 | 8/2018 | Send et al. | |
| 2018/0276843 A1 | 9/2018 | Send et al. | |
| 2018/0329024 A1 | 11/2018 | Send et al. | |
| 2018/0356501 A1 | 12/2018 | Send et al. | |
| 2019/0129035 A1 | 5/2019 | Valouch et al. | |
| 2019/0129036 A1 | 5/2019 | Valouch et al. | |
| 2019/0140129 A1 | 5/2019 | Valouch et al. | |
| 2019/0157470 A1 | 5/2019 | Send et al. | |
| 2019/0170849 A1 | 6/2019 | Hermes et al. | |
| 2019/0172964 A1 | 6/2019 | Hermes et al. | |
| 2019/0198206 A1 | 6/2019 | Ter Maat et al. | |
| 2019/0277703 A1 | 9/2019 | Valouch et al. | |
| 2019/0339356 A1 | 11/2019 | Schildknecht et al. | |
| 2019/0353767 A1 | 11/2019 | Eberspach et al. | |
| 2020/0011995 A1 | 1/2020 | Send et al. | |

FOREIGN PATENT DOCUMENTS

| | | | |
|---|---|---|---|
| DE | 32 03 613 | 8/1982 | |
| DE | 32 25 372 | 2/1983 | |
| DE | 42 11 875 | 10/1993 | |
| EP | 2 781 931 | 9/2014 | |
| EP | 15 153 215 | 1/2015 | |
| EP | 15 157 363 | 3/2015 | |
| EP | 15 164 653 | 4/2015 | |
| EP | 15 177 275 | 7/2015 | |
| EP | 15 180 353 | 8/2015 | |
| EP | 15 180 354 | 8/2015 | |
| EP | 15 185 005 | 9/2015 | |
| EP | 15 191 960 | 10/2015 | |
| EP | 15 196 238 | 11/2015 | |
| EP | 15 196 239 | 11/2015 | |
| EP | 15 197 744 | 12/2015 | |
| EP | 15 155 835 | 2/2016 | |
| EP | 16 155 834 | 2/2016 | |
| EP | 16 155 845 | 2/2016 | |
| EP | 3 045 935 | 7/2016 | |
| JP | H0989553 A | 4/1997 | |
| JP | 2002244027 A | 8/2002 | |
| JP | 2018526636 A | 9/2018 | |
| WO | WO 2009/013282 A1 | 1/2009 | |
| WO | WO 2010-063521 | 6/2010 | |
| WO | WO 2012/110924 | 8/2012 | |
| WO | WO 2014/097181 | 6/2014 | |
| WO | WO 2012/168395 | 12/2014 | |
| WO | WO 2014/198625 | 12/2014 | |
| WO | WO 2014/198626 | 12/2014 | |
| WO | WO 2014/198629 A1 | 12/2014 | |
| WO | WO 2014198629 A1 * | 12/2014 | G01S 17/46 |
| WO | WO 2015/024871 A1 | 2/2015 | |
| WO | WO 2015/150203 | 10/2015 | |
| WO | WO 2015/150324 | 10/2015 | |
| WO | WO 2015/150989 | 10/2015 | |
| WO | WO 2015/159192 | 10/2015 | |
| WO | WO 2015/161989 | 10/2015 | |
| WO | WO 2015/176981 | 11/2015 | |
| WO | WO 2016/012274 | 1/2016 | |
| WO | WO 2016/046034 | 3/2016 | |
| WO | WO 2016/046350 | 3/2016 | |
| WO | 2016/051323 A1 | 4/2016 | |
| WO | WO 2016/066494 | 5/2016 | |
| WO | 2016/092449 A1 | 6/2016 | |
| WO | WO 2016/120392 | 8/2016 | |
| WO | WO 2016/146725 | 9/2016 | |
| WO | WO 2017025567 A1 * | 2/2017 | G01C 3/08 |
| WO | WO 2017/089553 | 6/2017 | |
| WO | WO 2017/144401 | 8/2017 | |
| WO | WO 2018/077868 | 5/2018 | |
| WO | WO 2018/091640 | 5/2018 | |
| WO | WO 2018/096083 | 5/2018 | |
| WO | WO 2018/115073 | 6/2018 | |
| WO | WO 2018/146138 | 8/2018 | |
| WO | WO 2018/146146 | 8/2018 | |
| WO | WO 2018/167215 | 9/2018 | |
| WO | WO 2018/193045 | 10/2018 | |
| WO | WO 2019/002199 | 1/2019 | |
| WO | WO 2019/011803 | 1/2019 | |
| WO | WO 2019/038354 | 2/2019 | |
| WO | WO 2019/042956 | 3/2019 | |
| WO | WO 2019/042959 | 3/2019 | |

(56) References Cited

FOREIGN PATENT DOCUMENTS

| WO | WO 2019/072965 | 4/2019 |
|----|----------------|--------|
| WO | WO 2019/096986 | 5/2019 |
| WO | WO 2019/115594 | 6/2019 |
| WO | WO 2019/115595 | 6/2019 |
| WO | WO 2019/115596 | 6/2019 |

OTHER PUBLICATIONS

Street (Ed.): Technology and Applications of Amorphous Silicon, Springer-Verlag Heidelberg, 2010, pp. 346-349.

Kurt Konolige et al., "A Low-Cost Laser Distance Sensor", *2008 IEEE International Conference on Robotics and Automation*, Pasadena, CA, May 19-23, 2008.

X. Jiang et al., Dreidimensionales Computersehen, Chapter 2, Springer, Berlin Heidelberg (1997).

U.S. Appl. No. 15/514,830, filed Mar. 28, 2017, U.S. Pat. No. 10,094,927, Send, et al.

U.S. Appl. No. 15/547,664, filed Jul. 31, 2017, US 2018-0017679, Valouch, et al.

U.S. Appl. No. 15/758,135, filed Mar. 7, 2018, U.S. Pat. No. 10,412,283, Send, et al.

U.S. Appl. No. 15/775,424, filed May 11, 2018, US 2018-0329024, Send, et al.

U.S. Appl. No. 15/778,454, filed May 23, 2018, US 2018-0356501, Send, et al.

U.S. Appl. No. 16/090,990, filed Oct. 3, 2018, US 2019-0140129, Valouch, et al.

U.S. Appl. No. 16/091,409, filed Oct. 4, 2018, US 2019-0157470, Send, et al.

U.S. Appl. No. 16/094,402, filed Oct. 17, 2018, US 2019-0129036, Valouch, et al.

U.S. Appl. No. 16/095,846, filed Oct. 23, 2018, Valouch, et al.

U.S. Appl. No. 16/096,361, filed Oct. 25, 2018, US 2019-0129035, Valouch, et al.

U.S. Appl. No. 16/321,143, filed Jan. 28, 2019, US 2019-0172964, Hermes, et al.

U.S. Appl. No. 16/321,054, filed Jan. 28, 2019, US 2019-0170849, Hermes, et al.

U.S. Appl. No. 16/344,538, filed Apr. 24, 2019, US 2019-0277703, Valouch, et al.

U.S. Appl. No. 16/347,364, filed May 3, 2019, Eberspach, et al.

U.S. Appl. No. 16/344,511, filed Apr. 24, 2019, US 2020-0049800, Valouch, et al.

U.S. Appl. No. 16/461,654, filed May 16, 2019, US 2019-0339356, Schildknecht, et al.

U.S. Appl. No. 16/461,670, filed May 16, 2019, US 2019-0353767, Eberspach, et al.

U.S. Appl. No. 16/484,369, filed Aug. 7, 2019, US 2020-0003899, Lungenschmied, et al.

U.S. Appl. No. 16/478,907, filed Jul. 18, 2019, Valouch, et al.

U.S. Appl. No. 16/483,231, filed Aug. 2, 2019, US 2020-0011995, Send, et al.

U.S. Appl. No. 16/500,113, filed Oct. 2, 2019, Altenbeck, et al.

U.S. Appl. No. 16/623,557, filed Dec. 17, 2019, Lungenschmied, et al.

U.S. Appl. No. 16/638,946, filed Feb. 13, 2020, Schindler, et al.

U.S. Appl. No. 16/639,387, filed Feb. 14, 2020, Valouch, et al.

\* cited by examiner

DETECTOR FOR DETERMINING A POSITION OF AT LEAST ONE OBJECT

FIELD OF THE INVENTION

The invention relates to a detector and a method for determining a position of at least one object. The invention further relates to a human-machine interface for exchanging at least one item of information between a user and a machine, an entertainment device, a tracking system, a camera, a scanning system and various uses of the detector device. The devices, methods and uses according to the present invention specifically may be employed for example in various areas of daily life, gaming, traffic technology, production technology, security technology, photography such as digital photography or video photography for arts, documentation or technical purposes, medical technology or in the sciences. Further, the invention specifically may be used for scanning one or more objects and/or for scanning a scenery, such as for generating a depth profile of an object or of a scenery, e.g. in the field of architecture, metrology, archaeology, arts, medicine, engineering or manufacturing. However, other applications are also possible.

PRIOR ART

Optical 3D sensing methods generally may determine unreliable results in case of environment causing multiple reflections, with biasing light sources, or reflective measurement objects. Furthermore, 3D sensing methods, such as triangulation methods using structured light or stereo cameras, with imaging capabilities often suffer from a high demand of computational power to solve correspondence problems. Necessary computational power may result in high costs for processors or Field Programmable Gate Arrays (FPGAs), for heat removal in view of ventilation requirements or water proof housing difficulties, for electrical power consumption, in particular in mobile devices, and, in addition, in measurement uncertainties. The high demand in computational power may be prohibitive to realize real-time applications, high frame rates or even standards video speed frame rates of 25 frames per second.

A large number of optical devices are known from the prior art using triangulation imaging methods. For example, structured light methods or stereo methods are known. For example, passive stereo methods using two cameras in a fixed relative orientation or active stereo technologies, where an additional light projector is used. Another example is the structures light approach, where one light projector and one camera in a fixed relative orientation are used. In order to determine a depth image via triangulation, the correspondence problem has to be solved first. Therefore, in passive stereo camera techniques enough corresponding feature points have to be identified in both camera views. In structured light approaches correspondences between pre-stored and projected pseudo random light patterns have to be determined. For a robust solution of these correspondence problems computational imaging algorithms such as algorithms scaling approximately quadratically with the number of points in the projected point pattern have to be employed. In structured light methods, for example, using a stereo system comprising two detectors having a fixed relative distance, a light source projects a pattern such as points, pseudo-random, random, non-periodic or irregular point patterns, or the like. Each of the detectors generates an image of a reflection pattern and an image analysis task is to identify corresponding features in the two images. Due to fixed relative position a corresponding feature point selected in one of the two images lies along an epipolar line in the other image. However, solving the so-called correspondence problem may be difficult. In stereo and triangulation systems, the distance of all feature points along the epipolar line have to have reasonable correspondence among each other. A correspondence decision cannot be made one after another. If one correspondence is wrong, this has implications for other feature points, such as invisibility. This usually yields quadratic scaling evaluation algorithms.

For example, US 2008/0240502 A1 and US 2010/0118123 A1 describe an apparatus for mapping an object including an illumination assembly, which includes a single transparency containing a fixed pattern of spots. A light source transilluminates the single transparency with optical radiation so as to project the pattern onto the object. An image capture assembly captures an image of the pattern that is projected onto the object using the single transparency. A processor processes the image captured by the image capture assembly as to reconstruct a three-dimensional map of the object.

US 2008/118143 A1 describes a method and apparatus for obtaining an image to determine a three dimensional shape of a stationary or moving object using a bi dimensional coded light pattern having a plurality of distinct identifiable feature types. The coded light pattern is projected on the object such that each of the identifiable feature types appears at most once on predefined sections of distinguishable epipolar lines. An image of the object is captured and the reflected feature types are extracted along with their location on known epipolar lines in the captured image. Displacements of the reflected feature types along their epipolar lines from reference coordinates thereupon determine corresponding three dimensional coordinates in space and thus a 3D mapping or model of the shape of the object at any point in time.

US 2009/066929 A1 describes establishing of the correspondence of the points for creation of a range image with stereo cameras. The scene is illuminated twice; thereof at least once with a random or pseudo random pattern. For both cameras, an image is taken for each of the illuminations and the quotient of brightnesses is calculated pixelwise. The correspondence is established on the basis of a comparison of the quotient of pixels on epipolar lines of different cameras. The illumination pattern is preferably highly modulated along the epipolar line; transversally or diagonally to it, it is not or only slightly modulated. For illumination, a projection unit is used which in a preferred arrangement comprises two superposed grating patterns which have a distance to each other, with at least one varying in a pseudo random manner, and with two closely neighboring light sources which shine through the gratings and thereby generate different pseudo random patterns, especially moiré patterns.

Despite the advantages implied by the above-mentioned devices and detectors, several technical challenges remain. Thus, the evaluation algorithms used require high computation power which is a severe cost driver. Furthermore, due to energy consumption and heat production of the required computational resources, the computational demand limits use of such 3D sensor methods in outdoor and mobile applications.

Problem Addressed by the Invention

It is therefore an object of the present invention to provide devices and methods facing the above-mentioned technical challenges of known devices and methods. Specifically, it is an object of the present invention to provide devices and methods which reliably may determine a position of an object in space, preferably with a low technical effort and with low requirements in terms of technical resources and cost.

SUMMARY OF THE INVENTION

This problem is solved by the invention with the features of the independent patent claims. Advantageous developments of the invention, which can be realized individually or in combination, are presented in the dependent claims and/or in the following specification and detailed embodiments.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such a way with other optional or non-optional features of the invention.

In a first aspect of the present invention a detector for determining a position of at least one object is disclosed. As used herein, the term "object" refers to a point or region emitting at least one light beam. The light beam may originate from the object, such as by the object and/or at least one illumination source integrated or attached to the object emitting the light beam, or may originate from a different illumination source, such as from an illumination source directly or indirectly illuminating the object, wherein the light beam is reflected or scattered by the object. As used herein, the term "position" refers to at least one item of information regarding a location and/or orientation of the object and/or at least one part of the object in space. Thus, the at least one item of information may imply at least one distance between at least one point of the object and the at least one detector. As will be outlined in further detail below, the distance may be a longitudinal coordinate or may contribute to determining a longitudinal coordinate of the point of the object. Additionally or alternatively, one or more other items of information regarding the location and/or orientation of the object and/or at least one part of the object may be determined. As an example, additionally, at least one transversal coordinate of the object and/or at least one part of the object may be determined. Thus, the position of the object may imply at least one longitudinal coordinate of the object and/or at least one part of the object. Additionally or alternatively, the position of the object may imply at least one transversal coordinate of the object and/or at least one part of the object. Additionally or alternatively, the position of the object may imply at least one orientation information of the object, indicating an orientation of the object in space.

The detector comprises:
at least one sensor element having a matrix of optical sensors, the optical sensors each having a light-sensitive area, wherein each optical sensor is designed to generate at least one sensor signal in response to an illumination of its respective light-sensitive area by a reflection light beam propagating from the object to the detector, wherein the sensor element is adapted to determine at least one reflection image;
at least one evaluation device, wherein the evaluation device is adapted to select at least one reflection feature of the reflection image, wherein the evaluation device is configured for determining at least one longitudinal region of the selected reflection feature of the reflection image by evaluating a combined signal Q from the sensor signals, wherein the evaluation device is adapted to determine at least one displacement region in at least one reference image corresponding to the longitudinal region, wherein the evaluation device is adapted to match the selected reflection feature with at least one reference feature within the displacement region.

As used herein, the term "sensor element" generally refers to a device or a combination of a plurality of devices configured for sensing at least one parameter. In the present case, the parameter specifically may be an optical parameter, and the sensor element specifically may be an optical sensor element. The sensor element may be formed as a unitary, single device or as a combination of several devices. As further used herein, the term "matrix" generally refers to an arrangement of a plurality of elements in a predetermined geometrical order. The matrix, as will be outlined in further detail below, specifically may be or may comprise a rectangular matrix having one or more rows and one or more columns. The rows and columns specifically may be arranged in a rectangular fashion. It shall be outlined, however, that other arrangements are feasible, such as nonrectangular arrangements. As an example, circular arrangements are also feasible, wherein the elements are arranged in concentric circles or ellipses about a center point. For example, the matrix may be a single row of pixels. Other arrangements are feasible.

The optical sensors of the matrix specifically may be equal in one or more of size, sensitivity and other optical, electrical and mechanical properties. The light-sensitive areas of all optical sensors of the matrix specifically may be located in a common plane, the common plane preferably facing the object, such that a light beam propagating from the object to the detector may generate a light spot on the common plane.

As used herein, an "optical sensor" generally refers to a light-sensitive device for detecting a light beam, such as for detecting an illumination and/or a light spot generated by at least one light beam. As further used herein, a "light-sensitive area" generally refers to an area of the optical sensor which may be illuminated externally, by the at least one light beam, in response to which illumination the at least one sensor signal is generated. The light-sensitive area may specifically be located on a surface of the respective optical sensor. Other embodiments, however, are feasible. As used herein, the term "the optical sensors each having at least one light sensitive area" refers to configurations with a plurality of single optical sensors each having one light sensitive area and to configurations with one combined optical sensor having a plurality of light sensitive areas. Thus, the term "optical sensor" furthermore refers to a light-sensitive device configured to generate one output signal, whereas, herein, a light-sensitive device configured to generate two or more output signals, for example at least one CCD and/or CMOS device, is referred to as two or more optical sensors. As will further be outlined in detail below, each optical sensor may be embodied such that precisely one light-sensitive area is present in the respective optical sensor, such as by providing precisely one light-sensitive area which may be illuminated, in response to which illumination precisely one uniform sensor signal is created for the whole optical sensor. Thus, each optical sensor may be a single area optical sensor. The use of the single area optical sensors, however, renders the setup of the detector specifically simple and efficient. Thus, as an example, commercially available photo-sensors, such as commercially available silicon photodiodes, each having precisely one sensitive area, may be used in the set-up. Other embodiments, however, are feasible. Thus, as an example, an optical device comprising two, three, four or more than four light-sensitive areas may be used which is regarded as two, three, four or more than four optical sensors in the context of the present invention. As outlined above, the sensor element comprises a matrix of optical sensors. Thus, as an example, the optical sensors may be part of or constitute a pixelated optical device. As an example, the optical sensors may be part of or constitute at least one CCD and/or CMOS device having a matrix of pixels, each pixel forming a light-sensitive area.

As outlined above, the optical sensors specifically may be or may comprise photodetectors, preferably inorganic photodetectors, more preferably inorganic semiconductor photodetectors, most preferably silicon photodetectors. Specifically, the optical sensors may be sensitive in the infrared spectral range. All of the optical sensors of the matrix or at least a group of the optical sensors of the matrix specifically may be identical. Groups of identical optical sensors of the matrix specifically may be provided for different spectral ranges, or all optical sensors may be identical in terms of spectral sensitivity. Further, the optical sensors may be identical in size and/or with regard to their electronic or optoelectronic properties.

Specifically, the optical sensors may be or may comprise inorganic photodiodes which are sensitive in the infrared spectral range, preferably in the range of 780 nm to 3.0 micrometers. Specifically, the optical sensors may be sensitive in the part of the near infrared region where silicon photodiodes are applicable specifically in the range of 700 nm to 1000 nm. Infrared optical sensors which may be used for optical sensors may be commercially available infrared optical sensors, such as infrared optical sensors commercially available from Hamamatsu Photonics Deutschland GmbH, D-82211 Herrsching am Ammersee, Germany.

Thus, as an example, the optical sensors may comprise at least one optical sensor of an intrinsic photovoltaic type, more preferably at least one semiconductor photodiode selected from the group consisting of: a Ge photodiode, an InGaAs photodiode, an extended InGaAs photodiode, an InAs photodiode, an InSb photodiode, a HgCdTe photodiode. Additionally or alternatively, the optical sensors may comprise at least one optical sensor of an extrinsic photovoltaic type, more preferably at least one semiconductor photodiode selected from the group consisting of: a Ge:Au photodiode, a Ge:Hg photodiode, a Ge:Cu photodiode, a Ge:Zn photodiode, a Si:Ga photodiode, a Si:As photodiode. Additionally or alternatively, the optical sensors may comprise at least one bolometer, preferably a bolometer selected from the group consisting of a VO bolometer and an amorphous Si bolometer.

The matrix may be composed of independent optical sensors. Thus, a matrix of inorganic photodiodes may be composed. Alternatively, however, a commercially available matrix may be used, such as one or more of a CCD detector, such as a CCD detector chip, and/or a CMOS detector, such as a CMOS detector chip.

Thus, generally, the optical sensors of the detector may form a sensor array or may be part of a sensor array, such as the above-mentioned matrix. Thus, as an example, the detector may comprise an array of optical sensors, such as a rectangular array, having m rows and n columns, with m, n, independently, being positive integers. Preferably, more than one column and more than one row is given, i.e. n>1, m>1. Thus, as an example, n may be 2 to 16 or higher and m may be 2 to 16 or higher. Preferably, the ratio of the number of rows and the number of columns is close to 1. As an example, n and m may be selected such that $0.3 \leq m/n \leq 3$, such as by choosing m/n=1:1, 4:3, 16:9 or similar. As an example, the array may be a square array, having an equal number of rows and columns, such as by choosing m=2, n=2 or m=3, n=3 or the like.

The matrix specifically may be a rectangular matrix having at least one row, preferably a plurality of rows, and a plurality of columns. As an example, the rows and columns may be oriented essentially perpendicular, wherein, with respect to the term "essentially perpendicular", reference may be made to the definition given above. Thus, as an example, tolerances of less than 20°, specifically less than 10° or even less than 5°, may be acceptable. In order to provide a wide range of view, the matrix specifically may have at least 10 rows, preferably at least 50 rows, more preferably at least 100 rows. Similarly, the matrix may have at least 10 columns, preferably at least 50 columns, more preferably at least 100 columns. The matrix may comprise at least 50 optical sensors, preferably at least 100 optical sensors, more preferably at least 500 optical sensors. The matrix may comprise a number of pixels in a multi-mega pixel range. Other embodiments, however, are feasible. Thus, in setups in which an axial rotational symmetry is to be expected, circular arrangements or concentric arrangements of the optical sensors of the matrix, which may also be referred to as pixels, may be preferred.

Preferably, the sensor element may be oriented essentially perpendicular to an optical axis of the detector. Again, with respect to the term "essentially perpendicular", reference may be made to the definition and the tolerances given above. The optical axis may be a straight optical axis or may be bent or even split, such as by using one or more deflection elements and/or by using one or more beam splitters, wherein the essentially perpendicular orientation, in the latter cases, may refer to the local optical axis in the respective branch or beam path of the optical setup.

The reflection light beam may propagate from the object towards the detector. As will be outlined in further detail below, the reflection light beam may originate from the object or may originate from an illumination source, such as from an illumination source directly or indirectly illuminating the object, wherein the light beam is reflected or scattered by the object and, thereby, is at least partially directed towards the detector. The detector may be used in active and/or passive illumination scenarios. For example, the at least one illumination source may be adapted to illuminate the object, for example, by directing a light beam towards the object, which reflects the light beam. The illumination source may be or may comprise at least one multiple beam light source. For example, the illumination source may comprise at least one laser source and one or more diffractive optical elements (DOEs). Additionally or alternatively, the detector may use radiation already present in the scene such as from at least one ambient light source.

The reflection light beam specifically may fully illuminate the at least one optical sensor from which the center signal is generated, such that the at least one optical sensor from which the center signal arises is fully located within the light beam, with a width of the light beam being larger than the light-sensitive area of the at least one optical sensor from which the sensor signal arises. Contrarily, preferably, the reflection light beam specifically may create a light spot on the entire matrix which is smaller than the matrix, such that the light spot is fully located within the matrix. This situation may easily be adjusted by a person skilled in the art of optics by choosing one or more appropriate lenses or elements having a focusing or defocusing effect on the light beam, such as by using an appropriate transfer device as will be outlined in further detail below. As further used herein, a "light spot" generally refers to a visible or detectable round or non-round illumination of an article, an area or object by a light beam.

As further used herein, a "sensor signal" generally refers to a signal generated by an optical sensor in response to the illumination by the light beam. Specifically, the sensor signal may be or may comprise at least one electrical signal, such as at least one analogue electrical signal and/or at least one digital electrical signal. More specifically, the sensor signal may be or may comprise at least one voltage signal and/or at least one current signal. More specifically, the sensor signal may comprise at least one photocurrent. Further, either raw sensor signals may be used, or the detector, the optical sensor or any other element may be adapted to process or preprocess the sensor signal, thereby generating secondary sensor signals, which may also be used as sensor signals, such as preprocessing by filtering or the like.

The light-sensitive areas specifically may be oriented towards the object. As used herein, the term "is oriented towards the object" generally refers to the situation that the respective surfaces of the light-sensitive areas are fully or partially visible from the object. Specifically, at least one interconnecting line between at least one point of the object and at least one point of the respective light-sensitive area may form an angle with a surface element of the light-sensitive area which is different from 0°, such as an angle in the range of 20° to 90°, preferably 80 to 90° such as 90°. Thus, when the object is located on the optical axis or close to the optical axis, the light beam propagating from the object towards the detector may be essentially parallel to the optical axis. As used herein, the term "essentially perpendicular" refers to the condition of a perpendicular orientation, with a tolerance of e.g. ±20° or less, preferably a tolerance of ±10° or less, more preferably a tolerance of ±5° or less. Similarly, the term "essentially parallel" refers to the condition of a parallel orientation, with a tolerance of e.g. ±20° or less, preferably a tolerance of ±10° or less, more preferably a tolerance of ±5° or less.

As used herein, the term "ray" generally refers to a line that is perpendicular to wavefronts of light which points in a direction of energy flow. As used herein, the term "beam" generally refers to a collection of rays. In the following, the terms "ray" and "beam" will be used as synonyms. As further used herein, the term "light beam" generally refers to an amount of light, specifically an amount of light traveling essentially in the same direction, including the possibility of the light beam having a spreading angle or widening angle. The light beam may have a spatial extension. Specifically, the light beam may have a non-Gaussian beam profile. The beam profile may be selected from the group consisting of a trapezoid beam profile; a triangle beam profile; a conical beam profile. The trapezoid beam profile may have a plateau region and at least one edge region. The light beam specifically may be a Gaussian light beam or a linear combination of Gaussian light beams, as will be outlined in further detail below. Other embodiments are feasible, however. The transfer device may be configured for one or more of adjusting, defining and determining the beam profile, in particular a shape of the beam profile.

The optical sensors may be sensitive in one or more of the ultraviolet, the visible or the infrared spectral range. Specifically, the optical sensors may be sensitive in the visible spectral range from 500 nm to 780 nm, most preferably at 650 nm to 750 nm or at 690 nm to 700 nm. Specifically, the optical sensors may be sensitive in the near infrared region. Specifically, the optical sensors may be sensitive in the part of the near infrared region where silicon photodiodes are applicable specifically in the range of 700 nm to 1000 nm. The optical sensors, specifically, may be sensitive in the infrared spectral range, specifically in the range of 780 nm to 3.0 micrometers. For example, the optical sensors each, independently, may be or may comprise at least one element selected from the group consisting of a photodiode, a photocell, a photoconductor, a phototransistor or any combination thereof. For example, the optical sensors may be or may comprise at least one element selected from the group consisting of a CCD sensor element, a CMOS sensor element, a photodiode, a photocell, a photoconductor, a phototransistor or any combination thereof. Any other type of photosensitive element may be used. As will be outlined in further detail below, the photosensitive element generally may fully or partially be made of inorganic materials and/or may fully or partially be made of organic materials. Most commonly, as will be outlined in further detail below, one or more photodiodes may be used, such as commercially available photodiodes, e.g. inorganic semiconductor photodiodes.

The detector may be adapted to determine at least one distance information of the object by using triangulation and/or structured light techniques. In known 3D sensing devices, such as devices using triangulation or structured light techniques, due to correspondence problems regular, constant or periodic pattern are not suitable since each measured point has to be assigned to one reference point of a reference pattern.

As used herein, the term "reflection image" refers to an image determined by the optical sensor comprising at least one reflection feature. As used herein, the term "reflection feature" refers to a feature in an image plane generated by the object in response to illumination, for example with at least one illumination feature. The reflection image may comprise the at least one reflection pattern comprising the at least one reflection feature. As used herein, the term "illumination feature" refers to at least one arbitrary shaped feature generated by at least one ambient light source or at least one illumination source adapted to illuminate the object. As used herein, the term "determining at least one reflection image" refers to one or more of imaging, recording and generating of the reflection image. As used herein, the term "select at least one reflection feature" refers to one or more of identifying, determining and choosing at least one reflection feature of the reflection image. The detector may be adapted to determine the longitudinal coordinate of an object point for at least one reflection feature of the reflection image from the combined signal. Thus, the detector may be adapted to pre-classify the at least one reflection feature of the reflection image. This allows using illumination patterns comprising regular and/or constant and/or periodic pattern such as a triangular pattern, a rectangular pattern, a hexagonal pattern or a pattern comprising further convex tilings. The illumination pattern may comprise as much as possible features per area such that hexagonal patterns may be preferred.

The evaluation device may be adapted to perform at least one image analysis and/or image processing in order to identify the reflection feature. The image analysis and/or image processing may use at least one feature detection algorithm. The image analysis and/or image processing may comprise one or more of the following: a filtering; a selection of at least one region of interest; a formation of a difference image between an image created by the sensor signals and at least one offset; an inversion of sensor signals by inverting an image created by the sensor signals; a formation of a difference image between an image created by the sensor signals at different times; a background correction; a decomposition into color channels; a decomposition into hue; saturation; and brightness channels; a frequency decomposition; a singular value decomposition; applying a Canny edge detector; applying a Laplacian of Gaussian filter; applying a Difference of Gaussian filter; applying a Sobel operator; applying a Laplace operator; applying a Scharr operator; applying a Prewitt operator; applying a Roberts operator; applying a Kirsch operator; applying a high-pass filter; applying a low-pass filter; applying a Fourier transformation; applying a Radon-transformation; applying a Hough-transformation; applying a wavelet-transformation; a thresholding; creating a binary image. The region of interest may be determined manually by a user or may be determined automatically, such as by recognizing an object within an image generated by the optical sensors.

The evaluation device is configured for determining at least one longitudinal region of the selected reflection feature of the reflection image by evaluating a combined signal Q from the sensor signals. The evaluation device may be adapted to determine at least one longitudinal coordinate z of the selected reflection feature by evaluating the combined signal Q, wherein the longitudinal region is given by the longitudinal coordinate z and an error interval ±ε. As used herein, the term "longitudinal region" refers to at least one uncertainty interval defined by the longitudinal coordinate z and the measurement uncertainty ±ε of the determination of the longitudinal coordinate from the combined signal Q. Error ε may depend on measurement uncertainty of the optical sensor. The measurement uncertainty of the optical sensors may be pre-determined and/or estimated and/or may be deposited in at least one data storage unit of the evaluation device. For example, the error interval may be ±10%, preferably ±5%, more preferably ±1%. As used herein, the term "combined signal Q" refers to a signal which is generated by combining the sensor signals, in particular by one or more of dividing the sensor signals, dividing multiples of the sensor signals or dividing linear combinations of the sensor signals. The evaluation device may be configured for deriving the combined signal Q by one or more of dividing the sensor signals, dividing multiples of the sensor signals, dividing linear combinations of the sensor signals. The evaluation device may be configured for using at least one predetermined relationship between the combined signal Q and the longitudinal region for determining the longitudinal region. For example, the evaluation device may be configured for deriving the combined signal Q by $$Q(z_O) = \frac{\int\int_{A_1} E(x, y; z_O) dx dy}{\int\int_{A_2} E(x, y; z_O) dx dy},$$

wherein x and y are transversal coordinates, A1 and A2 are different areas of at least one beam profile of the reflection light beam at the sensor position, and $E(x,y,z_o)$ denotes the beam profile given at the object distance $z_o$. Area A1 and area A2 may differ. In particular, A1 and A2 are not congruent. Thus, A1 and A2 may differ in one or more of the shape or content. As used herein, the term "beam profile" relates to a spatial distribution, in particular in at least one plane perpendicular to the propagation of the light beam, of an intensity of the light beam. The beam profile may be a transverse intensity profile of the light beam. The beam profile may be a cross section of the light beam. The beam profile may be selected from the group consisting of a trapezoid beam profile; a triangle beam profile; a conical beam profile and a linear combination of Gaussian beam profiles. Generally the beam profile is dependent on luminance $L(z_o)$ and beam shape $S(x,y;z_o)$, $E(x,y;z_o)=L\cdot S$. Thus, by deriving the combined signal it may allow determining the longitudinal coordinate independent from luminance. In addition, using the combined signal allows determination of the distance $z_o$ independent from the object size. Thus, the combined signal allows determination of the distance $z_o$ independent from the material properties and/or reflective properties and/or scattering properties of the object and independent from alterations of the light source such as by manufacturing precision, heat, water, dirt, damages on the lens, or the like.

Each of the sensor signals may comprise at least one information of at least one area of the beam profile of the light beam. As used herein, the term "area of the beam profile" generally refers to an arbitrary region of the beam profile at the sensor position used for determining the combined signal Q. The light-sensitive areas may be arranged such that a first sensor signal comprises information of a first area of the beam profile and a second sensor signal comprises information of a second area of the beam profile. The first area of the beam profile and second area of the beam profile may be one or both of adjacent or overlapping regions. The first area of the beam profile and the second area of the beam profile may be not congruent in area.

The evaluation device may be configured to determine and/or to select the first area of the beam profile and the second area of the beam profile. The first area of the beam profile may comprise essentially edge information of the beam profile and the second area of the beam profile may comprise essentially center information of the beam profile. The beam profile may have a center, i.e. a maximum value of the beam profile and/or a center point of a plateau of the beam profile and/or a geometrical center of the light spot, and falling edges extending from the center. The second region may comprise inner regions of the cross section and the first region may comprise outer regions of the cross section. As used herein, the term "essentially center information" generally refers to a low proportion of edge information, i.e. proportion of the intensity distribution corresponding to edges, compared to a proportion of the center information, i.e. proportion of the intensity distribution corresponding to the center. Preferably the center information has a proportion of edge information of less than 10%, more preferably of less than 5%, most preferably the center information comprises no edge content. As used herein, the term "essentially edge information" generally refers to a low proportion of center information compared to a proportion of the edge information. The edge information may comprise information of the whole beam profile, in particular from center and edge regions. The edge information may have a proportion of center information of less than 10%, preferably of less than 5%, more preferably the edge information comprises no center content. At least one area of the beam profile may be determined and/or selected as second area of the beam profile if it is close or around the center and comprises essentially center information. At least one area of the beam profile may be determined and/or selected as first area of the beam profile if it comprises at least parts of the falling edges of the cross section. For example, the whole area of the cross section may be determined as first region. The first area of the beam profile may be area A2 and the second area of the beam profile may be area A1.

Other selections of the first area A1 and second area A2 may be feasible. For example, the first area may comprise essentially outer regions of the beam profile and the second area may comprise essentially inner regions of the beam profile. For example, in case of a two-dimensional beam profile, the beam profile may be divided in a left part and a right part, wherein the first area may comprise essentially areas of the left part of the beam profile and the second area may comprise essentially areas of the right part of the beam profile.

The edge information may comprise information relating to a number of photons in the first area of the beam profile and the center information may comprise information relating to a number of photons in the second area of the beam profile. The evaluation device may be adapted for determining an area integral of the beam profile. The evaluation device may be adapted to determine the edge information by integrating and/or summing of the first area. The evaluation device may be adapted to determine the center information by integrating and/or summing of the second area. For example, the beam profile may be a trapezoid beam profile and the evaluation device may be adapted to determine an integral of the trapezoid. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

Additionally or alternatively, the evaluation device may be adapted to determine one or both of center information or edge information from at least one slice or cut of the light spot. This may be realized, for example, by replacing the area integrals in the combined signal Q by a line integral along the slice or cut. For improved accuracy, several slices or cuts through the light spot may be used and averaged. In case of an elliptical spot profile, averaging over several slices or cuts may result in improved distance information.

In one embodiment, the light beam propagating from the object to the detector may illuminate the sensor element with at least one pattern comprising at least one feature point. As used herein, the term "feature point" refers to at least one at least partially extended feature of the pattern. The feature point may be selected from the group consisting of: at least one point, at least one line, at least one edge. The pattern may be generated by the object, for example, in response to an illumination by the at least one light source with an illumination pattern comprising the at least one pattern. A1 may correspond to a full or complete area of a feature point on the optical sensors. A2 may be a central area of the feature point on the optical sensors. The central area may be a constant value. The central area may be smaller compared to the full area of the feature point. For example, in case of a circular feature point, the central area may have a radius from 0.1 to 0.9 of a full radius of the feature point, preferably from 0.4 to 0.6 of the full radius.

For example, the light beam propagating from the object to the detector may illuminate the optical sensors with at least one line pattern. The line pattern may be generated by the object, for example in response to an illumination by the at least one illumination source with an illumination pattern comprising the at least one line pattern. A1 may correspond to an area with a full line width of the line pattern on the optical sensors, in particular on the light sensitive area of the optical sensors. The line pattern on the optical sensors may be widened and/or displaced compared to the line pattern of the illumination pattern such that the line width on the optical sensors is increased. In particular, in case of a matrix of optical sensors, the line width of the line pattern on the optical sensors may change from one column to another column. A2 may be a central area of the line pattern on the optical sensors. The line width of the central area may be a constant value, and may in particular correspond to the line width in the illumination pattern. The central area may have a smaller line width compared to the full line width. For example, the central area may have a line width from 0.1 to 0.9 of the full line width, preferably from 0.4 to 0.6 of the full line width. The line pattern may be segmented on the optical sensors. Each column of the matrix of optical sensors may comprise center information of intensity in the central area of the line pattern and edge information of intensity from regions extending further outwards from the central area to edge regions of the line pattern.

For example, the light beam propagating from the object to the detector may illuminate the sensor element with at least one point pattern. The point pattern may be generated by the object, for example in response to an illumination by the at least one light source with an illumination pattern comprising the at least one point pattern. A1 may correspond to an area with a full radius of a point of the point pattern on the optical sensors. A2 may be a central area of the point in the point pattern on the optical sensors. The central area may be a constant value. The central area may have a radius compared to the full radius. For example, the central area may have a radius from 0.1 to 0.9 of the full radius, preferably from 0.4 to 0.6 of the full radius.

The light beam propagating from the object to the detector may illuminate the sensor element with a reflection pattern comprising both point patterns and line patterns. Other embodiments in addition or alternatively to line pattern and point pattern are feasible.

The evaluation device may be configured to derive the combined signal Q by one or more of dividing the edge information and the center information, dividing multiples of the edge information and the center information, dividing linear combinations of the edge information and the center information. Thus, essentially, photon ratios may be used as the physical basis of the method.

For example, the evaluation device may be configured for evaluating the sensor signals, by
a) determining at least one optical sensor having the highest sensor signal and forming at least one center signal;
b) evaluating the sensor signals of the optical sensors of the matrix and forming at least one sum signal;
c) determining at least one combined signal by combining the center signal and the sum signal; and
d) determining the at least one longitudinal coordinate z of the selected feature by evaluating the combined signal.

As explained, e.g. in WO 2012/110924 A1 or WO 2014/097181 A1, typically, a predetermined or determinable relationship exists between a size of a light spot, such as a diameter of the light spot, a beam waist or an equivalent diameter, and the longitudinal coordinate of the object from which the light beam propagates towards the detector. Without wishing to be bound by this theory, the light spot may be characterized by two measurement variables: a measurement signal measured in a small measurement patch in the center or close to the center of the light spot, also referred to as the center signal, and an integral or sum signal integrated over the light spot, with or without the center signal. For a light beam having a certain total power which does not change when the beam is widened or focused, the sum signal should be independent from the spot size of the light spot, and, thus, should, at least when linear optical sensors within their respective measurement range are used, be independent from the distance between the object and the detector. The center signal, however, is dependent on the spot size. Thus, the center signal typically increases when the light beam is focused, and decreases when the light beam is defocused. By comparing the center signal and the sum signal, thus, an item of information on the size of the light spot generated by the light beam and, thus, on the longitudinal coordinate of the object may be generated. The comparing of the center signal and the sum signal, as an example, may be done by forming the combined signal Q out of the center signal and the sum signal and by using a predetermined or determinable relationship between the longitudinal coordinate and the quotient signal for deriving the longitudinal coordinate.

The use of a matrix of optical sensors provides a plurality of advantages and benefits. Thus, the center of the light spot generated by the light beam on the sensor element, such as on the common plane of the light-sensitive areas of the optical sensors of the matrix of the sensor element, may vary with a transversal position of the object. By using a matrix of optical sensors, the detector according to the present invention may adapt to these changes in conditions and, thus, may determine the center of the light spot simply by comparing the sensor signals. Consequently, the detector according to the present invention may, by itself, choose the center signal and determine the sum signal and, from these two signals, derive a combined signal which contains information on the longitudinal coordinate of the object. By evaluating the combined signal, the longitudinal coordinate of the object may, thus, be determined. The use of the matrix of optical sensors, thus, provides a significant flexibility in terms of the position of the object, specifically in terms of a transversal position of the object.

The transversal position of the light spot on the matrix of optical sensors, such as the transversal position of the at least one optical sensor generating the sensor signal, may even be used as an additional item of information, from which at least one item of information on a transversal position of the object may be derived, as e.g. disclosed in WO 2014/198629 A1. Additionally or alternatively, as will be outlined in further detail below, the detector according to the present invention may contain at least one additional transversal detector for, in addition to the at least one longitudinal coordinate, detecting at least one transversal coordinate of the object.

Consequently, in accordance with the present invention, the term "center signal" generally refers to the at least one sensor signal comprising essentially center information of the beam profile. For example, the center signal may be the signal of the at least one optical sensor having the highest sensor signal out of the plurality of sensor signals generated by the optical sensors of the entire matrix or of a region of interest within the matrix, wherein the region of interest may be predetermined or determinable within an image generated by the optical sensors of the matrix. As used herein, the term "highest sensor signal" refers to one or both of a local maximum or a maximum in a region of interest. The center signal may arise from a single optical sensor or, as will be outlined in further detail below, from a group of optical sensors, wherein, in the latter case, as an example, the sensor signals of the group of optical sensors may be added up, integrated or averaged, in order to determine the center signal. The group of optical sensors from which the center signal arises may be a group of neighboring optical sensors, such as optical sensors having less than a predetermined distance from the actual optical sensor having the highest sensor signal, or may be a group of optical sensors generating sensor signals being within a predetermined range from the highest sensor signal. The group of optical sensors from which the center signal arises may be chosen as large as possible in order to allow maximum dynamic range. The evaluation device may be adapted to determine the center signal by integration of the plurality of sensor signals, for example the plurality of optical sensors around the optical sensor having the highest sensor signal. For example, the beam profile may be a trapezoid beam profile and the evaluation device may be adapted to determine an integral of the trapezoid, in particular of a plateau of the trapezoid.

As outlined above, the center signal generally may be a single sensor signal, such as a sensor signal from the optical sensor in the center of the light spot, or may be a combination of a plurality of sensor signals, such as a combination of sensor signals arising from optical sensors in the center of the light spot, or a secondary sensor signal derived by processing a sensor signal derived by one or more of the aforementioned possibilities. The determination of the center signal may be performed electronically, since a comparison of sensor signals is fairly simply implemented by conventional electronics, or may be performed fully or partially by software. Specifically, the center signal may be selected from the group consisting of: the highest sensor signal; an average of a group of sensor signals being within a predetermined range of tolerance from the highest sensor signal; an average of sensor signals from a group of optical sensors containing the optical sensor having the highest sensor signal and a predetermined group of neighboring optical sensors; a sum of sensor signals from a group of optical sensors containing the optical sensor having the highest sensor signal and a predetermined group of neighboring optical sensors; a sum of a group of sensor signals being within a predetermined range of tolerance from the highest sensor signal; an average of a group of sensor signals being above a predetermined threshold; a sum of a group of sensor signals being above a predetermined threshold; an integral of sensor signals from a group of optical sensors containing the optical sensor having the highest sensor signal and a predetermined group of neighboring optical sensors; an integral of a group of sensor signals being within a predetermined range of tolerance from the highest sensor signal; an integral of a group of sensor signals being above a predetermined threshold.

Similarly, the term "sum signal" generally refers to a signal comprising essentially edge information of the beam profile. For example, the sum signal may be derived by adding up the sensor signals, integrating over the sensor signals or averaging over the sensor signals of the entire matrix or of a region of interest within the matrix, wherein the region of interest may be predetermined or determinable within an image generated by the optical sensors of the matrix. When adding up, integrating over or averaging over the sensor signals, the actual optical sensors from which the sensor signal is generated may be left out of the adding, integration or averaging or, alternatively, may be included into the adding, integration or averaging. The evaluation device may be adapted to determine the sum signal by integrating signals of the entire matrix, or of the region of interest within the matrix. For example, the beam profile may be a trapezoid beam profile and the evaluation device may be adapted to determine an integral of the entire trapezoid. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

Similarly, the center signal and edge signal may also be determined by using segments of the beam profile such as circular segments of the beam profile. For example, the beam profile may be divided into two segments by a secant or a chord that does not pass the center of the beam profile. Thus, one segment will essentially contain edge information, while the other segment will contain essentially center information. For example, to further reduce the amount of edge information in the center signal, the edge signal may further be subtracted from the center signal.

Additionally or alternatively, the evaluation device may be adapted to determine one or both of center information or edge information from at least one slice or cut of the light spot. This may be realized for example by replacing the area integrals in the combined signal Q by a line integral along the slice or cut. For improved accuracy, several slices or cuts through the light spot may be used and averaged. In case of an elliptical spot profile, averaging over several slices or cuts may result in an improved distance information.

The combined signal may be a signal which is generated by combining the center signal and the sum signal. Specifically, the combination may include one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa. Additionally or alternatively, the combined signal may comprise an arbitrary signal or signal combination which contains at least one item of information on a comparison between the center signal and the sum signal.

The evaluation device may be configured to determine the at least one longitudinal coordinate z of the object by using at least one known, determinable or predetermined relationship between the sensor signals. In particular, the evaluation device is configured to determine the at least one coordinate z of the object by using at least one known, determinable or predetermined relationship between a quotient signal derived from the sensor signals and the longitudinal coordinate.

Raw sensor signals of the optical sensors may be used for evaluation or secondary sensor signals derived thereof. As used herein, the term "secondary sensor signal" generally refers to a signal, such as an electronic signal, more preferably an analogue and/or a digital signal, which is obtained by processing one or more raw signals, such as by filtering, averaging, demodulating or the like. Thus, image processing algorithms may be used for generating secondary sensor signals from the totality of sensor signals of the matrix or from a region of interest within the matrix. Specifically, the detector, such as the evaluation device, may be configured for transforming the sensor signals of the optical sensor, thereby generating secondary optical sensor signals, wherein the evaluation device is configured for performing steps a)-d) by using the secondary optical sensor signals. The transformation of the sensor signals specifically may comprise at least one transformation selected from the group consisting of: a filtering; a selection of at least one region of interest; a formation of a difference image between an image created by the sensor signals and at least one offset; an inversion of sensor signals by inverting an image created by the sensor signals; a formation of a difference image between an image created by the sensor signals at different times; a background correction; a decomposition into color channels; a decomposition into hue; saturation; and brightness channels; a frequency decomposition; a singular value decomposition; applying a Canny edge detector; applying a Laplacian of Gaussian filter; applying a Difference of Gaussian filter; applying a Sobel operator; applying a Laplace operator; applying a Scharr operator; applying a Prewitt operator; applying a Roberts operator; applying a Kirsch operator; applying a high-pass filter; applying a low-pass filter; applying a Fourier transformation; applying a Radon-transformation; applying a Hough-transformation; applying a wavelet-transformation; a thresholding; creating a binary image. The region of interest may be determined manually by a user or may be determined automatically, such as by recognizing an object within an image generated by the optical sensors. As an example, a vehicle, a person or another type of predetermined object may be determined by automatic image recognition within an image, i.e. within the totality of sensor signals generated by the optical sensors, and the region of interest may be chosen such that the object is located within the region of interest. In this case, the evaluation, such as the determination of the longitudinal coordinate, may be performed for the region of interest, only. Other implementations, however, are feasible.

As outlined above, the detection of the center of the light spot, i.e. the detection of the center signal and/or of the at least one optical sensor from which the center signal arises, may be performed fully or partially electronically or fully or partially by using one or more software algorithms. Specifically, the evaluation device may comprise at least one center detector for detecting the at least one highest sensor signal and/or for forming the center signal. The center detector specifically may fully or partially be embodied in software and/or may fully or partially be embodied in hardware. The center detector may fully or partially be integrated into the at least one sensor element and/or may fully or partially be embodied independently from the sensor element.

As outlined above, the sum signal may be derived from all sensor signals of the matrix, from the sensor signals within a region of interest or from one of these possibilities with the sensor signals arising from the optical sensors contributing to the center signal excluded. In every case, a reliable sum signal may be generated which may be compared with the center signal reliably, in order to determine the longitudinal coordinate. Generally, the sum signal may be selected from the group consisting of: an average over all sensor signals of the matrix; a sum of all sensor signals of the matrix; an integral of all sensor signals of the matrix; an average over all sensor signals of the matrix except for sensor signals from those optical sensors contributing to the center signal; a sum of all sensor signals of the matrix except for sensor signals from those optical sensors contributing to the center signal; an integral of all sensor signals of the matrix except for sensor signals from those optical sensors contributing to the center signal; a sum of sensor signals of optical sensors within a predetermined range from the optical sensor having the highest sensor signal; an integral of sensor signals of optical sensors within a predetermined range from the optical sensor having the highest sensor signal; a sum of sensor signals above a certain threshold of optical sensors being located within a predetermined range from the optical sensor having the highest sensor signal; an integral of sensor signals above a certain threshold of optical sensors being located within a predetermined range from the optical sensor having the highest sensor signal. Other options, however, exist.

The summing may be performed fully or partially in software and/or may be performed fully or partially in hardware. A summing is generally possible by purely electronic means which, typically, may easily be implemented into the detector. Thus, in the art of electronics, summing devices are generally known for summing two or more electrical signals, both analogue signals and digital signals. Thus, the evaluation device may comprise at least one summing device for forming the sum signal. The summing device may fully or partially be integrated into the sensor element or may fully or partially be embodied independently from the sensor element. The summing device may fully or partially be embodied in one or both of hardware or software.

As outlined above, the comparison between the center signal and the sum signal specifically may be performed by forming one or more quotient signals. Thus, generally, the combined signal may be a quotient signal Q, derived by one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa; forming a quotient of the center signal and a linear combination of the sum signal and the center signal or vice versa; forming a quotient of the sum signal and a linear combination of the sum signal and the center signal or vice versa; forming a quotient of an exponentiation of the center signal and an exponentiation of the sum signal or vice versa. Other options, however, exist. The evaluation device may be configured for forming the one or more quotient signals. The evaluation device may further be configured for determining the at least one longitudinal coordinate by evaluating the at least one quotient signal.

The evaluation device specifically may be configured for using at least one predetermined relationship between the combined signal Q and the longitudinal coordinate, in order to determine the at least one longitudinal coordinate. Thus, due to the reasons disclosed above and due to the dependency of the properties of the light spot on the longitudinal coordinate, the combined signal Q typically is a monotonous function of the longitudinal coordinate of the object and/or of the size of the light spot such as the diameter or equivalent diameter of the light spot. Thus, as an example, specifically in case linear optical sensors are used, a simple quotient of the sensor signal $s_{center}$ and the sum signal $s_{sum}$ $Q=s_{center}/s_{sum}$ may be a monotonously decreasing function of the distance. Without wishing to be bound by this theory, it is believed that this is due to the fact that, in the preferred setup described above, both the center signal $s_{center}$ and the sum signal $s_{sum}$ decrease as a square function with increasing distance to the light source, since the amount of light reaching the detector decreases. Therein, however, the center signal $s_{center}$ decreases more rapidly than the sum signal $s_{sum}$, since, in the optical setup as used in the experiments, the light spot in the image plane grows and, thus, is spread over a larger area. The quotient of the center signal and the sum signal, thus, continuously decreases with increasing diameter of the light beam or diameter of the light spot on the light-sensitive areas of the optical sensors of the matrix. The quotient, further, is typically independent from the total power of the light beam, since the total power of the light beam forms a factor both in the center signal and in the sum sensor signal. Consequently, the combined signal Q may form a secondary signal which provides a unique and unambiguous relationship between the center signal and the sum signal and the size or diameter of the light beam. Since, on the other hand, the size or diameter of the light beam is dependent on a distance between the object, from which the light beam propagates towards the detector, and the detector itself, i.e. dependent on the longitudinal coordinate of the object, a unique and unambiguous relationship between the center signal and the sum signal on the one hand and the longitudinal coordinate on the other hand may exist. For the latter, reference e.g. may be made to one or more of the above-mentioned prior art documents, such as WO 2014/097181 A1. The predetermined relationship may be determined by analytical considerations, such as by assuming a linear combination of Gaussian light beams, by empirical measurements, such as measurements measuring the combined signal and/or the center signal and the sum signal or secondary signals derived thereof as a function of the longitudinal coordinate of the object, or both.

Thus, generally, the evaluation device may be configured for determining the longitudinal coordinate by evaluating the combined signal Q. This determining may be a one-step process, such as by directly combining the center signal and the sum signal and deriving the longitudinal coordinate thereof, or may be a multiple step process, such as by firstly deriving the combined signal from the center signal and the sum signal and, secondly, by deriving the longitudinal coordinate from the combined signal. Both options, i.e. the option of steps c) and d) being separate and independent steps and the option of steps c) and d) being fully or partially combined, shall be comprised by the present invention.

The evaluation device may be configured for using at least one predetermined relationship between the combined signal and the longitudinal coordinate. The predetermined relationship may be one or more of an empiric relationship, a semi-empiric relationship and an analytically derived relationship. The evaluation device may comprise at least one data storage device for storing the predetermined relationship, such as a lookup list or a lookup table.

The combined signal Q may be determined by using various means. As an example, a software means for deriving the quotient signal, a hardware means for deriving the quotient signal, or both, may be used and may be implemented in the evaluation device. Thus, the evaluation device, as an example, may comprise at least one divider, wherein the divider is configured for deriving the quotient signal. The divider may fully or partially be embodied as one or both of a software divider or a hardware divider. The divider may fully or partially be integrated into the sensor element answers or may fully or partially be embodied independent from the sensor element.

The detector may comprise at least one optical element selected from the group consisting of: transfer device, such as at least one lens and/or at least one lens system, at least one diffractive optical element. The term "transfer device", also denoted as "transfer system", may generally refer to one or more optical elements which are adapted to modify the light beam, such as by modifying one or more of a beam parameter of the light beam, a width of the light beam or a direction of the light beam. The transfer device may be adapted to guide the light beam onto the optical sensors. The transfer device specifically may comprise one or more of: at least one lens, for example at least one lens selected from the group consisting of at least one focus-tunable lens, at least one aspheric lens, at least one spheric lens, at least one Fresnel lens; at least one diffractive optical element; at least one concave mirror; at least one beam deflection element, preferably at least one mirror; at least one beam splitting element, preferably at least one of a beam splitting cube or a beam splitting mirror; at least one multi-lens system. As used herein, the term "focal length" of the transfer device refers to a distance over which incident collimated rays which may impinge the transfer device are brought into a "focus" which may also be denoted as "focal point". Thus, the focal length constitutes a measure of an ability of the transfer device to converge an impinging light beam. Thus, the transfer device may comprise one or more imaging elements which can have the effect of a converging lens. By way of example, the transfer device can have one or more lenses, in particular one or more refractive lenses, and/or one or more convex mirrors. In this example, the focal length may be defined as a distance from the center of the thin refractive lens to the principal focal points of the thin lens. For a converging thin refractive lens, such as a convex or biconvex thin lens, the focal length may be considered as being positive and may provide the distance at which a beam of collimated light impinging the thin lens as the transfer device may be focused into a single spot. Additionally, the transfer device can comprise at least one wavelength-selective element, for example at least one optical filter. Additionally, the transfer device can be designed to impress a predefined beam profile on the electromagnetic radiation, for example, at the location of the sensor region and in particular the sensor area. The abovementioned optional embodiments of the transfer device can, in principle, be realized individually or in any desired combination.

The transfer device may have an optical axis. In particular, the detector and the transfer device have a common optical axis. As used herein, the term "optical axis of the transfer device" generally refers to an axis of mirror symmetry or rotational symmetry of the lens or lens system. The optical axis of the detector may be a line of symmetry of the optical setup of the detector. The detector comprises at least one transfer device, preferably at least one transfer system having at least one lens. The transfer system, as an example, may comprise at least one beam path, with the elements of the transfer system in the beam path being located in a rotationally symmetrical fashion with respect to the optical axis. Still, as will also be outlined in further detail below, one or more optical elements located within the beam path may also be off-centered or tilted with respect to the optical axis. In this case, however, the optical axis may be defined sequentially, such as by interconnecting the centers of the optical elements in the beam path, e.g. by interconnecting the centers of the lenses, wherein, in this context, the optical sensors are not counted as optical elements. The optical axis generally may denote the beam path. Therein, the detector may have a single beam path along which a light beam may travel from the object to the optical sensors, or may have a plurality of beam paths. As an example, a single beam path may be given or the beam path may be split into two or more partial beam paths. In the latter case, each partial beam path may have its own optical axis. The optical sensors may be located in one and the same beam path or partial beam path. Alternatively, however, the optical sensors may also be located in different partial beam paths.

The transfer device may constitute a coordinate system, wherein a longitudinal coordinate I is a coordinate along the optical axis and wherein d is a spatial offset from the optical axis. The coordinate system may be a polar coordinate system in which the optical axis of the transfer device forms a z-axis and in which a distance from the z-axis and a polar angle may be used as additional coordinates. A direction parallel or antiparallel to the z-axis may be considered a longitudinal direction, and a coordinate along the z-axis may be considered a longitudinal coordinate I. Any direction perpendicular to the z-axis may be considered a transversal direction, and the polar coordinate and/or the polar angle may be considered a transversal coordinate.

As further used herein, the term "evaluation device" generally refers to an arbitrary device adapted to perform the named operations, preferably by using at least one data processing device and, more preferably, by using at least one processor and/or at least one application-specific integrated circuit. Thus, as an example, the at least one evaluation device may comprise at least one data processing device having a software code stored thereon comprising a number of computer commands. The evaluation device may provide one or more hardware elements for performing one or more of the named operations and/or may provide one or more processors with software running thereon for performing one or more of the named operations.

The above-mentioned operations, including determining the at least one longitudinal coordinate of the object, are performed by the at least one evaluation device. Thus, as an example, one or more of the above-mentioned relationships may be implemented in software and/or hardware, such as by implementing one or more lookup tables. Thus, as an example, the evaluation device may comprise one or more programmable devices such as one or more computers, application-specific integrated circuits (ASICs), Digital Signal Processors (DSPs), or Field Programmable Gate Arrays (FPGAs) which are configured to perform the above-mentioned evaluation, in order to determine the at least one longitudinal coordinate of the object. Additionally or alternatively, however, the evaluation device may also fully or partially be embodied by hardware.

As outlined above, by evaluating the center signal and the sum signal, the detector may be enabled to determine the at least one longitudinal coordinate of the object, including the option of determining the longitudinal coordinate of the whole object or of one or more parts thereof. In addition, however, other coordinates of the object, including one or more transversal coordinates and/or rotational coordinates, may be determined by the detector, specifically by the evaluation device. Thus, as an example, one or more transversal sensors may be used for determining at least one transversal coordinate of the object. As outlined above, the position of the at least one optical sensor from which the center signal arises may provide information on the at least one transversal coordinate of the object, wherein, as an example, a simple lens equation may be used for optical transformation and for deriving the transversal coordinate. Additionally or alternatively, one or more additional transversal sensors may be used and may be comprised by the detector. Various transversal sensors are generally known in the art, such as the transversal sensors disclosed in WO 2014/097181 A1 and/or other position-sensitive devices (PSDs), such as quadrant diodes, CCD or CMOS chips or the like. Additionally or alternatively, as an example, the detector according to the present invention may comprise one or more PSDs disclosed in R. A. Street (Ed.): *Technology and Applications of Amorphous Silicon*, Springer-Verlag Heidelberg, 2010, pp. 346-349. Other embodiments are feasible. These devices may generally also be implemented into the detector according to the present invention. As an example, a part of the light beam may be split off within the detector, by at least one beam splitting element. The split-off portion, as an example, may be guided towards a transversal sensor, such as a CCD or CMOS chip or a camera sensor, and a transversal position of a light spot generated by the split-off portion on the transversal sensor may be determined, thereby determining at least one transversal coordinate of the object. Consequently, the detector according to the present invention may either be a one-dimensional detector, such as a simple distance measurement device, or may be embodied as a two-dimensional detector or even as a three-dimensional detector. Further, as outlined above or as outlined in further detail below, by scanning a scenery or an environment in a one-dimensional fashion, a three-dimensional image may also be created. Consequently, the detector according to the present invention specifically may be one of a one-dimensional detector, a two-dimensional detector or a three-dimensional detector. The evaluation device may further be configured to determine at least one transversal coordinate x, y of the object. The evaluation device may be adapted to combine the information of the longitudinal coordinate and the transversal coordinate and to determine a position of the object in space.

As outlined above, the evaluation device is adapted to determine at least one displacement region in at least one reference image corresponding to the longitudinal region. As used herein, the term "reference image" refers to an image different from the reflection image which is determined at a different spatial position compared to the reflection image. The reference image may be determined by one or more of recording at least one reference feature, imaging the at least one reference feature, calculating of the reference image. The reference image and the reflection image may be images of the object determined at different spatial positions having a fixed distance. The distance may be a relative distance, also called baseline. The evaluation device may be adapted to determine the at least one reference feature in the at least one reference image corresponding to the at least one reflection feature. As outlined above, the evaluation device may be adapted to perform an image analysis and to identify features of the reflection image. The evaluation device may be adapted to identify at least one reference feature in the reference image having an essentially identical longitudinal coordinate as the selected reflection feature. The term "essentially identical" refers to identical within 10%, preferably 5%, most preferably 1%. The reference feature corresponding to the reflection feature may be determined using epipolar geometry. For description of epipolar geometry reference is made, for example, to chapter 2 in X. Jiang, H. Bunke: "Dreidimensionales Computersehen" Springer, Berlin Heidelberg, 1997. Epipolar geometry may assume that the reference image and the reflection image may be images of the object determined at different spatial positions and/or spatial orientations having a fixed distance. The evaluation device may be adapted to determine an epipolar line in the reference image. Relative position of the reference image and reflection image may be known. For example, relative position of the reference image and reflection image may be stored within at least one storage unit of the evaluation device. The evaluation device may be adapted to determine a straight line extending from the selected reflection feature of the reflection image. The straight line may comprise possible object features corresponding to the selected feature. The straight line and the baseline span an epipolar plane. As the reference image is determined at a different relative position from the reflection image, the corresponding possible object features may be imaged on a straight line, called epipolar line, in the reference image. Thus, a feature of the reference image corresponding to the selected feature of the reflection image lies on the epipolar line. Due to distortions of the image or changes in the system parameters such as due to ageing, temperature changes, mechanical stress or the like, epipolar lines may intersect or be very close to each other and/or the correspondence between reference feature and reflection feature may be unclear. Further, each known position or object in the real world may be projected onto the reference image and vice versa. The projection may be known due to a calibration of the detector, whereas the calibration is comparable to a teachin of the epipolar geometry of the specific camera.

As used herein, the term "displacement region" refers to a region in the reference image in which the reference feature corresponding to the selected reflection feature may be imaged. Specifically, the displacement region may be a region in the reference image in which the reference feature corresponding to the selected reflection feature is expected to be located in the reference image. Depending on the distance to the object, an image position of the reference feature corresponding to the reflection feature may be displaced within the reference image compared to an image position of the reflection feature in the reflection image. The displacement region may comprise only one reference feature. The displacement region may also comprise more than one reference feature. The displacement region may comprise an epipolar line or a section of an epipolar line. The displacement region may comprise more than one epipolar line or more sections of more than one epipolar line. As used herein, the term "reference feature" refers to at least one feature of the reference image. The displacement region may extend along the epipolar line, orthogonal to an epipolar line, or both. The evaluation device may be adapted to determine the reference feature along the epipolar line corresponding to the longitudinal coordinate z and to determine an extent of the displacement region along the epipolar line corresponding to the error interval ±ε or orthogonal to an epipolar line. The measurement uncertainty of the distance measurement using the combined signal Q may result in a displacement region which is non-circular since the measurement uncertainty may be different for different directions. Specifically, the measurement uncertainty along the epipolar line or epipolar lines may be greater than the measurement uncertainty in an orthogonal direction with respect to the epipolar line or epipolar lines. The displacement region may comprise an extend in an orthogonal direction with respect to the epipolar line or epipolar lines. The evaluation device may determine a displacement region around the image position of the reflection feature. The evaluation device may be adapted to determine the longitudinal coordinate z for the reflection feature and an error interval $\pm\varepsilon$ from the combined signal Q to determine the displacement region along the epipolar line corresponding to $z\pm\varepsilon$. The evaluation device is adapted to match the selected reflection feature with at least one reference feature within the displacement region. As used herein, the term "matching" refers to determining and/or evaluating corresponding reference and reflection features. The evaluation device may be adapted to match the selected feature of the reflection image with the reference feature within the displacement region by using at least one evaluation algorithm considering the determined longitudinal coordinate z. The evaluation algorithm may be a linear scaling algorithm. The evaluation device may be adapted to determine the epipolar line closest to and/or within the displacement region. The evaluation device may be adapted to determine the epipolar line closest to the image position of the reflection feature. The extent of the displacement region along the epipolar line may be larger than the extent of the displacement region orthogonal to the epipolar line. The evaluation device may be adapted to determine an epipolar line before determining a corresponding reference feature. The evaluation device may determine a displacement region around the image position of each reflection feature. The evaluation device may be adapted to assign an epipolar line to each displacement region of each image position of the reflection features, such as by assigning the epipolar line closest to a displacement region and/or within a displacement region and/or closest to a displacement region along a direction orthogonal to the epipolar line. The evaluation device may be adapted to determine the reference feature corresponding to the image position of the reflection feature by determining the reference feature closest to the assigned displacement region and/or within the assigned displacement region and/or closest to the assigned displacement region along the assigned epipolar line and/or within the assigned displacement region along the assigned epipolar line.

Additionally or alternatively, the evaluation device may be configured to perform the following steps:

Determining the displacement region for the image position of each reflection feature;

Assigning an epipolar line to the displacement region of each reflection feature such as by assigning the epipolar line closest to a displacement region and/or within a displacement region and/or closest to a displacement region along a direction orthogonal to the epipolar line;

Assigning and/or determining at least one reference feature to each reflection feature such as by assigning the reference feature closest to the assigned displacement region and/or within the assigned displacement region and/or closest to the assigned displacement region along the assigned epipolar line and/or within the assigned displacement region along the assigned epipolar line.

Additionally or alternatively, the evaluation device may be adapted to decide between more than one epipolar line and/or reference feature to be assigned to a reflection feature such as by comparing distances of reflection features and/or epipolar lines within the reference image and/or by comparing error weighted distances, such as $\varepsilon$-weighted distances of reflection features and/or epipolar lines within the reference image and assigning the epipolar line and/or reference feature in shorter distance and/or $\varepsilon$-weighted distance to the reference feature and/or reflection feature.

Preferably, the detector may be adapted to pre-classify the selected reflection feature using the combined signal Q such that an unambiguous assignment to one reference feature is possible. In particular, illumination features of the illumination pattern may be arranged such that corresponding reference features of the reference image may have a relative distance to each other as large as possible on the epipolar line. The illumination features of the illumination pattern may be arranged such that only few reference features are positioned on the epipolar line. For example, the illumination pattern may comprise at least one hexagonal pattern. Preferably, the illumination pattern may comprise at least one hexagonal pattern, wherein the pattern is rotated relative to the baseline. Preferably, the illumination pattern may comprise at least one displaced hexagonal pattern, wherein individual points of the hexagonal pattern are displaced by a random distance from the regular position, for example orthogonal to the epipolar line of the point. The displacement of the individual points may be smaller than half of the distance between two parallel epipolar lines, preferably smaller than one fourth of the distance between two parallel epipolar lines. The displacement of the individual points may be as such that two points are not displaced above each other.

The evaluation device may be adapted to determine a displacement of the matched reference feature and the selected reflection feature. As used herein, the term "displacement" refers to difference between a position in the reference image to a position in the reflection image. The evaluation device may be adapted to determine a longitudinal information of the matched feature using a predetermined relationship between a longitudinal coordinate and the displacement. As used herein, the term "longitudinal information" refers to information relating to the longitudinal coordinate. For example, the longitudinal information may be a distance value. The evaluation device may be adapted to determine the pre-determined relationship by using triangulation methods. In case position of the selected reflection feature in the reflection image and position of the matched reference feature and/or relative displacement of the selected reflection feature and the matched reference feature are known, longitudinal coordinate of the corresponding object feature may be determined by triangulation. Thus, the evaluation device may be adapted to select, for example subsequent and/or column by column, a reflection feature and to determine for each potential position of the reference feature the corresponding distance value using triangulation. Displacement and corresponding distance value may be stored in at least one storage device of the evaluation device. The evaluation device may, as an example, comprise at least one data processing device, such as at least one processor, at least one DSP, at least one FPGA and/or at least one ASIC. Further, for storing the at least one predetermined or determinable relationship between the longitudinal coordinate z and the displacement, the at least one data storage device may be provided, such as for providing one or more look-up tables for storing the predetermined relationship. The evaluation device may be adapted to store parameters for an intrinsic and/or extrinsic calibration of the camera and/or the detector. The evaluation device may be adapted to generate the parameters for an intrinsic and/or extrinsic calibration of the camera and/or the detector such as by performing a Tsai camera calibration. The evaluation device may be adapted to compute and/or estimate parameters such as the focal length of the transfer device, the radial lens distortion coefficient, the coordinates of the center of radial lens distortion, scale factors to account for any uncertainty due to imperfections in hardware timing for scanning and digitization, rotation angles for the transformation between the world and camera coordinates, translation components for the transformation between the world and camera coordinates, aperture angles, image sensor format, principal point, skew coefficients, camera center, camera heading, baseline, rotation or translation parameters between camera and/or illumination source, apertures, focal distance, or the like.

Using the combined sensor signal allows to estimate distances, such as the longitudinal coordinate z within the error interval. By determining the displacement region corresponding to the estimated longitudinal coordinate and the corresponding error interval allows to reduce the possible number of solutions along the epipolar line significantly. The number of possible solutions may even be reduced to one. Determining of the longitudinal coordinate z and the error interval may be performed during a pre-evaluation before matching the selected reflection feature and reference feature. This may allow reducing the computational demand such that it is possible to significantly reduce costs and to allow a use in mobile device or outdoor devices. Furthermore, generally in triangulation systems the baseline has to be large in order to detect large distances. Pre-evaluation of the longitudinal coordinate z and error interval using the combined sensor signal and subsequent matching of the selected reflection feature and reference feature may allow using short baselines such that it may be possible to provide a compact device. Furthermore, pre-evaluation of the longitudinal coordinate z and error interval using the combined sensor signal and subsequent matching of the selected reflection feature and reference feature may enhance accuracy and/or speed and/or may lower computational demand in comparison to conventional triangulation systems. Further, the number of illumination features such as the number of illumination points in the illumination pattern may be reduced to increase the light intensity in each illumination point such as to compete with ambient light while complying to eye safety regulations. A reduced number of illumination features in a conventional triangulation system might increase the difficulty to match reflection features and reference features. Further, the number of illumination features such as the number of illumination points in the illumination pattern may be increased, such as to increase the resolution of the distance measurement, such as to increase the resolution of the obtained depth map without increasing the processing power of the evaluation device such as in a mobile application.

The detector may further comprise an illumination source. As an example, the illumination source may be configured for generating an illuminating light beam for illuminating the object. The detector may be configured such that the illuminating light beam propagates from the detector towards the object along an optical axis of the detector. For this purpose, the detector may comprise at least one reflective element, preferably at least one prism, for deflecting the illuminating light beam onto the optical axis.

The illumination source may be adapted to generate at least one illumination pattern for illumination of the object. Additionally or alternatively, the illumination pattern may be generated by at least one ambient light source. The detector may be configured such that the illumination pattern propagates from the detector, in particular from at least one opening of the housing, towards the object along and/or parallel to an optical axis of the detector. For this purpose, the detector may comprise at least one reflective element, preferably at least one prism, for deflecting the illumination pattern such that it propagates along or parallel to the optical axis. Specifically, the illumination source may comprise at least one laser and/or laser source. Various types of lasers may be employed, such as semiconductor lasers. Additionally or alternatively, non-laser light sources may be used, such as LEDs and/or light bulbs. As used herein, the term "pattern" refers to an arbitrary known or pre-determined arrangement comprising at least one arbitrarily shaped feature. The pattern may comprise at least one feature such as a point or symbol. The pattern may comprise a plurality of features. The pattern may comprise an arrangement of periodic or non-periodic features. As used herein, the term "illumination pattern" refers to a pattern which illuminates the object. The illumination pattern may be generated by ambient light, such as by at least one ambient light source, or by the at least one illumination source. The illumination pattern may comprise at least one pattern selected from the group consisting of: at least one point pattern, in particular a pseudo-random point pattern; a random point pattern or a quasi random pattern; at least one Sobol pattern; at least one quasiperiodic pattern; at least one pattern comprising at least one pre-known feature at least one regular pattern; at least one triangular pattern; at least one hexagonal pattern; at least one rectangular pattern at least one pattern comprising convex uniform tilings; at least one line pattern comprising at least one line; at least one line pattern comprising at least two lines such as parallel or crossing lines. For example, the illumination source may be adapted to generate and/or to project a cloud of points. The illumination pattern may comprise regular and/or constant and/or periodic pattern such as a triangular pattern, a rectangular pattern, a hexagonal pattern, or a pattern comprising further convex tilings. The illumination pattern may comprise as much as possible features per area such that a hexagonal pattern may be preferred. A distance between two features of the illumination pattern and/or an area of the at least one illumination feature may depend on the circle of confusion in the image.

The illumination source may comprise one or more of at least one light projector; at least one digital light processing (DLP) projector, at least one LCoS projector, at least one spatial light modulator; at least one diffractive optical element; at least one array of light emitting diodes; at least one array of laser light sources. The illumination source may comprise at least one light source adapted to generate the illumination pattern directly. For example, the illumination source may comprise at least one laser source. For example, the illumination source may comprise at least one line laser. The line laser may be adapted to send a laser line to the object, for example a horizontal or vertical laser line. The illumination source may comprise a plurality of line lasers. For example, the illumination source may comprise at least two line lasers which may be arranged such that the illumination pattern comprises at least two parallel or crossing lines. The illumination source may comprise the at least one light projector adapted to generate a cloud of points such that the illumination pattern may comprise a plurality of point pattern. The illumination source may comprise at least one mask adapted to generate the illumination pattern from at least one light beam generated by the illumination source. The illumination source may be one of attached to or integrated into a mobile device such as a smartphone. The illumination source may be used for further functions that may be used in determining an image such as for an autofocus function. The illumination device may be attached to a mobile device such as by using a connector such as a USB- or phone-connector such as the headphone jack.

The illumination source, specifically, may be configured for emitting light in the infrared spectral range. It shall be noted, however, that other spectral ranges are feasible, additionally or alternatively. Further, the illumination source specifically may be configured for emitting modulated or non-modulated light. In case a plurality of illumination sources is used, the different illumination sources may have different modulation frequencies which, as outlined in further detail below, later on may be used for distinguishing the light beams. The detector may be configured for evaluating a single light beam or a plurality of light beams. In case a plurality of light beams propagates from the object to the detector, means for distinguishing the light beams may be provided. Thus, the light beams may have different spectral properties, and the detector may comprise one or more wavelength selective elements for distinguishing the different light beams. Each of the light beams may then be evaluated independently. The wavelength selective elements, as an example, may be or may comprise one or more filters, one or more prisms, one or more gratings, one or more dichroitic mirrors or arbitrary combinations thereof. Further, additionally or alternatively, for distinguishing two or more light beams, the light beams may be modulated in a specific fashion. Thus, as an example, the light beams may be frequency modulated, and the sensor signals may be demodulated in order to distinguish partially the sensor signals originating from the different light beams, in accordance with their demodulation frequencies. These techniques generally are known to the skilled person in the field of high-frequency electronics. Generally, the evaluation device may be configured for distinguishing different light beams having different modulations.

Specifically, the illumination source and the optical sensors may be arranged in a common plane or in different planes. The illumination source and the optical sensors may have different spatial orientation. In particular, the illumination source and the sensor element may be arranged in a twisted arrangement.

The illumination source may be adapted to generate and/or to project a cloud of points such that a plurality of illuminated regions is generated on the matrix of optical sensors, for example the CMOS detector. Additionally, disturbances may be present on the matrix of optical sensors such as disturbances due to speckles and/or extraneous light and/or multiple reflections. The evaluation device may be adapted to determine at least one region of interest, for example one or more pixels illuminated by the light beam which are used for determination of the longitudinal coordinate of the object. For example, the evaluation device may be adapted to perform a filtering method, for example, a blob-analysis and/or an edge filter and/or object recognition method.

The sensor element may be adapted to determine at least one reflection pattern. As used herein, the term "reflection pattern" refers to a response pattern generated by reflection or scattering of light at the surface of the object, in particular generated by the object in response to illumination by the illumination pattern. As outlined above, the illumination pattern comprises at least one feature adapted to illuminate the object. As outlined above, the illumination feature may be generated by ambient light or by the at least one illumination source. The reflection pattern may comprise at least one feature corresponding to at least one feature of the illumination pattern. The reflection pattern may comprise, in comparison to the illumination pattern, at least one distorted pattern, wherein the distortion depends on the distance of the object, such as surface properties of the object. The evaluation device may be adapted to select at least one feature of the reflection pattern and to determine the longitudinal region of the selected feature of the reflection pattern by evaluating the combined signal Q from the sensor signals, as described above.

For example, the reference image may be an image of the illumination pattern at an image plane at a position of the illumination source. The evaluation device may be adapted to determine the displacement region in the reference image corresponding to the longitudinal region of the selected feature of the reflection pattern. The evaluation device may be adapted to match the selected feature of the reflection pattern with at least one feature of the reference pattern within the displacement region. The illumination source and the sensor element may be separated by a fixed distance.

For example, the detector may comprise at least two sensor elements each having a matrix of optical sensors. At least one first sensor element and at least one second sensor element may be positioned at different spatial positions. A relative distance between the first sensor element and the second element may be fixed. The at least one first sensor element may be adapted to determine at least one first reflection pattern, in particular at least one first reflection feature, and the at least one second sensor element may be adapted to determine at least one second reflection pattern, in particular at least one second reflection feature. The evaluation device may be adapted to select at least one image determined by the first sensor element or the second sensor element as reflection image and to select at least one image determined by the other one of the first sensor element or the second sensor element as reference image. The evaluation device may be adapted to select the at least one reflection feature in the reflection pattern and to determine the longitudinal region of the selected feature by evaluating the combined signal Q from the sensor signals. The evaluation device may be adapted to determine the displacement region in the reference image corresponding to the longitudinal region of the selected feature of the reflection pattern. The evaluation device may be adapted to match the selected feature of the reflection pattern with at least one feature of the reference pattern within the displacement region.

As outlined above, the detector may further comprise one or more additional elements such as one or more additional optical elements. Further, the detector may fully or partially be integrated into at least one housing.

In a further aspect of the present invention, a detector system for determining a position of at least one object is disclosed. The detector system comprises at least one detector according to the present invention, such as according to one or more of the embodiments disclosed above or according to one or more of the embodiments disclosed in further detail below. The detector system further comprises at least one beacon device adapted to direct at least one light beam towards the detector, wherein the beacon device is at least one of attachable to the object, holdable by the object and integratable into the object. Further details regarding the beacon device will be given below, including potential embodiments thereof. Thus, the at least one beacon device may be or may comprise at least one active beacon device, comprising one or more illumination sources such as one or more light sources like lasers, LEDs, light bulbs or the like. As an example, the light emitted by the illumination source may have a wavelength of 300-500 nm. Alternatively, as outlined above, the infrared spectral range may be used, such as in the range of 780 nm to 3.0 µm. Specifically, the near infrared region where silicon photodiodes are applicable specifically in the range of 700 nm to 1000 nm may be used. The light emitted by the one or more beacon devices may be non-modulated or may be modulated, as outlined above, in order to distinguish two or more light beams. Additionally or alternatively, the at least one beacon device may be adapted to reflect one or more light beams towards the detector, such as by comprising one or more reflective elements. Further, the at least one beacon device may be or may comprise one or more scattering elements adapted for scattering a light beam. Therein, elastic or inelastic scattering may be used. In case the at least one beacon device is adapted to reflect and/or scatter a primary light beam towards the detector, the beacon device may be adapted to leave the spectral properties of the light beam unaffected or, alternatively, may be adapted to change the spectral properties of the light beam, such as by modifying a wavelength of the light beam.

In a further aspect of the present invention, a human-machine interface for exchanging at least one item of information between a user and a machine is disclosed. The human-machine interface comprises at least one detector system according to the embodiments disclosed above and/or according to one or more of the embodiments disclosed in further detail below. Therein, the at least one beacon device is adapted to be at least one of directly or indirectly attached to the user or held by the user. The human-machine interface is designed to determine at least one position of the user by means of the detector system, wherein the human-machine interface is designed to assign to the position at least one item of information.

In a further aspect of the present invention, an entertainment device for carrying out at least one entertainment function is disclosed. The entertainment device comprises at least one human-machine interface according to the embodiment disclosed above and/or according to one or more of the embodiments disclosed in further detail below. The entertainment device is configured to enable at least one item of information to be input by a player by means of the human-machine interface. The entertainment device is further configured to vary the entertainment function in accordance with the information.

In a further aspect of the present invention, a tracking system for tracking a position of at least one movable object is disclosed. The tracking system comprises at least one detector system according to one or more of the embodiments referring to a detector system as disclosed above and/or as disclosed in further detail below. The tracking system further comprises at least one track controller. The track controller is adapted to track a series of positions of the object at specific points in time.

In a further aspect of the present invention, a camera for imaging at least one object is disclosed. The camera comprises at least one detector according to any one of the embodiments referring to a detector as disclosed above or as disclosed in further detail below.

In a further aspect of the present invention, a scanning system for determining a depth profile of a scenery, which may also imply determining at least one position of at least one object, is provided. The scanning system comprises at least one detector according to the present invention, such as at least one detector as disclosed in one or more of the embodiments listed above and/or as disclosed in one or more of the embodiments below. The scanning system further comprises at least one illumination source adapted to scan the scenery with at least one light beam, which may also be referred to as an illumination light beam or scanning light beam. As used herein, the term "scenery" generally refers to a two-dimensional or three-dimensional range which is visible by the detector, such that at least one geometric or spatial property of the two-dimensional or three-dimensional range may be evaluated with the detector. As further used herein, the term "scan" generally refers to a consecutive measurement in different regions. Thus, the scanning specifically may imply at least one first measurement with the illumination light beam being oriented or directed in a first fashion, and at least one second measurement with the illumination light beam being oriented or directed in a second fashion which is different from the first fashion. The scanning may be a continuous scanning or a stepwise scanning. Thus, in a continuous or stepwise fashion, the illumination light beam may be directed into different regions of the scenery, and the detector may be detected to generate at least one item of information, such as at least one longitudinal coordinate, for each region. As an example, for scanning an object, one or more illumination light beams may, continuously or in a stepwise fashion, create light spots on the surface of the object, wherein longitudinal coordinates are generated for the light spots. Alternatively, however, a light pattern may be used for scanning. The scanning may be a point scanning or a line scanning or even a scanning with more complex light patterns. The illumination source of the scanning system may be distinct from the optional illumination source of the detector. Alternatively, however, the illumination source of the scanning system may also be fully or partially identical with or integrated into the at least one optional illumination source of the detector.

Thus, the scanning system may comprise at least one illumination source which is adapted to emit the at least one light beam being configured for the illumination of the at least one dot located at the at least one surface of the at least one object. As used herein, the term "dot" refers to an area, specifically a small area, on a part of the surface of the object which may be selected, for example by a user of the scanning system, to be illuminated by the illumination source. Preferably, the dot may exhibit a size which may, on one hand, be as small as possible in order to allow the scanning system to determine a value for the distance between the illumination source comprised by the scanning system and the part of the surface of the object on which the dot may be located as exactly as possible and which, on the other hand, may be as large as possible in order to allow the user of the scanning system or the scanning system itself, in particular by an automatic procedure, to detect a presence of the dot on the related part of the surface of the object.

For this purpose, the illumination source may comprise an artificial illumination source, in particular at least one laser source and/or at least one incandescent lamp and/or at least one semiconductor light source, for example, at least one light-emitting diode, in particular an organic and/or inorganic light-emitting diode. As an example, the light emitted by the illumination source may have a wavelength of 300-500 nm. Additionally or alternatively, light in the infrared spectral range may be used, such as in the range of 780 nm to 3.0 µm. Specifically, the light in the part of the near infrared region where silicon photodiodes are applicable specifically in the range of 700 nm to 1000 nm may be used.

On account of their generally defined beam profiles and other properties of handleability, the use of at least one laser source as the illumination source is particularly preferred. Herein, the use of a single laser source may be preferred, in particular in a case in which it may be important to provide a compact scanning system that might be easily storable and transportable by the user. The illumination source may, thus, preferably be a constituent part of the detector and may, therefore, in particular be integrated into the detector, such as into the housing of the detector. In a preferred embodiment, particularly the housing of the scanning system may comprise at least one display configured for providing distance-related information to the user, such as in an easy-to-read manner. In a further preferred embodiment, particularly the housing of the scanning system may, in addition, comprise at least one button which may be configured for operating at least one function related to the scanning system, such as for setting one or more operation modes. In a further preferred embodiment, particularly the housing of the scanning system may, in addition, comprise at least one fastening unit which may be configured for fastening the scanning system to a further surface, such as a rubber foot, a base plate or a wall holder, such as a base plate or holder comprising a magnetic material, in particular for increasing the accuracy of the distance measurement and/or the handleability of the scanning system by the user.

Particularly, the illumination source of the scanning system may, thus, emit a single laser beam which may be configured for the illumination of a single dot located at the surface of the object. By using at least one of the detectors according to the present invention at least one item of information about the distance between the at least one dot and the scanning system may, thus, be generated. Hereby, preferably, the distance between the illumination system as comprised by the scanning system and the single dot as generated by the illumination source may be determined, such as by employing the evaluation device as comprised by the at least one detector. However, the scanning system may, further, comprise an additional evaluation system which may, particularly, be adapted for this purpose. Alternatively or in addition, a size of the scanning system, in particular of the housing of the scanning system, may be taken into account and, thus, the distance between a specific point on the housing of the scanning system, such as a front edge or a back edge of the housing, and the single dot may, alternatively, be determined. The illumination source may be adapted to generate and/or to project a cloud of points, for example the illumination source may comprise one or more of at least one digital light processing (DLP) projector, at least one LCoS projector, at least one spatial light modulator; at least one diffractive optical element; at least one array of light emitting diodes; at least one array of laser light sources.

Alternatively, the illumination source of the scanning system may emit two individual laser beams which may be configured for providing a respective angle, such as a right angle, between the directions of an emission of the beams, whereby two respective dots located at the surface of the same object or at two different surfaces at two separate objects may be illuminated. However, other values for the respective angle between the two individual laser beams may also be feasible. This feature may, in particular, be employed for indirect measuring functions, such as for deriving an indirect distance which may not be directly accessible, such as due to a presence of one or more obstacles between the scanning system and the dot or which may otherwise be hard to reach. By way of example, it may, thus, be feasible to determine a value for a height of an object by measuring two individual distances and deriving the height by using the Pythagoras formula. In particular for being able to keep a predefined level with respect to the object, the scanning system may, further, comprise at least one leveling unit, in particular an integrated bubble vial, which may be used for keeping the predefined level by the user.

As a further alternative, the illumination source of the scanning system may emit a plurality of individual laser beams, such as an array of laser beams which may exhibit a respective pitch, in particular a regular pitch, with respect to each other and which may be arranged in a manner in order to generate an array of dots located on the at least one surface of the at least one object. For this purpose, specially adapted optical elements, such as beam-splitting devices and mirrors, may be provided which may allow a generation of the described array of the laser beams. In particular, the illumination source may be directed to scan an area or a volume by using one or more movable mirrors to redirect the light beam in a periodic or non-periodic fashion.

Thus, the scanning system may provide a static arrangement of the one or more dots placed on the one or more surfaces of the one or more objects. Alternatively, the illumination source of the scanning system, in particular the one or more laser beams, such as the above described array of the laser beams, may be configured for providing one or more light beams which may exhibit a varying intensity over time and/or which may be subject to an alternating direction of emission in a passage of time, in particular by moving one or more mirrors, such as the micro-mirrors comprised within the mentioned array of micro-mirrors. As a result, the illumination source may be configured for scanning a part of the at least one surface of the at least one object as an image by using one or more light beams with alternating features as generated by the at least one illumination source of the scanning system. In particular, the scanning system may, thus, use at least one row scan and/or line scan, such as to scan the one or more surfaces of the one or more objects sequentially or simultaneously. Thus, the scanning system may be adapted to measure angles by measuring three or more dots, or the scanning system may be adapted to measure corners or narrow regions such as a gable of a roof, which may be hardly accessible using a conventional measuring stick. As non-limiting examples, the scanning system may be used in safety laser scanners, e.g. in production environments, and/or in 3D-scanning devices as used for determining the shape of an object, such as in connection to 3D-printing, body scanning, quality control, in construction applications, e.g. as range meters, in logistics applications, e.g. for determining the size or volume of a parcel, in household applications, e.g. in robotic vacuum cleaners or lawn mowers, or in other kinds of applications which may include a scanning step. As non-limiting examples, the scanning system may be used in industrial safety curtain applications. As non-limiting examples, the scanning system may be used to perform sweeping, vacuuming, mopping, or waxing functions, or yard or garden care functions such as mowing or raking. As non-limiting examples, the scanning system may employ an LED illumination source with collimated optics and may be adapted to shift the frequency of the illumination source to a different frequency to obtain more accurate results and/or employ a filter to attenuate certain frequencies while transmitting others. As non-limiting examples, the scanning system and/or the illumination source may be rotated as a whole or rotating only a particular optics package such as a mirror, beam splitter or the like, using a dedicated motor as such that in operation, the scanning system may have a full 360 degree view or even be moved and or rotated out of plane to further increase the scanned area. Further, the illumination source may be actively aimed in a predetermined direction. Further, to allow the rotation of wired electrical systems, slip rings, optical data transmission, or inductive couplings may be employed.

As a non-limiting example, the scanning system may be attached to a tripod and point towards an object or region with several corners and surfaces. One or more flexibly movable laser sources are attached to the scanning system. The one or more laser sources are moved as such that they illuminate points of interest. The position of the illuminated points with respect to the scanning system is measured when pressing a designated button on the scanning system and the position information is transmitted via a wireless interface to a mobile phone. The position information is stored in a mobile phone application. The laser sources are moved to illuminate further points of interest the position of which are measured and transmitted to the mobile phone application. The mobile phone application may transform the set of points into a 3d model by connecting adjacent points with planar surfaces. The 3d model may be stored and processed further. The distances and or angles between the measured points or surfaces may be displayed directly on a display attached to a scanning system or on the mobile phone to which the position information is transmitted.

As a non-limiting example, a scanning system may comprise two or more flexible movable laser sources to project points and further one movable laser source projecting a line. The line may be used to arrange the two or more laser spots along a line and the display of the scanning system may display the distance between the two or more laser spots that may be arranged along the line, such as at equal distance. In the case of two laser spots, a single laser source may be used whereas the distance of the projected points is modified using one or more beam-splitters or prisms, where a beam-splitter or prism can be moved as such that the projected laser spots move apart or closer together. Further, the scanning system may be adapted to project further patterns such as a right angle, a circle, a square, a triangle, or the like, along which a measurement can be done by projecting laser spots and measuring their position.

As a non-limiting example, the scanning system may be adapted as a line scanning device. In particular, the scanning system may comprise at least one sensor line or row. Triangulation systems require a sufficient baseline such that in the near filed no detection may be possible. Near field detection may be possible if the laser spot is tilted in direction of the transfer device. However, the tilting leads to that the light spot will move out of the field of view which limits detection in far field regions. These near field and far field problems can be overcome by using the detector according to the present invention. In particular, the detector may comprise a CMOS line of optical sensors. The scanning system may be adapted to detect a plurality of light beams propagating from the object to the detector on the CMOS line. The light beams may be generated at different positions on the object or by movement of the illumination source. The scanning system may be adapted to determine at least one longitudinal coordinate for each of the light points by determining the quotient signal Q as described above and in more detail below.

As a non-limiting example, the scanning system may be adapted to support the work with tools, such as wood or metal processing tools, such as a saw, a driller, or the like. Thus, the scanning system may be adapted to measure the distance in two opposite directions and display the two measured distances or the sum of the distances in a display. Further, the scanning system may be adapted to measure the distance to the edge of a surface as such that when the scanning system is placed on the surface, a laser point is moved automatically away from the scanning system along the surface, until the distance measurement shows a sudden change due to a corner or the edge of a surface. This makes it possible to measure the distance of the end of a wood plank while the scanning system is placed on the plank but remote from its end. Further, the scanning system may measure the distance of the end of a plank in one direction and project a line or circle or point in a designated distance in the opposite direction. The scanning system may be adapted to project the line or circle or point in a distance depending on the distance measured in the opposite direction such as depending on a predetermined sum distance. This allows working with a tool such as a saw or driller at the projected position while placing the scanning system in a safe distance from the tool and simultaneously perform a process using the tool in a predetermined distance to the edge of the plank. Further, the scanning system may be adapted to project points or lines or the like in two opposite directions in a predetermined distance. When the sum of the distances is changed, only one of the projected distances changes.

As a non-limiting example, the scanning system may be adapted to be placed onto a surface, such as a surface on which a task is performed, such as cutting, sawing, drilling, or the like, and to project a line onto the surface in a predetermined distance that can be adjusted such as with buttons on the scanning system.

As non-limiting examples, the scanning system may be used in safety laser scanners, e.g. in production environments, and/or in 3D-scanning devices as used for determining the shape of an object, such as in connection to 3D-printing, body scanning, quality control, in construction applications, e.g. as range meters, in logistics applications, e.g. for determining the size or volume of a parcel, in household applications, e.g. in robotic vacuum cleaners or lawn mowers, or in other kinds of applications which may include a scanning step.

The transfer device can, as explained above, be designed to feed light propagating from the object to the detector to the optical sensor, preferably successively. As explained above, this feeding can optionally be effected by means of imaging or else by means of non-imaging properties of the transfer device. In particular the transfer device can also be designed to collect the electromagnetic radiation before the latter is fed to the optical sensor. The transfer device can also be wholly or partly a constituent part of at least one optional illumination source, for example by the illumination source being designed to provide a light beam having defined optical properties, for example having a defined or precisely known beam profile, for example at least one linear combination of Gaussian beams, in particular at least one laser beam having a known beam profile.

For potential embodiments of the optional illumination source, reference may be made to WO 2012/110924 A1. Still, other embodiments are feasible. Light emerging from the object can originate in the object itself, but can also optionally have a different origin and propagate from this origin to the object and subsequently toward the transversal and/or longitudinal optical sensor. The latter case can be effected for example by at least one illumination source being used. This illumination source can for example be or comprise an ambient illumination source and/or may be or may comprise an artificial illumination source. By way of example, the detector itself can comprise at least one illumination source, for example at least one laser and/or at least one incandescent lamp and/or at least one semiconductor illumination source, for example, at least one light-emitting diode, in particular an organic and/or inorganic light-emitting diode. On account of their generally defined beam profiles and other properties of handleability, the use of one or a plurality of lasers as illumination source or as part thereof, is particularly preferred. The illumination source itself can be a constituent part of the detector or else be formed independently of the detector. The illumination source can be integrated in particular into the detector, for example a housing of the detector. Alternatively or additionally, at least one illumination source can also be integrated into the at least one beacon device or into one or more of the beacon devices and/or into the object or connected or spatially coupled to the object.

The light emerging from the one or more optional beacon devices can accordingly, alternatively or additionally from the option that said light originates in the respective beacon device itself, emerge from the illumination source and/or be excited by the illumination source. By way of example, the electromagnetic light emerging from the beacon device can be emitted by the beacon device itself and/or be reflected by the beacon device and/or be scattered by the beacon device before it is fed to the detector. In this case, emission and/or scattering of the electromagnetic radiation can be effected without spectral influencing of the electromagnetic radiation or with such influencing. Thus, by way of example, a wavelength shift can also occur during scattering, for example according to Stokes or Raman. Furthermore, emission of light can be excited, for example, by a primary illumination source, for example by the object or a partial region of the object being excited to generate luminescence, in particular phosphorescence and/or fluorescence. Other emission processes are also possible, in principle. If a reflection occurs, then the object can have for example at least one reflective region, in particular at least one reflective surface. Said reflective surface can be a part of the object itself, but can also be for example a reflector which is connected or spatially coupled to the object, for example a reflector plaque connected to the object. If at least one reflector is used, then it can in turn also be regarded as part of the detector which is connected to the object, for example, independently of other constituent parts of the detector.

The beacon devices and/or the at least one optional illumination source generally may emit light in at least one of: the ultraviolet spectral range, preferably in the range of 200 nm to 380 nm; the visible spectral range (380 nm to 780 nm); the infrared spectral range, preferably in the range of 780 nm to 3.0 micrometers, more preferably in the part of the near infrared region where silicon photodiodes are applicable specifically in the range of 700 nm to 1000 nm. For thermal imaging applications the target may emit light in the far infrared spectral range, preferably in the range of 3.0 micrometers to 20 micrometers. For example, the at least one illumination source is adapted to emit light in the visible spectral range, preferably in the range of 500 nm to 780 nm, most preferably at 650 nm to 750 nm or at 690 nm to 700 nm. For example, the at least one illumination source is adapted to emit light in the infrared spectral range. Other options, however, are feasible.

The feeding of the light beam to the optical sensor can be effected in particular in such a way that a light spot, for example having a round, oval or differently configured cross section, is produced on the optional sensor area of the optical sensor. By way of example, the detector can have a visual range, in particular a solid angle range and/or spatial range, within which objects can be detected. Preferably, the transfer device may be designed in such a way that the light spot, for example in the case of an object arranged within a visual range of the detector, is arranged completely on a sensor region and/or on a sensor area of the optical sensor. By way of example, a sensor area can be chosen to have a corresponding size in order to ensure this condition.

In a further aspect, the present invention discloses a method for determining a position of at least one object by using a detector, such as a detector according to the present invention, such as according to one or more of the embodiments referring to a detector as disclosed above or as disclosed in further detail below. Still, other types of detectors may be used. The method comprises the following method steps, wherein the method steps may be performed in the given order or may be performed in a different order. Further, one or more additional method steps may be present which are not listed. Further, one, more than one or even all of the method steps may be performed repeatedly.

The method comprises the following method steps:
generating at least two sensor signals in response to an illumination of at least one sensor element having a matrix of optical sensors by at least one reflection light beam propagating from the object to the detector, the optical sensors each having a light-sensitive area;
determining at least one reflection image by using the sensor element;
selecting at least one reflection feature of the reflection image and evaluating the sensor signals by using at least one evaluation device, thereby, determining at least one longitudinal region of the selected reflection feature, wherein the evaluating comprises evaluating a combined signal Q from the sensor signals;
determining at least one displacement region in at least one reference image corresponding to the longitudinal region;
matching the selected reflection feature with at least one reference feature within the displacement region.

For details, options and definitions, reference may be made to the detector as discussed above. Thus, specifically, as outlined above, the method may comprise using the detector according to the present invention, such as according to one or more of the embodiments given above or given in further detail below.

The method may further comprise determining a displacement of the matched reference feature and the selected reflection feature. A longitudinal information of the matched feature may be determined using a predetermined relationship between a longitudinal coordinate and the displacement.

The deriving of the combined signal Q may comprise one or more of dividing the sensor signals, dividing multiples of the sensor signals, dividing linear combinations of the sensor signals.

In a further aspect of the present invention, use of the detector according to the present invention, such as according to one or more of the embodiments given above or given in further detail below, is proposed, for a purpose of use, selected from the group consisting of: a position measurement in traffic technology; an entertainment application; a security application; a surveillance application; a safety application; a human-machine interface application; a tracking application; a photography application; an imaging application or camera application; a mapping application for generating maps of at least one space; a homing or tracking beacon detector for vehicles; an outdoor application; a mobile application; a communication application; a machine vision application; a robotics application; a quality control application; a manufacturing application.

The object generally may be a living or non-living object. The detector or the detector system even may comprise the at least one object, the object thereby forming part of the detector system. Preferably, however, the object may move independently from the detector, in at least one spatial dimension. The object generally may be an arbitrary object. In one embodiment, the object may be a rigid object. Other embodiments are feasible, such as embodiments in which the object is a non-rigid object or an object which may change its shape.

As will be outlined in further detail below, the present invention may specifically be used for tracking positions and/or motions of a person, such as for the purpose of controlling machines, gaming or simulation of sports. In this or other embodiments, specifically, the object may be selected from the group consisting of: an article of sports equipment, preferably an article selected from the group consisting of a racket, a club, a bat; an article of clothing; a hat; a shoe.

Thus, generally, the devices according to the present invention, such as the detector, may be applied in various fields of uses. Specifically, the detector may be applied for a purpose of use, selected from the group consisting of: a position measurement in traffic technology; an entertainment application; a security application; a human-machine interface application; a tracking application; a photography application; a mapping application for generating maps of at least one space, such as at least one space selected from the group of a room, a building and a street; a mobile application; a webcam; an audio device; a dolby surround audio system; a computer peripheral device; a gaming application; a camera or video application; a security application; a surveillance application; an automotive application; a transport application; a medical application; a sports' application; a machine vision application; a vehicle application; an airplane application; a ship application; a spacecraft application; a building application; a construction application; a cartography application; a manufacturing application. Additionally or alternatively, applications in local and/or global positioning systems may be named, especially landmark-based positioning and/or navigation, specifically for use in cars or other vehicles (such as trains, motorcycles, bicycles, trucks for cargo transportation), robots or for use by pedestrians. Further, indoor positioning systems may be named as potential applications, such as for household applications and/or for robots used in manufacturing, logistics, surveillance, or maintenance technology.

The devices according to the present invention may be used in mobile phones, tablet computers, laptops, smart panels or other stationary or mobile or wearable computer or communication applications. Thus, the devices according to the present invention may be combined with at least one active light source, such as a light source emitting light in the visible range or infrared spectral range, in order to enhance performance. Thus, as an example, the devices according to the present invention may be used as cameras and/or sensors, such as in combination with mobile software for scanning and/or detecting environment, objects and living beings. The devices according to the present invention may even be combined with 2D cameras, such as conventional cameras, in order to increase imaging effects. The devices according to the present invention may further be used for surveillance and/or for recording purposes or as input devices to control mobile devices, especially in combination with voice and/or gesture recognition. Thus, specifically, the devices according to the present invention acting as human-machine interfaces, also referred to as input devices, may be used in mobile applications, such as for controlling other electronic devices or components via the mobile device, such as the mobile phone. As an example, the mobile application including at least one device according to the present invention may be used for controlling a television set, a game console, a music player or music device or other entertainment devices.

Further, the devices according to the present invention may be used in webcams or other peripheral devices for computing applications. Thus, as an example, the devices according to the present invention may be used in combination with software for imaging, recording, surveillance, scanning or motion detection. As outlined in the context of the human-machine interface and/or the entertainment device, the devices according to the present invention are particularly useful for giving commands by facial expressions and/or body expressions. The devices according to the present invention can be combined with other input generating devices like e.g. mouse, keyboard, touchpad, microphone etc. Further, the devices according to the present invention may be used in applications for gaming, such as by using a webcam. Further, the devices according to the present invention may be used in virtual training applications and/or video conferences. Further, devices according to the present invention may be used to recognize or track hands, arms, or objects used in a virtual or augmented reality application, especially when wearing head-mounted displays.

Further, the devices according to the present invention may be used in mobile audio devices, television devices and gaming devices, as partially explained above. Specifically, the devices according to the present invention may be used as controls or control devices for electronic devices, entertainment devices or the like. Further, the devices according to the present invention may be used for eye detection or eye tracking, such as in 2D- and 3D-display techniques, especially with transparent displays for augmented reality applications and/or for recognizing whether a display is being looked at and/or from which perspective a display is being looked at. Further, devices according to the present invention may be used to explore a room, boundaries, obstacles, in connection with a virtual or augmented reality application, especially when wearing a head-mounted display.

Further, the devices according to the present invention may be used in or as digital cameras such as DSC cameras and/or in or as reflex cameras such as SLR cameras. For these applications, reference may be made to the use of the devices according to the present invention in mobile applications such as mobile phones, as disclosed above.

Further, the devices according to the present invention may be used for security or surveillance applications. Thus, as an example, at least one device according to the present invention can be combined with one or more digital and/or analogue electronics that will give a signal if an object is within or outside a predetermined area (e.g. for surveillance applications in banks or museums). Specifically, the devices according to the present invention may be used for optical encryption. Detection by using at least one device according to the present invention can be combined with other detection devices to complement wavelengths, such as with IR, x-ray, UV-VIS, radar or ultrasound detectors. The devices according to the present invention may further be combined with an active infrared light source to allow detection in low light surroundings. The devices according to the present invention are generally advantageous as compared to active detector systems, specifically since the devices according to the present invention avoid actively sending signals which may be detected by third parties, as is the case e.g. in radar applications, ultrasound applications, LIDAR or similar active detector devices. Thus, generally, the devices according to the present invention may be used for an unrecognized and undetectable tracking of moving objects. Additionally, the devices according to the present invention generally are less prone to manipulations and irritations as compared to conventional devices.

Further, given the ease and accuracy of 3D detection by using the devices according to the present invention, the devices according to the present invention generally may be used for facial, body and person recognition and identification. Therein, the devices according to the present invention may be combined with other detection means for identification or personalization purposes such as passwords, finger prints, iris detection, voice recognition or other means. Thus, generally, the devices according to the present invention may be used in security devices and other personalized applications.

Further, the devices according to the present invention may be used as 3D barcode readers for product identification.

In addition to the security and surveillance applications mentioned above, the devices according to the present invention generally can be used for surveillance and monitoring of spaces and areas. Thus, the devices according to the present invention may be used for surveying and monitoring spaces and areas and, as an example, for triggering or executing alarms in case prohibited areas are violated. Thus, generally, the devices according to the present invention may be used for surveillance purposes in building surveillance or museums, optionally in combination with other types of sensors, such as in combination with motion or heat sensors, in combination with image intensifiers or image enhancement devices and/or photomultipliers. Further, the devices according to the present invention may be used in public spaces or crowded spaces to detect potentially hazardous activities such as commitment of crimes such as theft in a parking lot or unattended objects such as unattended baggage in an airport.

Further, the devices according to the present invention may advantageously be applied in camera applications such as video and camcorder applications. Thus, the devices according to the present invention may be used for motion capture and 3D-movie recording. Therein, the devices according to the present invention generally provide a large number of advantages over conventional optical devices. Thus, the devices according to the present invention generally require a lower complexity with regard to optical components. Thus, as an example, the number of lenses may be reduced as compared to conventional optical devices, such as by providing the devices according to the present invention having one lens only. Due to the reduced complexity, very compact devices are possible, such as for mobile use. Conventional optical systems having two or more lenses with high quality generally are voluminous, such as due to the general need for voluminous beam-splitters. Further, the devices according to the present invention generally may be used for focus/autofocus devices, such as autofocus cameras. Further, the devices according to the present invention may also be used in optical microscopy, especially in confocal microscopy.

Further, the devices according to the present invention generally are applicable in the technical field of automotive technology and transport technology. Thus, as an example, the devices according to the present invention may be used as distance and surveillance sensors, such as for adaptive cruise control, emergency brake assist, lane departure warning, surround view, blind spot detection, traffic sign detection, traffic sign recognition, lane recognition, rear cross traffic alert, light source recognition for adapting the head light intensity and range depending on approaching traffic or vehicles driving ahead, adaptive frontlighting systems, automatic control of high beam head lights, adaptive cut-off lights in front light systems, glare-free high beam front lighting systems, marking animals, obstacles, or the like by headlight illumination, rear cross traffic alert, and other driver assistance systems such as advanced driver assistance systems, or other automotive and traffic applications. Further, devices according to the present invention may be used in driver assistance systems anticipating maneuvers of the driver beforehand for collision avoidance or the like. Further, the devices according to the present invention can also be used for velocity and/or acceleration measurements, such as by analyzing a first and second time-derivative of position information gained by using the detector according to the present invention. This feature generally may be applicable in automotive technology, transportation technology or general traffic technology. Applications in other fields of technology are feasible. A specific application in an indoor positioning system may be the detection of positioning of passengers in transportation, more specifically to electronically control the use of safety systems such as airbags. The use of an airbag may be prevented in case the passenger is located as such, that the use of an airbag will cause a severe injury. Further, in vehicles such as cars, trains, planes or the like, especially in autonomous vehicles, devices according to the present invention may be used to determine whether a driver pays attention to the traffic or is distracted, or asleep, or tired, or incapable of driving such as due to the consumption of alcohol or the like.

In these or other applications, generally, the devices according to the present invention may be used as stand-alone devices or in combination with other sensor devices, such as in combination with radar and/or ultrasonic devices. Specifically, the devices according to the present invention may be used for autonomous driving and safety issues. Further, in these applications, the devices according to the present invention may be used in combination with infrared sensors, radar sensors, which are sonic sensors, two-dimensional cameras or other types of sensors. In these applications, the generally passive nature of the devices according to the present invention is advantageous. Thus, since the devices according to the present invention generally do not require emitting signals, the risk of interference of active sensor signals with other signal sources may be avoided. The devices according to the present invention specifically may be used in combination with recognition software, such as standard image recognition software. Thus, signals and data as provided by the devices according to the present invention typically are readily processable and, therefore, generally require lower calculation power than established 3D measurement systems. Given the low space demand, the devices according to the present invention such as cameras may be placed at virtually any place in a vehicle, such as on or behind a window screen, on a front hood, on bumpers, on lights, on mirrors or other places and the like. Various detectors according to the present invention such as one or more detectors based on the effect disclosed within the present invention can be combined, such as in order to allow autonomously driving vehicles or in order to increase the performance of active safety concepts. Thus, various devices according to the present invention may be combined with one or more other devices according to the present invention and/or conventional sensors, such as in the windows like rear window, side window or front window, on the bumpers or on the lights.

A combination of at least one device according to the present invention such as at least one detector according to the present invention with one or more rain detection sensors is also possible. This is due to the fact that the devices according to the present invention generally are advantageous over conventional sensor techniques such as radar, specifically during heavy rain. A combination of at least one device according to the present invention with at least one conventional sensing technique such as radar may allow for a software to pick the right combination of signals according to the weather conditions.

Further, the devices according to the present invention generally may be used as break assist and/or parking assist and/or for speed measurements. Speed measurements can be integrated in the vehicle or may be used outside the vehicle, such as in order to measure the speed of other cars in traffic control. Further, the devices according to the present invention may be used for detecting free parking spaces in parking lots.

Further, the devices according to the present invention may be used in the fields of medical systems and sports. Thus, in the field of medical technology, surgery robotics, e.g. for use in endoscopes, may be named, since, as outlined above, the devices according to the present invention may require a low volume only and may be integrated into other devices. Specifically, the devices according to the present invention having one lens, at most, may be used for capturing 3D information in medical devices such as in endoscopes. Further, the devices according to the present invention may be combined with an appropriate monitoring software, in order to enable tracking and analysis of movements. This may allow an instant overlay of the position of a medical device, such as an endoscope or a scalpel, with results from medical imaging, such as obtained from magnetic resonance imaging, x-ray imaging, or ultrasound imaging. These applications are specifically valuable e.g. in medical treatments where precise location information is important such as in brain surgery and long-distance diagnosis and tele-medicine. Further, the devices according to the present invention may be used in 3D-body scanning. Body scanning may be applied in a medical context, such as in dental surgery, plastic surgery, bariatric surgery, or cosmetic plastic surgery, or it may be applied in the context of medical diagnosis such as in the diagnosis of myofascial pain syndrome, cancer, body dysmorphic disorder, or further diseases. Body scanning may further be applied in the field of sports to assess ergonomic use or fit of sports equipment. Further, the devices according to the present invention may be used in wearable robots such as in exoskeletons or prosthesis or the like.

Body scanning may further be used in the context of clothing, such as to determine a suitable size and fitting of clothes. This technology may be used in the context of tailor-made clothes or in the context of ordering clothes or shoes from the internet or at a self-service shopping device such as a micro kiosk device or customer concierge device. Body scanning in the context of clothing is especially important for scanning fully dressed customers.

Further, the devices according to the present invention may be used in the context of people counting systems, such as to count the number of people in an elevator, a train, a bus, a car, or a plane, or to count the number of people passing a hallway, a door, an aisle, a retail store, a stadium, an entertainment venue, a museum, a library, a public location, a cinema, a theater, or the like. Further, the 3D-function in the people counting system may be used to obtain or estimate further information about the people that are counted such as height, weight, age, physical fitness, or the like. This information may be used for business intelligence metrics, and/or for further optimizing the locality where people may be counted to make it more attractive or safe. In a retail environment, the devices according to the present invention in the context of people counting may be used to recognize returning customers or cross shoppers, to assess shopping behavior, to assess the percentage of visitors that make purchases, to optimize staff shifts, or to monitor the costs of a shopping mall per visitor. Further, people counting systems may be used for anthropometric surveys. Further, the devices according to the present invention may be used in public transportation systems for automatically charging passengers depending on the length of transport. Further, the devices according to the present invention may be used in playgrounds for children, to recognize injured children or children engaged in dangerous activities, to allow additional interaction with playground toys, to ensure safe use of playground toys or the like.

Further, the devices according to the present invention may be used in construction tools, such as a range meter that determines the distance to an object or to a wall, to assess whether a surface is planar, to align objects or place objects in an ordered manner, or in inspection cameras for use in construction environments or the like.

Further, the devices according to the present invention may be applied in the field of sports and exercising, such as for training, remote instructions or competition purposes. Specifically, the devices according to the present invention may be applied in the fields of dancing, aerobic, football, soccer, basketball, baseball, cricket, hockey, track and field, swimming, polo, handball, volleyball, rugby, sumo, judo, fencing, boxing, golf, car racing, laser tag, battlefield simulation etc. The devices according to the present invention can be used to detect the position of a ball, a bat, a sword, motions, etc., both in sports and in games, such as to monitor the game, support the referee or for judgment, specifically automatic judgment, of specific situations in sports, such as for judging whether a point or a goal actually was made.

Further, the devices according to the present invention may be used in the field of auto racing or car driver training or car safety training or the like to determine the position of a car or the track of a car, or the deviation from a previous track or an ideal track or the like.

The devices according to the present invention may further be used to support a practice of musical instruments, in particular remote lessons, for example lessons of string instruments, such as fiddles, violins, violas, celli, basses, harps, guitars, banjos, or ukuleles, keyboard instruments, such as pianos, organs, keyboards, harpsichords, harmoniums, or accordions, and/or percussion instruments, such as drums, timpani, marimbas, xylophones, vibraphones, bongos, congas, timbales, djembes or tablas.

The devices according to the present invention further may be used in rehabilitation and physiotherapy, in order to encourage training and/or in order to survey and correct movements. Therein, the devices according to the present invention may also be applied for distance diagnostics.

Further, the devices according to the present invention may be applied in the field of machine vision. Thus, one or more of the devices according to the present invention may be used e.g. as a passive controlling unit for autonomous driving and or working of robots. In combination with moving robots, the devices according to the present invention may allow for autonomous movement and/or autonomous detection of failures in parts. The devices according to the present invention may also be used for manufacturing and safety surveillance, such as in order to avoid accidents including but not limited to collisions between robots, production parts and living beings. In robotics, the safe and direct interaction of humans and robots is often an issue, as robots may severely injure humans when they are not recognized. Devices according to the present invention may help robots to position objects and humans better and faster and allow a safe interaction. Given the passive nature of the devices according to the present invention, the devices according to the present invention may be advantageous over active devices and/or may be used complementary to existing solutions like radar, ultrasound, 2D cameras, IR detection etc. One particular advantage of the devices according to the present invention is the low likelihood of signal interference. Therefore, multiple sensors can work at the same time in the same environment, without the risk of signal interference. Thus, the devices according to the present invention generally may be useful in highly automated production environments like e.g. but not limited to automotive, mining, steel, etc. The devices according to the present invention can also be used for quality control in production, e.g. in combination with other sensors like 2-D imaging, radar, ultrasound, IR etc., such as for quality control or other purposes. Further, the devices according to the present invention may be used for assessment of surface quality, such as for surveying the surface evenness of a product or the adherence to specified dimensions, from the range of micrometers to the range of meters. Other quality control applications are feasible. In a manufacturing environment, the devices according to the present invention are especially useful for processing natural products such as food or wood, with a complex 3-dimensional structure to avoid large amounts of waste material. Further, devices according to the present invention may be used to monitor the filling level of tanks, silos etc. Further, devices according to the present invention may be used to inspect complex products for missing parts, incomplete parts, loose parts, low quality parts, or the like, such as in automatic optical inspection, such as of printed circuit boards, inspection of assemblies or sub-assemblies, verification of engineered components, engine part inspections, wood quality inspection, label inspections, inspection of medical devices, inspection of product orientations, packaging inspections, food pack inspections, or the like.

Further, the devices according to the present invention may be used in vehicles, trains, airplanes, ships, spacecraft and other traffic applications. Thus, besides the applications mentioned above in the context of traffic applications, passive tracking systems for aircraft, vehicles and the like may be named. The use of at least one device according to the present invention, such as at least one detector according to the present invention, for monitoring the speed and/or the direction of moving objects is feasible. Specifically, the tracking of fast moving objects on land, sea and in the air including space may be named. The at least one device according to the present invention, such as the at least one detector according to the present invention, specifically may be mounted on a still-standing and/or on a moving device.

An output signal of the at least one device according to the present invention can be combined e.g. with a guiding mechanism for autonomous or guided movement of another object. Thus, applications for avoiding collisions or for enabling collisions between the tracked and the steered object are feasible. The devices according to the present invention generally are useful and advantageous due to the low calculation power required, the instant response and due to the passive nature of the detection system which generally is more difficult to detect and to disturb as compared to active systems, like e.g. radar. The devices according to the present invention are particularly useful but not limited to e.g. speed control and air traffic control devices. Further, the devices according to the present invention may be used in automated tolling systems for road charges.

The devices according to the present invention generally may be used in passive applications. Passive applications include guidance for ships in harbors or in dangerous areas, and for aircraft when landing or starting. Therein, fixed, known active targets may be used for precise guidance. The same can be used for vehicles driving on dangerous but well defined routes, such as mining vehicles. Further, the devices according to the present invention may be used to detect rapidly approaching objects, such as cars, trains, flying objects, animals, or the like. Further, the devices according to the present invention can be used for detecting velocities or accelerations of objects, or to predict the movement of an object by tracking one or more of its position, speed, and/or acceleration depending on time.

Further, as outlined above, the devices according to the present invention may be used in the field of gaming. Thus, the devices according to the present invention can be passive for use with multiple objects of the same or of different size, color, shape, etc., such as for movement detection in combination with software that incorporates the movement into its content. In particular, applications are feasible in implementing movements into graphical output. Further, applications of the devices according to the present invention for giving commands are feasible, such as by using one or more of the devices according to the present invention for gesture or facial recognition. The devices according to the present invention may be combined with an active system in order to work under e.g. low light conditions or in other situations in which enhancement of the surrounding conditions is required. Additionally or alternatively, a combination of one or more devices according to the present invention with one or more IR or VIS light sources is possible. A combination of a detector according to the present invention with special devices is also possible, which can be distinguished easily by the system and its software, e.g. and not limited to, a special color, shape, relative position to other devices, speed of movement, light, frequency used to modulate light sources on the device, surface properties, material used, reflection properties, transparency degree, absorption characteristics, etc. The device can, amongst other possibilities, resemble a stick, a racket, a club, a gun, a knife, a wheel, a ring, a steering wheel, a bottle, a ball, a glass, a vase, a spoon, a fork, a cube, a dice, a figure, a puppet, a teddy, a beaker, a pedal, a switch, a glove, jewelry, a musical instrument or an auxiliary device for playing a musical instrument, such as a plectrum, a drumstick or the like. Other options are feasible.

Further, the devices according to the present invention may be used to detect and/or track objects that emit light by themselves, such as due to high temperature or further light emission processes. The light emitting part may be an exhaust stream or the like. Further, the devices according to the present invention may be used to track reflecting objects and analyze the rotation or orientation of these objects.

Further, the devices according to the present invention generally may be used in the field of building, construction and cartography. Thus, generally, one or more devices according to the present invention may be used in order to measure and/or monitor environmental areas, e.g. countryside or buildings. Therein, one or more devices according to the present invention may be combined with other methods and devices or can be used solely in order to monitor progress and accuracy of building projects, changing objects, houses, etc. The devices according to the present invention can be used for generating three-dimensional models of scanned environments, in order to construct maps of rooms, streets, houses, communities or landscapes, both from ground or from air. Potential fields of application may be construction, cartography, real estate management, land surveying or the like. As an example, the devices according to the present invention may be used in drones or multicopters to monitor buildings, production sites, chimneys, agricultural production environments such as fields, production plants, or landscapes, to support rescue operations, to support work in dangerous environments, to support fire brigades in a burning location indoors or outdoors, or to find or monitor one or more persons or animals, or the like, or for entertainment purposes, such as a drone following and recording one or more persons doing sports such as skiing or cycling or the like, which could be realized by following a helmet, a mark, a beacon device, or the like. Devices according to the present invention could be used recognize obstacles, follow a predefined route, follow an edge, a pipe, a building, or the like, or to record a global or local map of the environment. Further, devices according to the present invention could be used for indoor or outdoor localization and positioning of drones, for stabilizing the height of a drone indoors where barometric pressure sensors are not accurate enough, or for the interaction of multiple drones such as concertized movements of several drones or recharging or refueling in the air or the like.

Further, the devices according to the present invention may be used within an interconnecting network of home appliances such as CHAIN (Cedec Home Appliances Interoperating Network) to interconnect, automate, and control basic appliance-related services in a home, e.g. energy or load management, remote diagnostics, pet related appliances, child related appliances, child surveillance, appliances related surveillance, support or service to elderly or ill persons, home security and/or surveillance, remote control of appliance operation, and automatic maintenance support. Further, the devices according to the present invention may be used in heating or cooling systems such as an air-conditioning system, to locate which part of the room should be brought to a certain temperature or humidity, especially depending on the location of one or more persons. Further, the devices according to the present invention may be used in domestic robots, such as service or autonomous robots which may be used for household chores. The devices according to the present invention may be used for a number of different purposes, such as to avoid collisions or to map the environment, but also to identify a user, to personalize the robot's performance for a given user, for security purposes, or for gesture or facial recognition. As an example, the devices according to the present invention may be used in robotic vacuum cleaners, floor-washing robots, dry-sweeping robots, ironing robots for ironing clothes, animal litter robots, such as dog or cat litter robots, charging robot for electrical vehicles, security robots that detect intruders, robotic lawn mowers, automated pool cleaners, rain gutter cleaning robots, robotic shopping carts, luggage carrying robots, line following robots, laundry robots, ironing robots, window washing robots, toy robots, patient monitoring robots, baby monitoring robots, elderly monitoring robots, children monitoring robots, transport robots, telepresence robots, professional service robots, programmable toy robots, pathfinder robots, social robots providing company to less mobile people, following robots, smart card following robots, psychotherapy robots, or robots translating speech to sign language or sign language to speech. In the context of less mobile people, such as elderly persons, household robots with the devices according to the present invention may be used for picking up objects, transporting objects, and interacting with the objects and the user in a safe way. Further, the devices according to the present invention may be used in humanoid robots, especially in the context of using humanoid hands to pick up or hold or place objects. Further, the devices according to the present invention may be used in combination with audio interfaces especially in combination with household robots which may serve as a digital assistant with interfaces to online or offline computer applications. Further, the devices according to the present invention may be used in robots that can control switches and buttons in industrial and household purposes. Further, the devices according to the present invention may be used in smart home robots such as Mayfield's Kuri. Further the devices according to the present invention may be used in robots operating with hazardous materials or objects or in dangerous environments. As a non-limiting example, the devices according to the present invention may be used in robots or unmanned remote-controlled vehicles to operate with hazardous materials such as chemicals or radioactive materials especially after disasters, or with other hazardous or potentially hazardous objects such as mines, unexploded arms, or the like, or to operate in or to investigate insecure environments such as near burning objects or post disaster areas or for manned or unmanned rescue operations in the air, in the sea, underground, or the like.

Further, devices according to the present invention may be used for the inspection of adhesive beads, sealing beads, or the like, such as to recognize disruptions, slubs, contractions, asymmetries, local defects, or the like. Further, devices according to the present invention may be used to count objects such as dry fruits on a conveyer belt, such as in difficult situations, such as when fruit of similar color and shape may be in direct contact with each other. Further, devices according to the present invention may be used in quality control of die cast or injection molded parts such as to ensure flawless casting or molding, recognize surface damages, worn out toolings or the like. Further, devices according to the present invention may be used for laser-scribing such as for quality control and positioning of the laser. Further, devices according to the present invention may be used for sorting systems, such as to detect position, rotation, and shape of an object, compare it to a database of objects, and classify the object. Further, devices according to the present invention may be used for stamping part inspection, packaging inspection, such as food and pharma packaging inspection, filament inspection, or the like.

Further, devices according to the present invention may be used for navigation purposes, where Global Positioning Systems (GPS) are not sufficiently reliable. GPS signals commonly use radio waves that are can be blocked or difficult to receive indoors or outdoors in valleys or in forests below the treeline. Further, especially in unmanned autonomous vehicles, the weight of the system may be critical.

Especially unmanned autonomous vehicles need high-speed position data for reliable feedback and stability of their control systems. Using devices according to the present invention may allow short time response and positioning without adding weight due to a heavy device.

Further, the devices according to the present invention may be used in household, mobile or entertainment devices, such as a refrigerator, a microwave, a washing machine, a window blind or shutter, a household alarm, an air condition devices, a heating device, a television, an audio device, a smart watch, a mobile phone, a phone, a dishwasher, a stove or the like, to detect the presence of a person, to monitor the contents or function of the device, or to interact with the person and/or share information about the person with further household, mobile or entertainment devices.

Further, the devices according to the present invention may be used to support elderly or disabled persons or persons with limited or no vision, such as in household chores or at work such as in devices for holding, carrying, or picking objects, or in a safety system with optical or acoustical signals signaling obstacles in the environment.

The devices according to the present invention may further be used in agriculture, for example to detect and sort out vermin, weeds, and/or infected crop plants, fully or in parts, wherein crop plants may be infected by fungus or insects. Further, for harvesting crops, the devices according to the present invention may be used to detect animals, such as deer, which may otherwise be harmed by harvesting devices. Further, the devices according to the present invention may be used to monitor the growth of plants in a field or greenhouse, in particular to adjust the amount of water or fertilizer or crop protection products for a given region in the field or greenhouse or even for a given plant. Further, in agricultural biotechnology, the devices according to the present invention may be used to monitor the size and shape of plants.

Further, devices according to the present invention may be used to automatically remove weeds such as with mechanical means, such as to avoid the use of herbicides. Further, devices according to the present invention may be used in the field of agriculture, in particular to detect and/or locate specific insects such as to decide whether or not to apply a crop protection or fertilization substance, such as to reduce the amount of applied substance or to protect specific groups of animals such as bees.

Further, devices according to the present invention may be used to guide users during a shaving, hair cutting, or cosmetics procedure, or the like. Further, devices according to the present invention may be used to record or monitor what is played on an instrument, such as a violin. Further, devices according to the present invention may be used in smart household appliances such as a smart refrigerator, such as to monitor the contents of the refrigerator and transmit notifications depending on the contents. Further, devices according to the present invention may be used for monitoring or tracking populations of humans, animals, or plants, such as deer or tree populations in forests. Further, devices according to the present invention may be used in harvesting machines, such as for harvesting crops, flowers or fruits, such as grapes, corn, hops, apples, grains, rice, strawberries, asparagus, tulips, roses, soy beans, or the like. Further, devices according to the present invention may be used to monitor the growth of plants, animals, algae, fish, or the like, such as in breeding, food production, agriculture or research applications, to control irrigation, fertilization, humidity, temperature, use of herbicides, insecticides, fungicides, rodenticides, or the like. Further, devices according to the present invention may be used in feeding machines for animals or pets, such as for cows, pigs, cats, dogs, birds, fish, or the like. Further, devices according to the present invention may be used in animal product production processes, such as for collecting milk, eggs, fur, meat, or the like, such as in automated milking or butchering processes. Further, devices according to the present invention may be used for automated seeding machines, or sowing machines, or planting machines such as for planting corn, garlic, trees, salad or the like. Further, devices according to the present invention may be used to assess or monitor weather phenomena, such as clouds, fog, or the like, or to warn from danger of avalanches, tsunamis, gales, earthquakes, thunder storms, or the like. Further, devices according to the present invention may be used to measure motions, shocks, concussions, or the like such as to monitor earthquake risk. Further, devices according to the present invention may be used in traffic technology to monitor dangerous crossings, to control traffic lights depending on traffic, to monitor public spaces, to monitor roads, gyms, stadiums, ski resorts, public events, or the like. Further, devices according to the present invention may be used in medical applications such as to monitor or analyze tissues, medical or biological assays, changes in tissues such as in moles or melanoma or the like, to count bacteria, blood cells, cells, algae, or the like, for retina scans, breath or pulse measurements, gastroscopy, patient surveillance, or the like. Further, devices according to the present invention may be used to monitor the shape, size, or circumference of drops, streams, jets, or the like or to analyze, assess, or monitor profiles or gas or liquid currents such as in a wind channel, or the like. Further, devices according to the present invention may be used to warn drivers such as car or train drivers when they are getting sick or tired or the like. Further, devices according to the present invention may be used in material testing to recognize strains or tensions or fissures, or the like. Further, devices according to the present invention may be used in sailing to monitor and optimize sail positions such as automatically. Further, devices according to the present invention may be used for fuel level gauges.

Further, the devices according to the present invention may be combined with sensors to detect chemicals or pollutants, electronic nose chips, microbe sensor chips to detect bacteria or viruses or the like, Geiger counters, tactile sensors, heat sensors, or the like. This may for example be used in constructing smart robots which are configured for handling dangerous or difficult tasks, such as in treating highly infectious patients, handling or removing highly dangerous substances, cleaning highly polluted areas, such as highly radioactive areas or chemical spills, or for pest control in agriculture.

One or more devices according to the present invention can further be used for scanning of objects, such as in combination with CAD or similar software, such as for additive manufacturing and/or 3D printing. Therein, use may be made of the high dimensional accuracy of the devices according to the present invention, e.g. in x-, y- or z-direction or in any arbitrary combination of these directions, such as simultaneously. Further, the devices according to the present invention may be used in inspections and maintenance, such as pipeline inspection gauges. Further, in a production environment, the devices according to the present invention may be used to work with objects of a badly defined shape such as naturally grown objects, such as sorting vegetables or other natural products by shape or size or cutting products such as meat or objects that are manufactured with a precision that is lower than the precision needed for a processing step.

Further, the devices according to the present invention may be used in local navigation systems to allow autonomously or partially autonomously moving vehicles or multicopters or the like through an indoor or outdoor space. A non-limiting example may comprise vehicles moving through an automated storage for picking up objects and placing them at a different location. Indoor navigation may further be used in shopping malls, retail stores, museums, airports, or train stations, to track the location of mobile goods, mobile devices, baggage, customers or employees, or to supply users with a location specific information, such as the current position on a map, or information on goods sold, or the like.

Further, the devices according to the present invention may be used to ensure safe driving of motorcycles such as driving assistance for motorcycles by monitoring speed, inclination, upcoming obstacles, unevenness of the road, or curves or the like. Further, the devices according to the present invention may be used in trains or trams to avoid collisions.

Further, the devices according to the present invention may be used in handheld devices, such as for scanning packaging or parcels to optimize a logistics process. Further, the devices according to the present invention may be used in further handheld devices such as personal shopping devices, RFID-readers, handheld devices for use in hospitals or health environments such as for medical use or to obtain, exchange or record patient or patient health related information, smart badges for retail or health environments, or the like.

As outlined above, the devices according to the present invention may further be used in manufacturing, quality control or identification applications, such as in product identification or size identification (such as for finding an optimal place or package, for reducing waste etc.). Further, the devices according to the present invention may be used in logistics applications. Thus, the devices according to the present invention may be used for optimized loading or packing containers or vehicles. Further, devices according to the present invention may be recalibrated using bar codes, QR-codes or prerecorded symbols of known size by using the at least one image matrix and comparing the prerecorded size with a measured property of the recorded image of the bar code, QR code or prerecorded symbol, such as by comparing the width or height of the symbol with a prerecorded value. Further, the devices according to the present invention may be used for monitoring or controlling of surface damages in the field of manufacturing, for monitoring or controlling rental objects such as rental vehicles, and/or for insurance applications, such as for assessment of damages. Further, the devices according to the present invention may be used for identifying a size of material, object or tools, such as for optimal material handling, especially in combination with robots. Further, the devices according to the present invention may be used for process control in production, e.g. for observing filling level of tanks. Further, the devices according to the present invention may be used for maintenance of production assets like, but not limited to, tanks, pipes, reactors, tools etc. Further, the devices according to the present invention may be used for analyzing 3D-quality marks. Further, the devices according to the present invention may be used in manufacturing tailor-made goods such as tooth inlays, dental braces, prosthesis, clothes or the like. The devices according to the present invention may also be combined with one or more 3D-printers for rapid prototyping, 3D-copying or the like. Further, the devices according to the present invention may be used for detecting the shape of one or more articles, such as for anti-product piracy and for anti-counterfeiting purposes.

Thus, specifically, the present application may be applied in the field of photography. Thus, the detector may be part of a photographic device, specifically of a digital camera. Specifically, the detector may be used for 3D photography, specifically for digital 3D photography. Thus, the detector may form a digital 3D camera or may be part of a digital 3D camera. As used herein, the term photography generally refers to the technology of acquiring image information of at least one object. As further used herein, a camera generally is a device adapted for performing photography. As further used herein, the term digital photography generally refers to the technology of acquiring image information of at least one object by using a plurality of light-sensitive elements adapted to generate electrical signals indicating an intensity and/or color of illumination, preferably digital electrical signals. As further used herein, the term 3D photography generally refers to the technology of acquiring image information of at least one object in three spatial dimensions. Accordingly, a 3D camera is a device adapted for performing 3D photography. The camera generally may be adapted for acquiring a single image, such as a single 3D image, or may be adapted for acquiring a plurality of images, such as a sequence of images. Thus, the camera may also be a video camera adapted for video applications, such as for acquiring digital video sequences.

Thus, generally, the present invention further refers to a camera, specifically a digital camera, more specifically a 3D camera or digital 3D camera, for imaging at least one object. As outlined above, the term imaging, as used herein, generally refers to acquiring image information of at least one object. The camera comprises at least one detector according to the present invention. The camera, as outlined above, may be adapted for acquiring a single image or for acquiring a plurality of images, such as image sequence, preferably for acquiring digital video sequences. Thus, as an example, the camera may be or may comprise a video camera. In the latter case, the camera preferably comprises a data memory for storing the image sequence.

As used within the present invention, the expression "position" generally refers to at least one item of information regarding one or more of an absolute position and an orientation of one or more points of the object. Thus, specifically, the position may be determined in a coordinate system of the detector, such as in a Cartesian coordinate system. Additionally or alternatively, however, other types of coordinate systems may be used, such as polar coordinate systems and/or spherical coordinate systems.

As outlined above and as will be outlined in further detail below, the present invention preferably may be applied in the field of human-machine interfaces, in the field of sports and/or in the field of computer games. Thus, preferably, the object may be selected from the group consisting of: an article of sports equipment, preferably an article selected from the group consisting of a racket, a club, a bat, an article of clothing, a hat, a shoe. Other embodiments are feasible.

As used herein, the object generally may be an arbitrary object, chosen from a living object and a non-living object. Thus, as an example, the at least one object may comprise one or more articles and/or one or more parts of an article. Additionally or alternatively, the object may be or may comprise one or more living beings and/or one or more parts thereof, such as one or more body parts of a human being, e.g. a user, and/or an animal.

With regard to the coordinate system for determining the position of the object, which may be a coordinate system of the detector, the detector may constitute a coordinate system in which an optical axis of the detector forms the z-axis and in which, additionally, an x-axis and a y-axis may be provided which are perpendicular to the z-axis and which are perpendicular to each other. As an example, the detector and/or a part of the detector may rest at a specific point in this coordinate system, such as at the origin of this coordinate system. In this coordinate system, a direction parallel or antiparallel to the z-axis may be regarded as a longitudinal direction, and a coordinate along the z-axis may be considered a longitudinal coordinate. An arbitrary direction perpendicular to the longitudinal direction may be considered a transversal direction, and an x- and/or y-coordinate may be considered a transversal coordinate.

Alternatively, other types of coordinate systems may be used. Thus, as an example, a polar coordinate system may be used in which the optical axis forms a z-axis and in which a distance from the z-axis and a polar angle may be used as additional coordinates. Again, a direction parallel or antiparallel to the z-axis may be considered a longitudinal direction, and a coordinate along the z-axis may be considered a longitudinal coordinate. Any direction perpendicular to the z-axis may be considered a transversal direction, and the polar coordinate and/or the polar angle may be considered a transversal coordinate.

The detector may be a device configured for providing at least one item of information on the position of the at least one object and/or a part thereof. Thus, the position may refer to an item of information fully describing the position of the object or a part thereof, preferably in the coordinate system of the detector, or may refer to a partial information, which only partially describes the position. The detector generally may be a device adapted for detecting light beams, such as the light beams propagating from the beacon devices towards the detector.

The evaluation device and the detector may fully or partially be integrated into a single device. Thus, generally, the evaluation device also may form part of the detector. Alternatively, the evaluation device and the detector may fully or partially be embodied as separate devices. The detector may comprise further components.

The detector may be a stationary device or a mobile device. Further, the detector may be a stand-alone device or may form part of another device, such as a computer, a vehicle or any other device. Further, the detector may be a hand-held device. Other embodiments of the detector are feasible.

The detector specifically may be used to record a light-field behind a lens or lens system of the detector, comparable to a plenoptic or light-field camera. Thus, specifically, the detector may be embodied as a light-field camera adapted for acquiring images in multiple focal planes, such as simultaneously. The term light-field, as used herein, generally refers to the spatial light propagation of light inside the detector such as inside camera. The detector according to the present invention, specifically having a stack of optical sensors, may have the capability of directly recording a light-field within the detector or camera, such as behind a lens. The plurality of sensors may record images at different distances from the lens. Using, e.g., convolution-based algorithms such as "depth from focus" or "depth from defocus", the propagation direction, focus points, and spread of the light behind the lens can be modeled. From the modeled propagation of light behind the lens, images at various distances to the lens can be extracted, the depth of field can be optimized, pictures that are in focus at various distances can be extracted, or distances of objects can be calculated. Further information may be extracted.

The use of several optical sensors further allows for correcting lens errors in an image processing step after recording the images. Optical instruments often become expensive and challenging in construction, when lens errors need to be corrected. These are especially problematic in microscopes and telescopes. In microscopes, a typical lens error is that rays of varying distance to the optical axis are distorted differently (spherical aberration). In telescopes, varying the focus may occur from differing temperatures in the atmosphere. Static errors such as spherical aberration or further errors from production may be corrected by determining the errors in a calibration step and then using a fixed image processing such as fixed set of pixels and sensor, or more involved processing techniques using light propagation information. In cases in which lens errors are strongly time-dependent, i.e. dependent on weather conditions in telescopes, the lens errors may be corrected by using the light propagation behind the lens, calculating extended depth of field images, using depth from focus techniques, and others.

The detector according to the present invention may further allow for color detection. For color detection, a plurality of optical sensors having different spectral properties may be used, and sensor signals of these optical sensors may be compared. Further, the devices according to the present invention may be used in the context of gesture recognition. In this context, gesture recognition in combination with devices according to the present invention may, in particular, be used as a human-machine interface for transmitting information via motion of a body, of body parts or of objects to a machine. Herein, the information may, preferably, be transmitted via a motion of hands or hand parts, such as fingers, in particular, by pointing at objects, applying sign language, such as for deaf people, making signs for numbers, approval, disapproval, or the like, by waving the hand, such as when asking someone to approach, to leave, or to greet a person, to press an object, to take an object, or, in the field of sports or music, in a hand or finger exercise, such as a warm-up exercise. Further, the information may be transmitted by motion of arms or legs, such as rotating, kicking, grabbing, twisting, rotating, scrolling, browsing, pushing, bending, punching, shaking, arms, legs, both arms, or both legs, or a combination of arms and legs, such as for a purpose of sports or music, such as for entertainment, exercise, or training function of a machine. Further, the information may be transmitted by motion of the whole body or major parts thereof, such as jumping, rotating, or making complex signs, such as sign language used at airports or by traffic police in order to transmit information, such as "turn right", "turn left", "proceed", "slow down", "stop", or "stop engines", or by pretending to swim, to dive, to run, to shoot, or the like, or by making complex motions or body positions such as in yoga, pilates, judo, karate, dancing, or ballet. Further, the information may be transmitted by using a real or mock-up device for controlling a virtual device corresponding to the mock-up device, such as using a mock-up guitar for controlling a virtual guitar function in a computer program, using a real guitar for controlling a virtual guitar function in a computer program, using a real or a mock-up book for reading an e-book or moving pages or browsing through in a virtual document, using a real or mock-up pen for drawing in a computer program, or the like. Further, the transmission of the information may be coupled to a feedback to the user, such as a sound, a vibration, or a motion.

In the context of music and/or instruments, devices according to the present invention in combination with gesture recognition may be used for exercising purposes, control of instruments, recording of instruments, playing or recording of music via use of a mock-up instrument or by only pretending to have a instrument present such as playing air guitar, such as to avoid noise or make recordings, or, for conducting of a virtual orchestra, ensemble, band, big band, choir, or the like, for practicing, exercising, recording or entertainment purposes or the like.

Further, in the context of safety and surveillance, devices according to the present invention in combination with gesture recognition may be used to recognize motion profiles of persons, such as recognizing a person by the way of walking or moving the body, or to use hand signs or movements or signs or movements of body parts or the whole body as access or identification control such as a personal identification sign or a personal identification movement.

Further, in the context of smart home applications or internet of things, devices according to the present invention in combination with gesture recognition may be used for central or non-central control of household devices which may be part of an interconnecting network of home appliances and/or household devices, such as refrigerators, central heating, air condition, microwave ovens, ice cube makers, or water boilers, or entertainment devices, such as television sets, smart phones, game consoles, video recorders, DVD players, personal computers, laptops, tablets, or combinations thereof, or a combination of household devices and entertainment devices.

Further, in the context of virtual reality or of augmented reality, devices according to the present invention in combination with gesture recognition may be used to control movements or function of the virtual reality application or of the augmented reality application, such as playing or controlling a game using signs, gestures, body movements or body part movements or the like, moving through a virtual world, manipulating virtual objects, practicing, exercising or playing sports, arts, crafts, music or games using virtual objects such as a ball, chess figures, go stones, instruments, tools, brushes.

Further, in the context of medicine, devices according to the present invention in combination with gesture recognition may be used to support rehabilitation training, remote diagnostics, or to monitor or survey surgery or treatment, to overlay and display medical images with positions of medical devices, or to overlay display prerecorded medical images such as from magnetic resonance tomography or x-ray or the like with images from endoscopes or ultra sound or the like that are recorded during a surgery or treatment.

Further, in the context of manufacturing and process automation, devices according to the present invention in combination with gesture recognition may be used to control, teach, or program robots, drones, unmanned autonomous vehicles, service robots, movable objects, or the like, such as for programming, controlling, manufacturing, manipulating, repairing, or teaching purposes, or for remote manipulating of objects or areas, such as for safety reasons, or for maintenance purposes.

Further, in the context of business intelligence metrics, devices according to the present invention in combination with gesture recognition may be used for people counting, surveying customer movements, areas where customers spend time, objects, customers test, take, probe, or the like.

Further, devices according to the present invention may be used in the context of do-it-yourself or professional tools, especially electric or motor driven tools or power tools, such as drilling machines, saws, chisels, hammers, wrenches, staple guns, disc cutters, metals shears and nibblers, angle grinders, die grinders, drills, hammer drills, heat guns, wrenches, sanders, engravers, nailers, jig saws, biscuit joiners, wood routers, planers, polishers, tile cutters, washers, rollers, wall chasers, lathes, impact drivers, jointers, paint rollers, spray guns, morticers, or welders, in particular, to support precision in manufacturing, keeping a minimum or maximum distance, or for safety measures.

Further, the devices according to the present invention may be used to aid visually impaired persons. Further, devices according to the present invention may be used in touch screen such as to avoid direct contact such as for hygienic reasons, which may be used in retail environments, in medical applications, in production environments, or the like. Further, devices according to the present invention may be used in agricultural production environments such as in stable cleaning robots, egg collecting machines, milking machines, harvesting machines, farm machinery, harvesters, forwarders, combine harvesters, tractors, cultivators, ploughs, destoners, harrows, strip tills, broadcast seeders, planters such as potato planters, manure spreaders, sprayers, sprinkler systems, swathers, balers, loaders, forklifts, mowers, or the like.

Further, devices according to the present invention may be used for selection and/or adaption of clothing, shoes, glasses, hats, prosthesis, dental braces, for persons or animals with limited communication skills or possibilities, such as children or impaired persons, or the like. Further, devices according to the present invention may be used in the context of warehouses, logistics, distribution, shipping, loading, unloading, smart manufacturing, industry 4.0, or the like. Further, in a manufacturing context, devices according to the present invention may be used in the context of processing, dispensing, bending, material handling, or the like.

The evaluation device may be or may comprise one or more integrated circuits, such as one or more application-specific integrated circuits (ASICs), and/or one or more data processing devices, such as one or more computers, preferably one or more microcomputers and/or microcontrollers, Field Programmable Arrays, or Digital Signal Processors. Additional components may be comprised, such as one or more preprocessing devices and/or data acquisition devices, such as one or more devices for receiving and/or preprocessing of the sensor signals, such as one or more AD-converters and/or one or more filters. Further, the evaluation device may comprise one or more measurement devices, such as one or more measurement devices for measuring electrical currents and/or electrical voltages. Further, the evaluation device may comprise one or more data storage devices. Further, the evaluation device may comprise one or more interfaces, such as one or more wireless interfaces and/or one or more wire-bound interfaces.

The at least one evaluation device may be adapted to perform at least one computer program, such as at least one computer program adapted for performing or supporting one or more or even all of the method steps of the method according to the present invention. As an example, one or more algorithms may be implemented which, by using the sensor signals as input variables, may determine the position of the object.

The evaluation device can be connected to or may comprise at least one further data processing device that may be used for one or more of displaying, visualizing, analyzing, distributing, communicating or further processing of information, such as information obtained by the optical sensor and/or by the evaluation device. The data processing device, as an example, may be connected or incorporate at least one of a display, a projector, a monitor, an LCD, a TFT, a loudspeaker, a multichannel sound system, an LED pattern, or a further visualization device. It may further be connected or incorporate at least one of a communication device or communication interface, a connector or a port, capable of sending encrypted or unencrypted information using one or more of email, text messages, telephone, Bluetooth, Wi-Fi, infrared or internet interfaces, ports or connections. It may further be connected to or incorporate at least one of a processor, a graphics processor, a CPU, an Open Multimedia Applications Platform (OMAP™), an integrated circuit, a system on a chip such as products from the Apple A series or the Samsung S3C2 series, a microcontroller or microprocessor, one or more memory blocks such as ROM, RAM, EEPROM, or flash memory, timing sources such as oscillators or phase-locked loops, counter-timers, real-time timers, or power-on reset generators, voltage regulators, power management circuits, or DMA controllers. Individual units may further be connected by buses such as AMBA buses or be integrated in an Internet of Things or Industry 4.0 type network.

The evaluation device and/or the data processing device may be connected by or have further external interfaces or ports such as one or more of serial or parallel interfaces or ports, USB, Centronics Port, FireWire, HDMI, Ethernet, Bluetooth, RFID, Wi-Fi, USART, or SPI, or analogue interfaces or ports such as one or more of ADCs or DACs, or standardized interfaces or ports to further devices such as a 2D-camera device using an RGB-interface such as CameraLink. The evaluation device and/or the data processing device may further be connected by one or more of interprocessor interfaces or ports, FPGA-FPGA-interfaces, or serial or parallel interfaces ports. The evaluation device and the data processing device may further be connected to one or more of an optical disc drive, a CD-RW drive, a DVD+ RW drive, a flash drive, a memory card, a disk drive, a hard disk drive, a solid state disk or a solid state hard disk.

The evaluation device and/or the data processing device may be connected by or have one or more further external connectors such as one or more of phone connectors, RCA connectors, VGA connectors, hermaphrodite connectors, USB connectors, HDMI connectors, 8P8C connectors, BCN connectors, IEC 60320 C14 connectors, optical fiber connectors, D-subminiature connectors, RF connectors, coaxial connectors, SCART connectors, XLR connectors, and/or may incorporate at least one suitable socket for one or more of these connectors.

Possible embodiments of a single device incorporating one or more of the detectors according to the present invention, the evaluation device or the data processing device, such as incorporating one or more of the optical sensor, optical systems, evaluation device, communication device, data processing device, interfaces, system on a chip, display devices, or further electronic devices, are: mobile phones, personal computers, tablet PCs, televisions, game consoles or further entertainment devices. In a further embodiment, the 3D-camera functionality which will be outlined in further detail below may be integrated in devices that are available with conventional 2D-digital cameras, without a noticeable difference in the housing or appearance of the device, where the noticeable difference for the user may only be the functionality of obtaining and or processing 3D information. Further, devices according to the present invention may be used in 360° digital cameras or surround view cameras.

Specifically, an embodiment incorporating the detector and/or a part thereof such as the evaluation device and/or the data processing device may be: a mobile phone incorporating a display device, a data processing device, the optical sensor, optionally the sensor optics, and the evaluation device, for the functionality of a 3D camera. The detector according to the present invention specifically may be suitable for integration in entertainment devices and/or communication devices such as a mobile phone.

A further embodiment of the present invention may be an incorporation of the detector or a part thereof such as the evaluation device and/or the data processing device in a device for use in automotive, for use in autonomous driving or for use in car safety systems such as Daimler's Intelligent Drive system, wherein, as an example, a device incorporating one or more of the optical sensors, optionally one or more optical systems, the evaluation device, optionally a communication device, optionally a data processing device, optionally one or more interfaces, optionally a system on a chip, optionally one or more display devices, or optionally further electronic devices may be part of a vehicle, a car, a truck, a train, a bicycle, an airplane, a ship, a motorcycle. In automotive applications, the integration of the device into the automotive design may necessitate the integration of the optical sensor, optionally optics, or device at minimal visibility from the exterior or interior. The detector or a part thereof such as the evaluation device and/or the data processing device may be especially suitable for such integration into automotive design.

As used herein, the term light generally refers to electromagnetic radiation in one or more of the visible spectral range, the ultraviolet spectral range and the infrared spectral range. Therein, the term visible spectral range generally refers to a spectral range of 380 nm to 780 nm. The term infrared spectral range generally refers to electromagnetic radiation in the range of 780 nm to 1 mm, preferably in the range of 780 nm to 3.0 micrometers. The term ultraviolet spectral range generally refers to electromagnetic radiation in the range of 1 nm to 380 nm, preferably in the range of 100 nm to 380 nm. Preferably, light as used within the present invention is visible light, i.e. light in the visible spectral range.

The term light beam generally may refer to an amount of light emitted and/or reflected into a specific direction. Thus, the light beam may be a bundle of the light rays having a predetermined extension in a direction perpendicular to a direction of propagation of the light beam. Preferably, the light beams may be or may comprise one or more Gaussian light beams such as a linear combination of Gaussian light beams, which may be characterized by one or more Gaussian beam parameters, such as one or more of a beam waist, a Rayleigh-length or any other beam parameter or combination of beam parameters suited to characterize a development of a beam diameter and/or a beam propagation in space.

The detector according to the present invention may further be combined with one or more other types of sensors or detectors. Thus, the detector may further comprise at least one additional detector. The at least one additional detector may be adapted for detecting at least one parameter, such as at least one of: a parameter of a surrounding environment, such as a temperature and/or a brightness of a surrounding environment; a parameter regarding a position and/or orientation of the detector; a parameter specifying a state of the object to be detected, such as a position of the object, e.g. an absolute position of the object and/or an orientation of the object in space. Thus, generally, the principles of the present invention may be combined with other measurement principles in order to gain additional information and/or in order to verify measurement results or reduce measurement errors or noise.

The human-machine interface may comprise a plurality of beacon devices which are adapted to be at least one of directly or indirectly attached to the user and held by the user. Thus, the beacon devices each may independently be attached to the user by any suitable means, such as by an appropriate fixing device. Additionally or alternatively, the user may hold and/or carry the at least one beacon device or one or more of the beacon devices in his or her hands and/or by wearing the at least one beacon device and/or a garment containing the beacon device on a body part.

The beacon device generally may be an arbitrary device which may be detected by the at least one detector and/or which facilitates detection by the at least one detector. Thus, as outlined above or as will be outlined in further detail below, the beacon device may be an active beacon device adapted for generating the at least one light beam to be detected by the detector, such as by having one or more illumination sources for generating the at least one light beam. Additionally or alternatively, the beacon device may fully or partially be designed as a passive beacon device, such as by providing one or more reflective elements adapted to reflect a light beam generated by a separate illumination source. The at least one beacon device may permanently or temporarily be attached to the user in a direct or indirect way and/or may be carried or held by the user. The attachment may take place by using one or more attachment means and/or by the user himself or herself, such as by the user holding the at least one beacon device by hand and/or by the user wearing the beacon device.

Additionally or alternatively, the beacon devices may be at least one of attached to an object and integrated into an object held by the user, which, in the sense of the present invention, shall be included into the meaning of the option of the user holding the beacon devices. Thus, as will be outlined in further detail below, the beacon devices may be attached to or integrated into a control element which may be part of the human-machine interface and which may be held or carried by the user, and of which the orientation may be recognized by the detector device. Thus, generally, the present invention also refers to a detector system comprising at least one detector device according to the present invention and which, further, may comprise at least one object, wherein the beacon devices are one of attached to the object, held by the object and integrated into the object. As an example, the object preferably may form a control element, the orientation of which may be recognized by a user. Thus, the detector system may be part of the human-machine interface as outlined above or as outlined in further detail below. As an example, the user may handle the control element in a specific way in order to transmit one or more items of information to a machine, such as in order to transmit one or more commands to the machine.

Alternatively, the detector system may be used in other ways. Thus, as an example, the object of the detector system may be different from a user or a body part of the user and, as an example, may be an object which moves independently from the user. As an example, the detector system may be used for controlling apparatuses and/or industrial processes, such as manufacturing processes and/or robotics processes. Thus, as an example, the object may be a machine and/or a machine part, such as a robot arm, the orientation of which may be detected by using the detector system.

The human-machine interface may be adapted in such a way that the detector device generates at least one item of information on the position of the user or of at least one body part of the user. Specifically in case a manner of attachment of the at least one beacon device to the user is known, by evaluating the position of the at least one beacon device, at least one item of information on a position and/or an orientation of the user or of a body part of the user may be gained.

The beacon device preferably is one of a beacon device attachable to a body or a body part of the user and a beacon device which may be held by the user. As outlined above, the beacon device may fully or partially be designed as an active beacon device. Thus, the beacon device may comprise at least one illumination source adapted to generate at least one light beam to be transmitted to the detector, preferably at least one light beam having known beam properties. Additionally or alternatively, the beacon device may comprise at least one reflector adapted to reflect light generated by an illumination source, thereby generating a reflected light beam to be transmitted to the detector.

The object, which may form part of the detector system, may generally have an arbitrary shape. Preferably, the object being part of the detector system, as outlined above, may be a control element which may be handled by a user, such as manually. As an example, the control element may be or may comprise at least one element selected from the group consisting of: a glove, a jacket, a hat, shoes, trousers and a suit, a stick that may be held by hand, a bat, a club, a racket, a cane, a toy, such as a toy gun. Thus, as an example, the detector system may be part of the human-machine interface and/or of the entertainment device.

As used herein, an entertainment device is a device which may serve the purpose of leisure and/or entertainment of one or more users, in the following also referred to as one or more players. As an example, the entertainment device may serve the purpose of gaming, preferably computer gaming. Thus, the entertainment device may be implemented into a computer, a computer network or a computer system or may comprise a computer, a computer network or a computer system which runs one or more gaming software programs.

The entertainment device comprises at least one human-machine interface according to the present invention, such as according to one or more of the embodiments disclosed above and/or according to one or more of the embodiments disclosed below. The entertainment device is designed to enable at least one item of information to be input by a player by means of the human-machine interface. The at least one item of information may be transmitted to and/or may be used by a controller and/or a computer of the entertainment device. The at least one item of information preferably may comprise at least one command adapted for influencing the course of a game. Thus, as an example, the at least one item of information may include at least one item of information on at least one orientation of the player and/or of one or more body parts of the player, thereby allowing for the player to simulate a specific position and/or orientation and/or action required for gaming. As an example, one or more of the following movements may be simulated and communicated to a controller and/or a computer of the entertainment device: dancing; running; jumping; swinging of a racket; swinging of a bat; swinging of a club; pointing of an object towards another object, such as pointing of a toy gun towards a target.

The entertainment device as a part or as a whole, preferably a controller and/or a computer of the entertainment device, is designed to vary the entertainment function in accordance with the information. Thus, as outlined above, a course of a game might be influenced in accordance with the at least one item of information. Thus, the entertainment device might include one or more controllers which might be separate from the evaluation device of the at least one detector and/or which might be fully or partially identical to the at least one evaluation device or which might even include the at least one evaluation device. Preferably, the at least one controller might include one or more data processing devices, such as one or more computers and/or microcontrollers.

As further used herein, a tracking system is a device which is adapted to gather information on a series of past positions of the at least one object and/or at least one part of the object. Additionally, the tracking system may be adapted to provide information on at least one predicted future position and/or orientation of the at least one object or the at least one part of the object. The tracking system may have at least one track controller, which may fully or partially be embodied as an electronic device, preferably as at least one data processing device, more preferably as at least one computer or microcontroller. Again, the at least one track controller may fully or partially comprise the at least one evaluation device and/or may be part of the at least one evaluation device and/or may fully or partially be identical to the at least one evaluation device.

The tracking system comprises at least one detector according to the present invention, such as at least one detector as disclosed in one or more of the embodiments listed above and/or as disclosed in one or more of the embodiments below. The tracking system further comprises at least one track controller. The track controller is adapted to track a series of positions of the object at specific points in time, such as by recording groups of data or data pairs, each group of data or data pair comprising at least one position information and at least one time information.

The tracking system may further comprise the at least one detector system according to the present invention. Thus, besides the at least one detector and the at least one evaluation device and the optional at least one beacon device, the tracking system may further comprise the object itself or a part of the object, such as at least one control element comprising the beacon devices or at least one beacon device, wherein the control element is directly or indirectly attachable to or integratable into the object to be tracked.

The tracking system may be adapted to initiate one or more actions of the tracking system itself and/or of one or more separate devices. For the latter purpose, the tracking system, preferably the track controller, may have one or more wireless and/or wire-bound interfaces and/or other types of control connections for initiating at least one action. Preferably, the at least one track controller may be adapted to initiate at least one action in accordance with at least one actual position of the object. As an example, the action may be selected from the group consisting of: a prediction of a future position of the object; pointing at least one device towards the object; pointing at least one device towards the detector; illuminating the object; illuminating the detector.

As an example of application of a tracking system, the tracking system may be used for continuously pointing at least one first object to at least one second object even though the first object and/or the second object might move. Potential examples, again, may be found in industrial applications, such as in robotics and/or for continuously working on an article even though the article is moving, such as during manufacturing in a manufacturing line or assembly line. Additionally or alternatively, the tracking system might be used for illumination purposes, such as for continuously illuminating the object by continuously pointing an illumination source to the object even though the object might be moving. Further applications might be found in communication systems, such as in order to continuously transmit information to a moving object by pointing a transmitter towards the moving object.

The proposed devices and methods provide a large number of advantages over known detectors of this kind. Thus, the detector generally may avoid the shortcomings of the known prior art systems disclosed above. Specifically, the detector may avoid the use of FiP sensors, thereby allowing for e.g. using simple and cheap and commercially available semiconductor sensors such as silicon photodiodes. These photodiodes generally do not show a luminance dependency, and the method disclosed above is generally independent from the brightness of the scenery and/or the brightness of the light spot on the light beam. Consequently, a range of measurement in terms of luminance or total power of the light beam entering the detector is generally larger in the present invention as compared to many of the devices disclosed above. Further, the measurement by using the detector according to the present invention is generally independent from the target spot size, i.e. from either the size of the object, the size of a light spot projected onto the object or the size of a beacon device being one or more of attached to the object, integrated into the object or held by the object.

The detector according to the present invention may be realized as a simple device combining the functionality of distance measurement or measurement of z-coordinates, with the additional option of measuring one or more transversal coordinates, thereby integrating the functionality of a PSD.

The result of the measurement, i.e. the position determined by the detector such as the at least one longitudinal coordinate, may be rendered widely independent from the brightness of the scenery and/or the brightness of the object, the brightness of the at least one beacon device, the brightness of the at least one illumination source or the total power of the light beam propagating from the object to the detector. Further, due to this independence and wide range of measurement in terms of brightness, reflective objects or non-reflective objects may be used.

When mentioning a range of measurement, the range of measurement may both refer to a range of brightness which may be used with the detector according to the present invention, such as a range of total powers of the light beam, or may refer to a range of distances between the detector and the object which may be measured. Conventional detectors, such as according to one or more of the documents listed above, are typically limited in both ranges of measurement. The use of the quotient signal, as mentioned above, contrarily, provides a wide range of continuously and monotonously decreasing or increasing functions which may be used to determine the longitudinal coordinate from the quotient signal. Consequently, a very wide range of measurement in terms of distance between the object and the detector is given. Similarly, due to the general independence of the quotient signal from the total power of the light beam, at least as long as no saturation of one or both of the optical sensors is reached, this also provides a very wide range of measurement in terms of brightness, i.e. in terms of total power of the light beam.

The light beam, within the detector, generally may propagate along an optical axis of the detector. The light beam, however, may also propagate in other ways than along the optical axis. As an example, an illumination light beam may be generated which propagates along the optical axis or which propagates parallel to the optical axis or at an angle to the optical axis which is different from 0°, such as an angle of 1° to 20°. Other embodiments are feasible.

Overall, in the context of the present invention, the following embodiments are regarded as preferred:

Embodiment 1: A detector for determining a position of at least one object, the detector comprising
- at least one sensor element having a matrix of optical sensors, the optical sensors each having a light-sensitive area, wherein each optical sensor is designed to generate at least one sensor signal in response to an illumination of its respective light-sensitive area by a reflection light beam propagating from the object to the detector, wherein the sensor element is adapted to determine at least one reflection image;
- at least one evaluation device, wherein the evaluation device is adapted to select at least one reflection feature of the reflection image, wherein the evaluation device is configured for determining at least one longitudinal region of the selected reflection feature of the reflection image by evaluating a combined signal Q from the sensor signals, wherein the evaluation device is adapted to determine at least one displacement region in at least one reference image corresponding to the longitudinal region, wherein the evaluation device is adapted to match the selected reflection feature with at least one reference feature within the displacement region.

Embodiment 2: The detector according to the preceding embodiment, wherein the evaluation device is adapted to determine a displacement of the matched reference feature and the selected reflection feature, wherein the evaluation device is adapted to determine a longitudinal information of the matched feature using a predetermined relationship between a longitudinal coordinate and the displacement.

Embodiment 3: The detector according to any one of the preceding embodiments, wherein the evaluation device is configured for deriving the combined signal Q by one or more of dividing the sensor signals, dividing multiples of the sensor signals, dividing linear combinations of the sensor signals.

Embodiment 4: The detector according to any one of the preceding embodiments, wherein the evaluation device is configured for using at least one predetermined relationship between the combined signal Q and the longitudinal region for determining the longitudinal region.

Embodiment 5: The detector according to any one of the preceding embodiments, wherein the evaluation device is adapted to determine at least one longitudinal coordinate z of the selected reflection feature by evaluating the combined signal Q, wherein the longitudinal region is given by the longitudinal coordinate z and an error interval ±ε.

Embodiment 6: The detector according to the preceding embodiment, wherein the reference image and the reflection image are images of the object determined at different spatial positions having a fixed distance, wherein the evaluation device is adapted to determine an epipolar line in the reference image.

Embodiment 7: The detector according to the preceding embodiment, wherein the displacement region extends along the epipolar line, wherein the evaluation device is adapted to determine the reference feature along the epipolar line corresponding to the longitudinal coordinate z and to determine an extent of the displacement region along the epipolar line corresponding to the error interval ±ε.

Embodiment 8: The detector according to the preceding embodiment, wherein the evaluation device is configured to perform the following steps:
- Determining the displacement region for the image position of each reflection feature;
- Assigning an epipolar line to the displacement region of each reflection feature such as by assigning the epipolar line closest to a displacement region and/or within a displacement region and/or closest to a displacement region along a direction orthogonal to the epipolar line;
- Assigning and/or determining at least one reference feature to each reflection feature such as by assigning the reference feature closest to the assigned displacement region and/or within the assigned displacement region and/or closest to the assigned displacement region along the assigned epipolar line and/or within the assigned displacement region along the assigned epipolar line.

Embodiment 9: The detector according to any one of the preceding embodiments, wherein the evaluation device is adapted to match the selected feature of the reflection image with the reference feature within the displacement region by using at least one evaluation algorithm considering the determined longitudinal coordinate z.

Embodiment 10: The detector according to the preceding embodiments, wherein the evaluation algorithm is a linear scaling algorithm.

Embodiment 11: The detector according to any one of the preceding embodiments, wherein the evaluation device is configured for deriving the combined signal Q by $$Q(z_O) = \frac{\int\int_{A_1} E(x, y; z_O) dx dy}{\int\int_{A_2} E(x, y; z_O) dx dy}$$

wherein x and y are transversal coordinates, A1 and A2 are different areas of at least one beam profile of the reflection light beam at the sensor position, and $E(x,y,z_o)$ denotes the beam profile given at the object distance $z_o$.

Embodiment 12: The detector according to the preceding embodiment, wherein each of the sensor signals comprises at least one information of at least one area of the beam profile of the reflection light beam.

Embodiment 13: The detector according to any of the two preceding embodiments, wherein the beam profile is selected from the group consisting of a trapezoid beam profile; a triangle beam profile; a conical beam profile and a linear combination of Gaussian beam profiles.

Embodiment 14: The detector according to any one of the three preceding embodiments, wherein the light sensitive areas are arranged such that a first sensor signal comprises information of a first area of the beam profiles and a second sensor signal comprises information of a second area of the beam profile, wherein the first area of the beam profile and the second area of the beam profile are one or both of adjacent or overlapping regions.

Embodiment 15: The detector according to the preceding embodiment, wherein the evaluation device is configured to determine the first area of the beam profile and the second area of the beam profile.

Embodiment 16: The detector according to any one of the two preceding embodiments, wherein the first area of the beam profile comprises essentially edge information of the beam profile and the second area of the beam profile comprises essentially center information of the beam profile.

Embodiment 17: The detector according to any one of the two preceding embodiments, wherein the beam profile is segmented by a secant or chord passing the center of the beam profile by a given distance, whereas the first segment comprises the center information, whereas the second segment comprises essentially edge information.

Embodiment 18: The detector according to the preceding embodiment, wherein the edge information comprises information relating to a number of photons in the first area of the beam profile and the center information comprises information relating to a number of photons in the second area of the beam profile.

Embodiment 19: The detector according to any one of the two preceding embodiments, wherein the evaluation device is configured to derive the combined signal Q by one or more of dividing the edge information and the center information, dividing multiples of the edge information and the center information, dividing linear combinations of the edge information and the center information.

Embodiment 20: The detector according to any one of the preceding embodiments, wherein the at least one evaluation device is configured for evaluating the sensor signals, by
a) determining at least one optical sensor having the highest sensor signal and forming at least one center signal;
b) evaluating the sensor signals of the optical sensors of the matrix and forming at least one sum signal;
c) determining at least one combined signal by combining the center signal and the sum signal; and
d) determining the longitudinal region by evaluating the combined signal.

Embodiment 21: The detector according to the preceding embodiment, wherein the center signal is selected from the group consisting of: the highest sensor signal; an average of a group of sensor signals being within a predetermined range of tolerance from the highest sensor signal; an average of sensor signals from a group of optical sensors containing the optical sensor having the highest sensor signal and a predetermined group of neighboring optical sensors; a sum of sensor signals from a group of optical sensors containing the optical sensor having the highest sensor signal and a predetermined group of neighboring optical sensors; a sum of a group of sensor signals being within a predetermined range of tolerance from the highest sensor signal; an average of a group of sensor signals being above a predetermined threshold; a sum of a group of sensor signals being above a predetermined threshold; an integral of sensor signals from a group of optical sensors containing the optical sensor having the highest sensor signal and a predetermined group of neighboring optical sensors; an integral of a group of sensor signals being within a predetermined range of tolerance from the highest sensor signal; an integral of a group of sensor signals being above a predetermined threshold.

Embodiment 22: The detector according to any one of the two preceding embodiments, wherein the sum signal is selected from the group consisting of: an average over all sensor signals of the matrix; a sum of all sensor signals of the matrix; an integral of all sensor signals of the matrix; an average over all sensor signals of the matrix except for sensor signals from those optical sensors contributing to the center signal; a sum of all sensor signals of the matrix except for sensor signals from those optical sensors contributing to the center signal; an integral of all sensor signals of the matrix except for sensor signals from those optical sensors contributing to the center signal; a sum of sensor signals of optical sensors within a predetermined range from the optical sensor having the highest sensor signal; an integral of sensor signals of optical sensors within a predetermined range from the optical sensor having the highest sensor signal; a sum of sensor signals above a certain threshold of optical sensors being located within a predetermined range from the optical sensor having the highest sensor signal; an integral of sensor signals above a certain threshold of optical sensors being located within a predetermined range from the optical sensor having the highest sensor signal.

Embodiment 23: The detector according to any one of the three preceding embodiments, wherein the combined signal is a quotient signal Q, derived by one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa.

Embodiment 24: The detector according to any one of the preceding embodiment, wherein the evaluation device comprises at least one divider, wherein the divider is configured for deriving the quotient signal.

Embodiment 25: The detector according to any one of the preceding embodiments, wherein the detector comprises at least one optical element, wherein the optical element is at least one element selected from the group consisting of: transfer device, such as at least one lens and/or at least one lens system, at least one diffractive optical element.

Embodiment 26: The detector according to any one of the six preceding embodiments, wherein the evaluation device is further configured for determining at least one transversal coordinate of the object by evaluating a transversal position of the at least one optical sensor having the highest sensor signal.

Embodiment 27: The detector according to any one of the preceding embodiments, wherein the sensor element comprises at least one CMOS sensor.

Embodiment 28: The detector according to any one of the preceding embodiments, wherein the detector comprises at least one illumination source, wherein the illumination source is adapted to generate at least one illumination pattern for illumination of the object.

Embodiment 29: The detector according to preceding embodiment, wherein the illumination pattern comprises at least one pattern selected from the group consisting of: at least one point pattern, in particular a pseudo-random point pattern or a random point pattern; at least one Sobol pattern; at least one quasiperiodic pattern; at least one pattern comprising at least one pre-known feature; at least one regular pattern; at least one triangular pattern; at least one hexagonal pattern, in particular a rotated hexagonal pattern and/or a displaced hexagonal pattern; at least one rectangular pattern at least one pattern comprising convex uniform tilings; at least one line pattern comprising at least one line; at least one line pattern comprising at least two lines such as parallel or crossing lines.

Embodiment 30: The detector according to any one of the two preceding embodiments, wherein the sensor element is adapted to determine at least one reflection pattern, wherein the evaluation device is adapted to select at least one feature of the reflection pattern and to determine the longitudinal region of the selected feature of the reflection pattern by evaluating the combined signal Q from the sensor signals.

Embodiment 31: The detector according to the preceding embodiment, wherein the reference image is an image of the illumination pattern at an image plane at a position of the illumination source, wherein the evaluation device is adapted to determine the displacement region in the reference image corresponding to the longitudinal region of the selected feature of the reflection pattern, wherein the evaluation device is adapted to match the selected feature of the reflection pattern with at least one feature of the reference pattern within the displacement region.

Embodiment 32: The detector according to any one of the four preceding embodiments, wherein the illumination source and the sensor element are separated by a fixed distance.

Embodiment 33: The detector according to any one of the five preceding embodiments, wherein the detector comprises at least two sensor elements each having a matrix of optical sensors.

Embodiment 34: The detector according to the preceding embodiment, where at least one first sensor element and at least one second sensor element are positioned at different spatial positions, wherein a relative distance between the first sensor element and the second element is fixed.

Embodiment 35: The detector according to any one of the two preceding embodiments, wherein the at least one first sensor element is adapted to determine at least one first reflection pattern and the at least one second sensor element is adapted to determine at least one second reflection pattern, wherein the evaluation device is adapted to select at least one image determined by the first sensor element or the second sensor element as reflection image and to select at least one image determined by the other one of the first sensor element or the second sensor element as reference image.

Embodiment 36: A detector system for determining a position of at least one object, the detector system comprising at least one detector according to any one of the preceding embodiments, the detector system further comprising at least one beacon device adapted to direct at least one light beam towards the detector, wherein the beacon device is at least one of attachable to the object, holdable by the object and integratable into the object.

Embodiment 37: A human-machine interface for exchanging at least one item of information between a user and a machine, wherein the human-machine interface comprises at least one detector system according to the preceding embodiment, wherein the at least one beacon device is adapted to be at least one of directly or indirectly attached to the user and held by the user, wherein the human-machine interface is designed to determine at least one position of the user by means of the detector system, wherein the human-machine interface is designed to assign to the position at least one item of information.

Embodiment 38: An entertainment device for carrying out at least one entertainment function, wherein the entertainment device comprises at least one human-machine interface according to the preceding embodiment, wherein the entertainment device is designed to enable at least one item of information to be input by a player by means of the human-machine interface, wherein the entertainment device is designed to vary the entertainment function in accordance with the information.

Embodiment 39: A tracking system for tracking a position of at least one movable object, the tracking system comprising at least one detector system according to any one of the preceding embodiments referring to a detector system, the tracking system further comprising at least one track controller, wherein the track controller is adapted to track a series of positions of the object at specific points in time.

Embodiment 40: A scanning system for determining a depth profile of a scenery, the scanning system comprising at least one detector according to any of the preceding embodiments referring to a detector, the scanning system further comprising at least one illumination source adapted to scan the scenery with at least one light beam.

Embodiment 41: A camera for imaging at least one object, the camera comprising at least one detector according to any one of the preceding embodiments referring to a detector.

Embodiment 42: A method for determining a position of at least one object by using at least one detector according to any one of the preceding embodiments referring to a detector, the method comprising the following steps:

generating at least two sensor signals in response to an illumination of at least one sensor element having a matrix of optical sensors by at least one reflection light beam propagating from the object to the detector, the optical sensors each having a light-sensitive area;

determining at least one reflection image by using the sensor element;

selecting at least one reflection feature of the reflection image and evaluating the sensor signals by using at least one evaluation device, thereby, determining at least one longitudinal region of the selected reflection feature, wherein the evaluating comprises evaluating a combined signal Q from the sensor signals;

determining at least one displacement region in at least one reference image corresponding to the longitudinal region;

matching the selected reflection feature with at least one reference feature within the displacement region.

Embodiment 43: The method according to the preceding embodiment, wherein a displacement of the matched reference feature and the selected reflection feature is determined, wherein a longitudinal information of the matched feature is determined using a predetermined relationship between a longitudinal coordinate and the displacement.

Embodiment 44: The method according to any one of the preceding embodiments referring to a method, wherein the deriving of the combined signal Q comprises one or more of dividing the sensor signals, dividing multiples of the sensor signals, dividing linear combinations of the sensor signals.

Embodiment 45: A use of the detector according to any one of the preceding embodiments relating to a detector, for a purpose of use, selected from the group consisting of: a position measurement in traffic technology; an entertainment application; a security application; a surveillance application; a safety application; a human-machine interface application; a logistics application; an outdoor application; a mobile application; a communication application; a tracking application; a photography application; a machine vision application; a robotics application; a quality control application; a manufacturing application.

BRIEF DESCRIPTION OF THE FIGURES

Further optional details and features of the invention are evident from the description of preferred exemplary embodiments which follows in conjunction with the dependent claims. In this context, the particular features may be implemented in an isolated fashion or in combination with other features. The invention is not restricted to the exemplary embodiments. The exemplary embodiments are shown schematically in the figures. Identical reference numerals in the individual figures refer to identical elements or elements with identical function, or elements which correspond to one another with regard to their functions.

Specifically, in the figures.

DETAILED DESCRIPTION OF THE EMBODIMENTS

Figure 1:
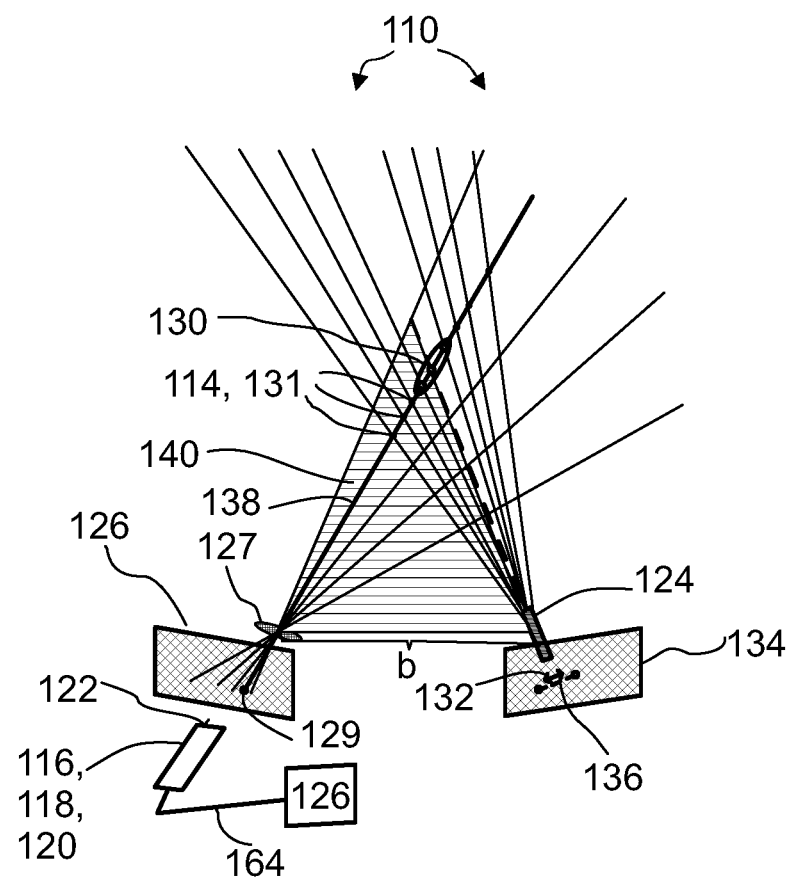
FIG. 1 shows a first embodiment of a detector according to the present invention.

FIG. 1 shows in a highly schematic fashion a first embodiment of a detector 110 for determining a position of at least one object 112. The detector 110 comprises at least one sensor element 116 having a matrix 118 of optical sensors 120. The optical sensors 120 each have a light-sensitive area 122.

The sensor element 116 may be formed as a unitary, single device or as a combination of several devices. The matrix 118 specifically may be or may comprise a rectangular matrix having one or more rows and one or more columns. The rows and columns specifically may be arranged in a rectangular fashion. However, other arrangements are feasible, such as nonrectangular arrangements. As an example, circular arrangements are also feasible, wherein the elements are arranged in concentric circles or ellipses about a center point. For example, the matrix 118 may be a single row of pixels. Other arrangements are feasible.

The optical sensors 120 of the matrix 118 specifically may be equal in one or more of size, sensitivity and other optical, electrical and mechanical properties. The light-sensitive areas 122 of all optical sensors 120 of the matrix 118 specifically may be located in a common plane, the common plane preferably facing the object 112, such that a light beam propagating from the object to the detector 110 may generate a light spot on the common plane. The light-sensitive area 122 may specifically be located on a surface of the respective optical sensor 120. Other embodiments, however, are feasible. The optical sensors 120 may comprise for example, at least one CCD and/or CMOS device. As an example, the optical sensors 120 may be part of or constitute a pixelated optical device. As an example, the optical sensors may be part of or constitute at least one CCD and/or CMOS device having a matrix of pixels, each pixel forming a light-sensitive area 122.

The optical sensors 120 specifically may be or may comprise photodetectors, preferably inorganic photodetectors, more preferably inorganic semiconductor photodetectors, most preferably silicon photodetectors. Specifically, the optical sensors 120 may be sensitive in the infrared spectral range. All of the optical sensors 120 of the matrix 118 or at least a group of the optical sensors 120 of the matrix 118 specifically may be identical. Groups of identical optical sensors 120 of the matrix 118 specifically may be provided for different spectral ranges, or all optical sensors may be identical in terms of spectral sensitivity. Further, the optical sensors 120 may be identical in size and/or with regard to their electronic or optoelectronic properties. The matrix 118 may be composed of independent optical sensors 120. Thus, a matrix 118 of inorganic photodiodes may be composed. Alternatively, however, a commercially available matrix may be used, such as one or more of a CCD detector, such as a CCD detector chip, and/or a CMOS detector, such as a CMOS detector chip.

The optical sensors 120 may form a sensor array or may be part of a sensor array, such as the above-mentioned matrix. Thus, as an example, the detector 110 may comprise an array of optical sensors 120, such as a rectangular array, having m rows and n columns, with m, n, independently, being positive integers. Preferably, more than one column and more than one row is given, i.e. n>1, m>1. Thus, as an example, n may be 2 to 16 or higher and m may be 2 to 16 or higher. Preferably, the ratio of the number of rows and the number of columns is close to 1. As an example, n and m may be selected such that 0.3≤m/n≤3, such as by choosing m/n=1:1, 4:3, 16:9 or similar. As an example, the array may be a square array, having an equal number of rows and columns, such as by choosing m=2, n=2 or m=3, n=3 or the like.

The matrix 118 specifically may be a rectangular matrix having at least one row, preferably a plurality of rows, and a plurality of columns. As an example, the rows and columns may be oriented essentially perpendicular. In order to provide a wide range of view, the matrix 118 specifically may have at least 10 rows, preferably at least 50 rows, more preferably at least 100 rows. Similarly, the matrix may have at least 10 columns, preferably at least 50 columns, more preferably at least 100 columns. The matrix 118 may comprise at least 50 optical sensors 120, preferably at least 100 optical sensors 120, more preferably at least 500 optical sensors 120. The matrix 118 may comprise a number of pixels in a multi-mega pixel range. Other embodiments, however, are feasible.

In the embodiment shown in FIG. 1, the detector 110 further comprises an illumination source 124. As an example, the illumination source 124 may be configured for generating an illuminating light beam for illuminating the object 112. The detector 110 may be configured such that the illuminating light beam propagates from the detector 110 towards the object 112 along an optical axis of the detector 110. For this purpose, the detector 110 may comprise at least one reflective element, preferably at least one prism, for deflecting the illuminating light beam onto the optical axis.

The illumination source 124 may be adapted to generate at least one illumination pattern for illumination of the object 112. Specifically, the illumination source 124 may comprise at least one laser and/or laser source. Various types of lasers may be employed, such as semiconductor lasers. Additionally or alternatively, non-laser light sources may be used, such as LEDs and/or light bulbs. The pattern may comprise a plurality of features. The pattern may comprise an arrangement of periodic or non-periodic features. The illumination pattern may comprise at least one pattern selected from the group consisting of: at least one point pattern, in particular a pseudo-random point pattern; at least one pattern comprising at least one pre-known feature. For example, the illumination source 124 may be adapted to generate and/or to project a cloud of points. The illumination source 124 may comprise one or more of at least one light projector; at least one digital light processing (DLP) projector, at least one LCoS projector, at least one spatial light modulator; at least one diffractive optical element; at least one array of light emitting diodes; at least one array of laser light sources. The illumination source 124 may comprise at least one light source adapted to generate the illumination pattern directly. The illumination source 124 may comprise the at least one light projector adapted to generate a cloud of points such that the illumination pattern may comprise a plurality of point pattern. The illumination source 124 may comprise at least one mask adapted to generate the illumination pattern from at least one light beam generated by the illumination source 124.

In the embodiment shown in FIG. 1, the Illumination source 124 may illuminate the at least one object 112 with the illumination pattern. The illumination pattern may comprise a plurality of points as image features. These points are illustrated as light beams 115 emerging from the illumination source 124.

Each optical sensor 120 is designed to generate at least one sensor signal in response to an illumination of its respective light-sensitive area 122 by a reflection light beam propagating from the object 112 to the detector 110.

Furthermore, the sensor element 116 is adapted to determine at least one reflection image 126. The matrix 118 may comprise the reflection image 126. The reflection image 126 may comprise points as reflection features. These points result from reflection light beams 125 originating from the at least one object 112. Crossings 131 of the illumination light beams and the reflection light beams 125 correspond to possible positions 114 of the at least one object 112.

The detector 127 may comprise at least one transfer device 127 comprising one or more of: at least one lens, for example at least one lens selected from the group consisting of at least one focus-tunable lens, at least one aspheric lens, at least one spheric lens, at least one Fresnel lens; at least one diffractive optical element; at least one concave mirror; at least one beam deflection element, preferably at least one mirror; at least one beam splitting element, preferably at least one of a beam splitting cube or a beam splitting mirror; at least one multi-lens system. In particular, the transfer device 127 may comprise at least one collimating lens adapted to focus at least one object point in an image plane.

The detector 110 comprises at least one evaluation device 128. The evaluation device 126 is adapted to select at least one reflection feature of the reflection image 126, for example selected reflection feature 129. The evaluation device 128 may be adapted to perform at least one image analysis and/or image processing in order to identify the reflection feature. The image analysis and/or image processing may use at least one feature detection algorithm. The image analysis and/or image processing may comprise one or more of the following: a filtering; a selection of at least one region of interest; a formation of a difference image between an image created by the sensor signals and at least one offset; an inversion of sensor signals by inverting an image created by the sensor signals; a formation of a difference image between an image created by the sensor signals at different times; a background correction; a decomposition into color channels; a decomposition into hue; saturation; and brightness channels; a frequency decomposition; a singular value decomposition; applying a Canny edge detector; applying a Laplacian of Gaussian filter; applying a Difference of Gaussian filter; applying a Sobel operator; applying a Laplace operator; applying a Scharr operator; applying a Prewitt operator; applying a Roberts operator; applying a Kirsch operator; applying a high-pass filter; applying a blob analysis; applying an edge filter; applying a low-pass filter; applying a Fourier transformation; applying a Radon-transformation; applying a Hough-transformation; applying a wavelet-transformation; a thresholding; creating a binary image. The region of interest may be determined manually by a user or may be determined automatically, such as by recognizing an object within an image generated by the optical sensors.

If the selected reflection feature 129 is matched to a corresponding reference feature, the corresponding light beams are matched and the distance of the object 112 can be calculated. For a selected reflection feature 129 and a corresponding reflection light beam, the number of corresponding illumination light beams, and thus the number of corresponding reference features 112, is reduced after determining a combined signal Q.

The evaluation device 128 is configured for determining at least one longitudinal region 130 of the selected reflection feature 129 of the reflection image by evaluating the combined signal Q from the sensor signals. The evaluation device 128 may be adapted to determine at least one longitudinal coordinate z of the selected reflection feature 129 by evaluating the combined signal Q, wherein the longitudinal region is given by the longitudinal coordinate z and an error interval ±ε. Error ε may depend on measurement uncertainty of the optical sensor. For example, the error interval may be ±10%, preferably ±5%, more preferably ±1%. The evaluation device 128 may be configured for deriving the combined signal Q by one or more of dividing the sensor signals, dividing multiples of the sensor signals, dividing linear combinations of the sensor signals. The evaluation device 128 may be configured for using at least one predetermined relationship between the combined signal Q and the longitudinal region for determining the longitudinal region. For example, the evaluation device 128 may be configured for deriving the combined signal Q by $$Q(z_O) = \frac{\int\int_{A_1} E(x, y; z_O) dx dy}{\int\int_{A_2} E(x, y; z_O) dx dy}$$

wherein x and y are transversal coordinates, A1 and A2 are different areas of at least one beam profile of the reflection light beam at the sensor position, and $E(x,y,z_o)$ denotes the beam profile given at the object distance $z_o$. Area A1 and area A2 may differ. In particular, A1 and A2 are not congruent. Thus, A1 and A2 may differ in one or more of the shape or content. The beam profile may be a transverse intensity profile of the light beam. The beam profile may be a cross section of the light beam. The beam profile may be selected from the group consisting of a trapezoid beam profile; a triangle beam profile; a conical beam profile and a linear combination of Gaussian beam profiles. Generally the beam profile is dependent on luminance $L(z_o)$ and beam shape $S(x,y;z_o)$, $E(x,y;z_o)=L\cdot S$. Thus, by deriving the combined signal it may allow determining the longitudinal coordinate independent from luminance. In addition, using the combined signal allows determination of the distance $z_o$ independent from the object size. Thus, the combined signal allows determination of the distance $z_o$ independent from the material properties and/or reflective properties and/or scattering properties of the object and independent from alterations of the light source such as by manufacturing precision, heat, water, dirt, damages on the lens, or the like.

Each of the sensor signals may comprise at least one information of at least one area of the beam profile of the light beam. The light-sensitive areas 122 may be arranged such that a first sensor signal comprises information of a first area of the beam profile and a second sensor signal comprises information of a second area of the beam profile. The first area of the beam profile and second area of the beam profile may be one or both of adjacent or overlapping regions. The first area of the beam profile and the second area of the beam profile may be not congruent in area.

The evaluation device 128 may be configured to determine and/or to select the first area of the beam profile and the second area of the beam profile. The first area of the beam profile may comprise essentially edge information of the beam profile and the second area of the beam profile may comprise essentially center information of the beam profile. The beam profile may have a center, i.e. a maximum value of the beam profile and/or a center point of a plateau of the beam profile and/or a geometrical center of the light spot, and falling edges extending from the center. The second region may comprise inner regions of the cross section and the first region may comprise outer regions of the cross section. Preferably, the center information has a proportion of edge information of less than 10%, more preferably of less than 5%, most preferably the center information comprises no edge content. The edge information may comprise information of the whole beam profile, in particular from center and edge regions. The edge information may have a proportion of center information of less than 10%, preferably of less than 5%, more preferably the edge information comprises no center content. At least one area of the beam profile may be determined and/or selected as second area of the beam profile if it is close or around the center and comprises essentially center information. At least one area of the beam profile may be determined and/or selected as first area of the beam profile if it comprises at least parts of the falling edges of the cross section. For example, the whole area of the cross section may be determined as first region. The first area of the beam profile may be area A2 and the second area of the beam profile may be area A1. Similarly, the center signal and edge signal may also be determined by using segments of the beam profile such as circular segments of the beam profile. For example, the beam profile may be divided into two segments by a secant or a chord that does not pass the center of the beam profile. Thus, one segment will essentially contain edge information, while the other segment will contain essentially center information. For example, to further reduce the amount of edge information in the center signal, the edge signal may further be subtracted from the center signal.

The edge information may comprise information relating to a number of photons in the first area of the beam profile and the center information may comprise information relating to a number of photons in the second area of the beam profile. The evaluation device 128 may be adapted for determining an area integral of the beam profile. The evaluation device 128 may be adapted to determine the edge information by integrating and/or summing of the first area. The evaluation device 128 may be adapted to determine the center information by integrating and/or summing of the second area. For example, the beam profile may be a trapezoid beam profile and the evaluation device may be adapted to determine an integral of the trapezoid. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

Additionally or alternatively, the evaluation device 128 may be adapted to determine one or both of center information or edge information from at least one slice or cut of the light spot. This may be realized, for example, by replacing the area integrals in the combined signal Q by a line integral along the slice or cut. For improved accuracy, several slices or cuts through the light spot may be used and averaged. In case of an elliptical spot profile, averaging over several slices or cuts may result in improved distance information.

For example, the evaluation device 128 may be configured for evaluating the sensor signals, by a) determining at least one optical sensor 120 having the highest sensor signal and forming at least one center signal;
b) evaluating the sensor signals of the optical sensors 120 of the matrix 118 and forming at least one sum signal;
c) determining at least one combined signal by combining the center signal and the sum signal; and
d) determining the at least one longitudinal coordinate z of the selected feature by evaluating the combined signal.

For example, the center signal may be the signal of the at least one optical sensor 118 having the highest sensor signal out of the plurality of sensor signals generated by the optical sensors 120 of the entire matrix 118 or of a region of interest within the matrix 118, wherein the region of interest may be predetermined or determinable within an image generated by the optical sensors of the matrix 118. The center signal may arise from a single optical sensor 120 or from a group of optical sensors 120, wherein, in the latter case, as an example, the sensor signals of the group of optical sensors 120 may be added up, integrated or averaged, in order to determine the center signal. The group of optical sensors 120 from which the center signal arises may be a group of neighboring optical sensors, such as optical sensors 120 having less than a predetermined distance from the actual optical sensor having the highest sensor signal, or may be a group of optical sensors generating sensor signals being within a predetermined range from the highest sensor signal. The group of optical sensors 120 from which the center signal arises may be chosen as large as possible in order to allow maximum dynamic range. The evaluation device 128 may be adapted to determine the center signal by integration of the plurality of sensor signals, for example the plurality of optical sensors around the optical sensor having the highest sensor signal.

The determination of the center signal may be performed electronically, since a comparison of sensor signals is fairly simply implemented by conventional electronics, or may be performed fully or partially by software. The detection of the center of the light spot, i.e. the detection of the center signal and/or of the at least one optical sensor from which the center signal arises, may be performed fully or partially electronically or fully or partially by using one or more software algorithms. Specifically, the evaluation device 128 may comprise at least one center detector for detecting the at least one highest sensor signal and/or for forming the center signal. The center detector specifically may fully or partially be embodied in software and/or may fully or partially be embodied in hardware. The center detector may fully or partially be integrated into the at least one sensor element and/or may fully or partially be embodied independently from the sensor element.

Specifically, the center signal may be selected from the group consisting of: the highest sensor signal; an average of a group of sensor signals being within a predetermined range of tolerance from the highest sensor signal; an average of sensor signals from a group of optical sensors containing the optical sensor 120 having the highest sensor signal and a predetermined group of neighboring optical sensors 120; a sum of sensor signals from a group of optical sensors 120 containing the optical sensor 120 having the highest sensor signal and a predetermined group of neighboring optical sensors 120; a sum of a group of sensor signals being within a predetermined range of tolerance from the highest sensor signal; an average of a group of sensor signals being above a predetermined threshold; a sum of a group of sensor signals being above a predetermined threshold; an integral of sensor signals from a group of optical sensors 120 containing the optical sensor 120 having the highest sensor signal and a predetermined group of neighboring optical sensors; an integral of a group of sensor signals being within a predetermined range of tolerance from the highest sensor signal; an integral of a group of sensor signals being above a predetermined threshold.

For example, the sum signal may be derived by adding up the sensor signals, integrating over the sensor signals or averaging over the sensor signals of the entire matrix 118 or of a region of interest within the matrix, wherein the region of interest may be predetermined or determinable within an image generated by the optical sensors 120 of the matrix 118. When adding up, integrating over or averaging over the sensor signals, the actual optical sensors 120 from which the sensor signal is generated may be left out of the adding, integration or averaging or, alternatively, may be included into the adding, integration or averaging. The evaluation device 128 may be adapted to determine the sum signal by integrating signals of the entire matrix 118, or of the region of interest within the matrix 118. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

The sum signal may be derived from all sensor signals of the matrix 118, from the sensor signals within a region of interest or from one of these possibilities with the sensor signals arising from the optical sensors 120 contributing to the center signal excluded. In every case, a reliable sum signal may be generated which may be compared with the center signal reliably, in order to determine the longitudinal coordinate. Generally, the sum signal may be selected from the group consisting of: an average over all sensor signals of the matrix 118; a sum of all sensor signals of the matrix 118; an integral of all sensor signals of the matrix 118; an average over all sensor signals of the matrix 118 except for sensor signals from those optical sensors 120 contributing to the center signal; a sum of all sensor signals of the matrix 118 except for sensor signals from those optical sensors 120 contributing to the center signal; an integral of all sensor signals of the matrix 118 except for sensor signals from those optical sensors 120 contributing to the center signal; a sum of sensor signals of optical sensors 120 within a predetermined range from the optical sensor having the highest sensor signal; an integral of sensor signals of optical sensors within a predetermined range from the optical sensor 120 having the highest sensor signal; a sum of sensor signals above a certain threshold of optical sensors being located within a predetermined range from the optical sensor 120 having the highest sensor signal; an integral of sensor signals above a certain threshold of optical sensors 120 being located within a predetermined range from the optical sensor 120 having the highest sensor signal. Other options, however, exist. The summing may be performed fully or partially in software and/or may be performed fully or partially in hardware. A summing is generally possible by purely electronic means which, typically, may easily be implemented into the detector. Thus, in the art of electronics, summing devices are generally known for summing two or more electrical signals, both analogue signals and digital signals. Thus, the evaluation device 128 may comprise at least one summing device for forming the sum signal. The summing device may fully or partially be integrated into the sensor element or may fully or partially be embodied independently from the sensor element. The summing device may fully or partially be embodied in one or both of hardware or software.

The combined signal may be a signal which is generated by combining the center signal and the sum signal. Specifically, the combination may include one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa. Additionally or alternatively, the combined signal may comprise an arbitrary signal or signal combination which contains at least one item of information on a comparison between the center signal and the sum signal. The evaluation device 128 may be configured to determine the at least one longitudinal coordinate z of the object by using at least one known, determinable or predetermined relationship between the sensor signals. In particular, the evaluation device 128 may be configured to determine the at least one coordinate z of the by using at least one known, determinable or predetermined relationship between a quotient signal derived from the sensor signals and the longitudinal coordinate.

The comparison between the center signal and the sum signal specifically may be performed by forming one or more quotient signals. Thus, generally, the combined signal may be a quotient signal Q, derived by one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa; forming a quotient of the center signal and a linear combination of the sum signal and the center signal or vice versa; forming a quotient of the sum signal and a linear combination of the sum signal and the center signal or vice versa; forming a quotient of an exponentiation of the center signal and an exponentiation of the sum signal or vice versa. Other options, however, exist. The evaluation device 128 may be configured for forming the one or more quotient signals. The evaluation device 128 may further be configured for determining the at least one longitudinal coordinate by evaluating the at least one quotient signal.

The evaluation device 128 specifically may be configured for using at least one predetermined relationship between the combined signal Q and the longitudinal coordinate, in order to determine the at least one longitudinal coordinate. Thus, due to the reasons disclosed above and due to the dependency of the properties of the light spot on the longitudinal coordinate, the combined signal Q typically is a monotonous function of the longitudinal coordinate of the object and/or of the size of the light spot such as the diameter or equivalent diameter of the light spot. Thus, as an example, specifically in case linear optical sensors are used, a simple quotient of the sensor signal $s_{center}$ and the sum signal $s_{sum}$ $Q=s_{center}/s_{sum}$ may be a monotonously decreasing function of the distance. Without wishing to be bound by this theory, it is believed that this is due to the fact that, in the preferred setup described above, both the center signal $s_{center}$ and the sum signal $s_{sum}$ decrease as a square function with increasing distance to the light source, since the amount of light reaching the detector decreases. Therein, however, the center signal $s_{center}$ decreases more rapidly than the sum signal $s_{sum}$, since, in the optical setup as used in the experiments, the light spot in the image plane grows and, thus, is spread over a larger area. The quotient of the center signal and the sum signal, thus, continuously decreases with increasing diameter of the light beam or diameter of the light spot on the light-sensitive areas of the optical sensors of the matrix. The quotient, further, is typically independent from the total power of the light beam, since the total power of the light beam forms a factor both in the center signal and in the sum sensor signal. Consequently, the combined signal Q may form a secondary signal which provides a unique and unambiguous relationship between the center signal and the sum signal and the size or diameter of the light beam. Since, on the other hand, the size or diameter of the light beam is dependent on a distance between the object, from which the light beam propagates towards the detector, and the detector itself, i.e. dependent on the longitudinal coordinate of the object, a unique and unambiguous relationship between the center signal and the sum signal on the one hand and the longitudinal coordinate on the other hand may exist. For the latter, reference e.g. may be made to one or more of the above-mentioned prior art documents, such as WO 2014/097181 A1. The predetermined relationship may be determined by analytical considerations, such as by assuming a linear combination of Gaussian light beams, by empirical measurements, such as measurements measuring the combined signal and/or the center signal and the sum signal or secondary signals derived thereof as a function of the longitudinal coordinate of the object, or both.

The evaluation device 128 may be configured for using at least one predetermined relationship between the combined signal and the longitudinal coordinate. The predetermined relationship may be one or more of an empiric relationship, a semi-empiric relationship and an analytically derived relationship. The evaluation device 128 may comprise at least one data storage device for storing the predetermined relationship, such as a lookup list or a lookup table.

The sensor element 116 may be adapted to determine at least one reflection pattern. The reflection pattern may comprise at least one feature corresponding to at least one feature of the illumination pattern. The reflection pattern may comprise, in comparison to the illumination pattern, at least one distorted pattern, wherein the distortion depends on the distance of the object, such as surface properties of the object. The evaluation device 128 may be adapted to select at least one feature of the reflection pattern and to determine the longitudinal region of the selected feature of the reflection pattern by evaluating the combined signal Q from the sensor signals, as described above.

The evaluation device 128 is adapted to determine at least one displacement region 132 in at least one reference image 134 corresponding to the longitudinal region 130. The longitudinal region corresponds to the displacement region 132. The reference image 134 and the reflection image 126 may be images of the object 112 determined at different spatial positions having a fixed distance b, also called baseline. The evaluation device 128 may be adapted to determine an epipolar line 136 in the reference image 134. Relative position of the reference image 134 and reflection image 126 may be known. For example, relative position of the reference image 134 and reflection image 126 may be stored within at least one storage unit of the evaluation device 128. The evaluation device 128 may be adapted to determine a straight line 138 extending from the selected reflection feature 129 of the reflection image 126. The straight line 138 may comprise possible object positions 114. The straight line 138 and the baseline b span an epipolar plane 140. As the reference image 134 is determined at a different relative position from the reflection image, the corresponding reference features may be imaged on the epipolar line 136 in the reference image 134.

For example, in the embodiment shown in FIG. 1, the reference image 134 may be an image of the illumination pattern at an image plane at a position of the illumination source 124. The evaluation device 128 may be adapted to determine the displacement region 132 in the reference image 134 corresponding to the longitudinal region 130 of the selected feature 129 of the reflection pattern. The evaluation device 128 may be adapted to match the selected feature 129 of the reflection pattern with at least one feature of the reference pattern within the displacement region 132. The illumination source 124 and the sensor element 116 may be separated by a fixed distance.

The displacement region 132 may extend along the epipolar line 136. The evaluation device 128 may be adapted to determine the reference feature along the epipolar line 136 corresponding to the longitudinal coordinate z and to determine an extent of the displacement region 132 along the epipolar line 136 corresponding to the error interval ±ε. The evaluation device 128 is adapted to match the selected reflection feature 129 with at least one reference feature within the displacement region 132. The evaluation device 128 may be adapted to match the selected feature of the reflection image with the reference feature within the displacement region 132 by using at least one evaluation algorithm considering the determined longitudinal coordinate z. The evaluation algorithm may be a linear scaling algorithm.

The evaluation device 128 may be adapted to determine a displacement of the matched reference feature and the selected reflection feature 129. The evaluation device 128 may be adapted to determine a longitudinal information of the matched feature using a predetermined relationship between a longitudinal coordinate and the displacement. For example, the longitudinal information may be a distance value. The evaluation device 128 may be adapted to determine the pre-determined relationship by using triangulation methods. In case position of the selected reflection feature 129 in the reflection image 126 and position of the matched reference feature and/or relative displacement of the selected reflection feature and the matched reference feature are known, a longitudinal coordinate of the corresponding object feature 114 may be determined by triangulation. Thus, the evaluation device 128 may be adapted to select, for example subsequent and/or column by column, a reflection feature and to determine for each potential position of the reference feature the corresponding distance value using triangulation. For example, FIG. 1 shows possible projection lines resulting in reflection features in the reflection image 126 and corresponding to reference features in the reference image 134. In addition, intersection points of these lines are shown corresponding to object positions. Displacement and corresponding distance value may be stored in at least one storage device of the evaluation device. The evaluation device 128 may, as an example, comprise at least one data processing device, such as at least one processor, at least one DSP, at least one FPGA and/or at least one ASIC. Further, for storing the at least one predetermined or determinable relationship between the longitudinal coordinate z and the displacement, the at least one data storage device may be provided, such as for providing one or more look-up tables for storing the predetermined relationship.

Figure 2:
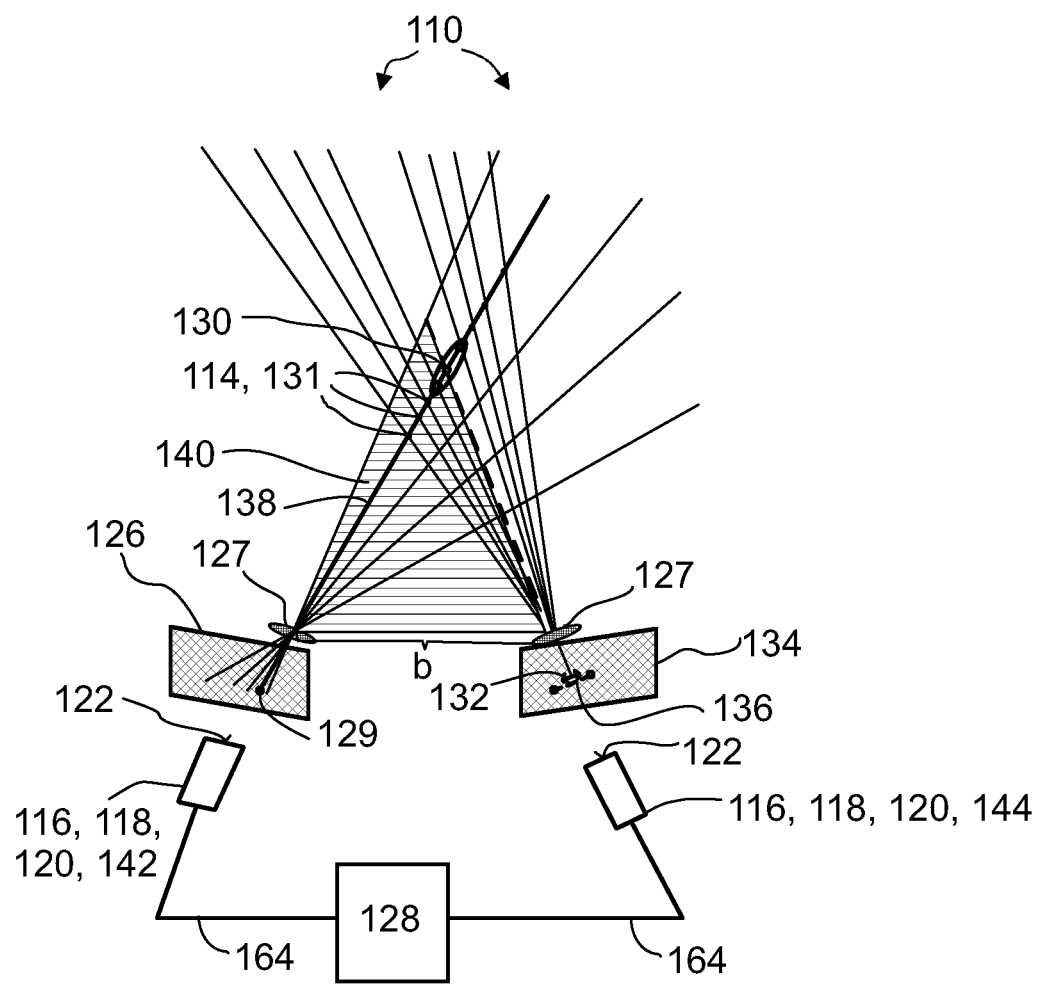
FIG. 2 shows a further embodiment of the detector according to the present invention.

In FIG. 2, an embodiment of the detector 110 is shown, wherein the detector 110 may comprise at least two sensor elements 116 each having a matrix 118 of optical sensors 120. At least one first sensor element 142 and at least one second sensor element 144 may be positioned at different spatial positions. A relative distance b between the first sensor element 142 and the second element 144 may be fixed. The at least one first sensor element 142 may be adapted to determine at least one first reflection pattern and the at least one second sensor element 144 may be adapted to determine at least one second reflection pattern. The evaluation device 128 may be adapted to select at least one image determined by the first sensor element 142 or the second sensor element 144 as reflection image and to select at least one image determined by the other one of the first sensor element 142 or the second sensor element 144 as reference image. In FIG. 2, the image of the first sensor element 142 is selected as reflection image 126, whereas the image of the second sensor element 144 is selected as reference image 134. The evaluation device 128 may be adapted to select the at least one reflection feature in the reflection pattern and to determine the longitudinal region 130 of the selected feature by evaluating the combined signal Q from the sensor signals, as outlined with respect to FIG. 1. The evaluation device 128 may be adapted to determine the displacement region 132 in the reference image 134 corresponding to the longitudinal region 120 of the selected feature 129 of the reflection pattern. The evaluation device 128 may be adapted to match the selected feature 129 of the reflection pattern with at least one feature of the reference pattern within the displacement region 132, as outlined with respect to FIG. 1.

Using the combined sensor signal allows to estimate distances, such as the longitudinal coordinate z within the error interval. By determining the displacement region 132 corresponding to the estimated longitudinal coordinate and the corresponding error interval allows to reduce possible number of solutions along the epipolar line 136 significantly. The number of solutions may even be reduced to one. Subsequent matching of the selected reflection feature and reference feature may enhance accuracy. Determining of the longitudinal coordinate z and the error interval may be performed during a pre-evaluation before matching the selected reflection feature 129 and reference feature. This may allow reducing the computational demand such that it is possible to significantly reduce costs and to allow a use in mobile device or outdoor devices, where battery life or ventilation or heat management is an issue. Furthermore, generally in triangulation systems the baseline has to be large in order to detect large distances. Pre-evaluation of the longitudinal coordinate z and error interval using the combined sensor signal and subsequent matching of the selected reflection feature 129 and reference feature may allow using short baselines such that it may be possible to provide a compact device. Furthermore, pre-evaluation of the longitudinal coordinate z and error interval using the combined sensor signal and subsequent matching of the selected reflection feature and reference feature may enhance accuracy in comparison the triangulation systems. Furthermore, it may be possible to use denser pattern in order to enhance further resolution or to use a less dens pattern in order to increase power per point.

Figure 3:
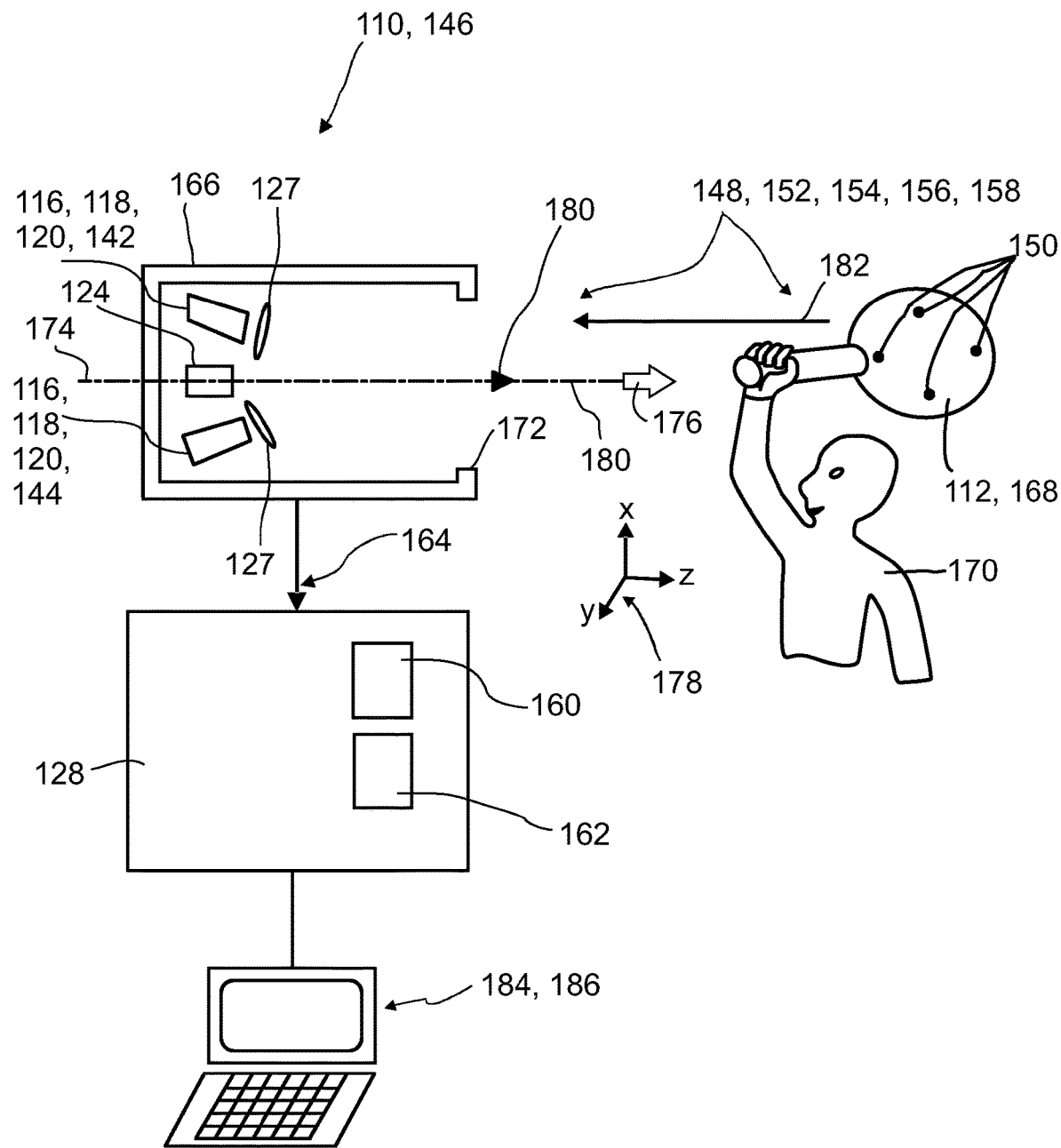
FIG. 3 shows an embodiment of a detector system, camera, entertainment device, tracking system.

FIG. 3 shows, in a highly schematic illustration, an exemplary embodiment of the detector 110, for example according to the embodiment shown in FIG. 2. The detector 110 specifically may be embodied as a camera 146 and/or may be part of a camera 146. The camera 146 may be made for imaging, specifically for 3D imaging, and may be made for acquiring standstill images and/or image sequences such as digital video clips. Other embodiments are feasible. FIG. 3 further shows an embodiment of a detector system 148, which, besides the at least one detector 110, comprises one or more beacon devices 150, which, in this example, may be attached and/or integrated into an object 112, the position of which shall be detected by using the detector 110. FIG. 3 further shows an exemplary embodiment of a human-machine interface 152, which comprises the at least one detector system 148 and, further, an entertainment device 154, which comprises the human-machine interface 152. The figure further shows an embodiment of a tracking system 156 for tracking a position of the object 112, which comprises the detector system 148. The components of the devices and systems shall be explained in further detail below.

FIG. 3 further shows an exemplary embodiment of a scanning system 158 for scanning a scenery comprising the object 112, such as for scanning the object 112 and/or for determining at least one position of the at least one object 112. The scanning system 158 comprises the at least one detector 110, and, further, optionally, the at least one illumination source 124 as well as, optionally, at least one further illumination source, not depicted here. The illumination source 124, generally, is configured to emit at least one illumination light beam, such as for illumination of at least one dot, e.g. a dot located on one or more of the positions of the beacon devices 150 and/or on a surface of the object 112. The scanning system 158 may be designed to generate a profile of the scenery including the object 112 and/or a profile of the object 112, and/or may be designed to generate at least one item of information about the distance between the at least one dot and the scanning system 158, specifically the detector 110, by using the at least one detector 110.

As outlined above, an exemplary embodiment of the detector 110 which may be used in the setup of FIG. 3 is shown in FIG. 2. Thus, the detector 110, besides the optical sensors 120 comprises at least one evaluation device 128, having e.g. at least one divider 160 and/or the at least one position evaluation device 162, as symbolically depicted in FIG. 3. The components of the evaluation device 128 may fully or partially be integrated into a distinct device and/or may fully or partially be integrated into other components of the detector 110. Besides the possibility of fully or partially combining two or more components, one or more of the optical sensors 120 and one or more of the components of the evaluation device 128 may be interconnected by one or more connectors 164 and/or by one or more interfaces, as symbolically depicted in FIG. 3. Further, the one or more connectors 164 may comprise one or more drivers and/or one or more devices for modifying or preprocessing sensor signals. Further, instead of using the at least one optional connector 164, the evaluation device 128 may fully or partially be integrated into one or both of the optical sensors 120 and/or into a housing 166 of the detector 110. Additionally or alternatively, the evaluation device 128 may fully or partially be designed as a separate device.

In this exemplary embodiment, the object 112, the position of which may be detected, may be designed as an article of sports equipment and/or may form a control element or a control device 168, the position of which may be manipulated by a user 170. As an example, the object 112 may be or may comprise a bat, a racket, a club or any other article of sports equipment and/or fake sports equipment. Other types of objects 112 are possible. Further, the user 170 himself or herself may be considered as the object 1112, the position of which shall be detected.

As outlined above, the detector 110 comprises optical sensors 120. The optical sensors 120 may be located inside the housing 166. Further, the detector 110 may comprise the at least one transfer device 127 such as one or more optical systems, preferably comprising one or more lenses. An opening 172 inside the housing 166, which, preferably, is located concentrically with regard to an optical axis 174 of the detector 110, preferably defines a direction of view 176 of the detector 110. A coordinate system 178 may be defined, in which a direction parallel or antiparallel to the optical axis 174 may be defined as a longitudinal direction, whereas directions perpendicular to the optical axis 174 may be defined as transversal directions. In the coordinate system 178, symbolically depicted in FIG. 3, a longitudinal direction is denoted by z, and transversal directions are denoted by x and y, respectively. Other types of coordinate systems are feasible, such as non-Cartesian coordinate systems.

One or more light beams 180, such as light beams of the illumination pattern, are propagating from the object 112 and/or from one or more of the beacon devices 150, towards the detector 110. The detector 110 is configured for determining a position of the at least one object 112. In case no illumination source 124 is used, the beacon devices 150 and/or at least one of these beacon devices 150 may be or may comprise active beacon devices with an integrated illumination source such as a light-emitting diode. Alternatively, ambient light sources may be used.

The light beam 180, for example generated by the illumination source 124 such as the at least one illumination pattern, may be directed towards the object by using one ore more optical elements. The object 112 may in response to the illumination generate the at least one reflection light beam 182. For details of the evaluation, reference may be made to FIG. 1 above.

As outlined above, the determination of the position of the object 112 and/or a part thereof by using the detector 110 may be used for providing a human-machine interface 152, in order to provide at least one item of information to a machine 184. In the embodiments schematically depicted in FIG. 3, the machine 184 may be a computer and/or may comprise a computer. Other embodiments are feasible. The evaluation device 128 may even be fully or partially integrated into the machine 184, such as into the computer.

As outlined above, FIG. 3 also depicts an example of a tracking system 156, configured for tracking the position of the at least one object 112 and/or of parts thereof. The tracking system 156 comprises the detector 110 and at least one track controller 186. The track controller 186 may be adapted to track a series of positions of the object 112 at specific points in time. The track controller 186 may be an independent device and/or may be fully or partially integrated into the machine 184, specifically the computer, as indicated in FIG. 3 and/or into the evaluation device 128.

Similarly, as outlined above, the human-machine interface 152 may form part of an entertainment device 154. The machine 184, specifically the computer, may also form part of the entertainment device 154. Thus, by means of the user 170 functioning as the object 112 and/or by means of the user 170 handling a control device functioning as the object 112, the user 170 may input at least one item of information, such as at least one control command, into the computer, thereby varying the entertainment functions, such as controlling the course of a computer.

Figure 4:
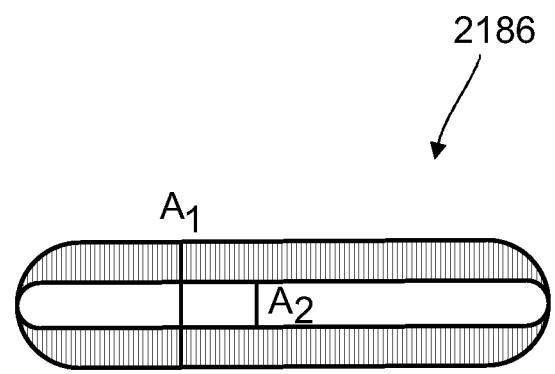
FIG. 4 shows an embodiment of determining a longitudinal coordinate z using a line pattern.

Referring to FIG. 4, the detector 110 such as the detector as described with respect to FIGS. 1 to 3 may be adapted to determine depth information, in particular absolute depth information, from a radiance ratio of at least two asymmetric regions of a light beam profile on the at least two optical sensors 120. For example, the detector 110 may comprise a plurality of optical sensors arranged in the matrix 118. The detector 110 may be adapted to determine depth information from a radiance ratio of at least two asymmetric regions within an enclosed, in particular, defocused beam profile captured by a single matrix of optical sensors such as a CMOS detector. In particular, the detector 110 may be adapted to determine the depth information using the radiance ratio independent of a certain object size range. As outlined above, this principle is called Distance by Photon Ratio (DPR). In one embodiment, the light beam 180 may illuminate the sensor element 116 with at least one pattern comprising at least one feature point. The feature point may be selected from the group consisting of: at least one point, at least one line, at least one edge. The pattern may be generated by the object, for example, in response to an illumination by the at least one light source with an illumination pattern comprising the at least one pattern. The evaluation device 128 may be configured for deriving the combined signal Q by $$Q(z_O) = \frac{\int\int_{A_1} E(x, y; z_O) dx dy}{\int\int_{A_2} E(x, y; z_O) dx dy}$$

wherein x and y are transversal coordinates, A1 and A2 are areas of the beam profile at the sensor position, and $E(x,y,z_O)$ denotes the beam profile given at the object distance $z_O$. A1 may correspond to a full or complete area of a feature point on the optical sensors. A2 may be a central area of the feature point on the optical sensors. The central area may be a constant value. The central area may be smaller compared to the full area of the feature point. For example, in case of a circular feature point, the central area may have a radius from 0.1 to 0.9 of a full radius of the feature point, preferably from 0.4 to 0.6 of the full radius.

In the embodiment shown in FIG. 4, the reflection light beam 182 propagating from the object 112 to the detector 110 may illuminate the matrix 118 with at least one line pattern 188. The line pattern 188 may be generated by the object 112 for example in response to an illumination by the at least one illumination source 124 with an illumination pattern comprising at least one illumination line pattern. A1 may correspond to an area with a full line width of the line pattern 188 in the matrix 118. The line pattern 188 in the matrix 118 may be widened and/or displaced compared to the line pattern of the illumination pattern such that a line width in the matrix 118 is increased. In particular, the line width of the line pattern 188 in the matrix 118 may change from one column to another column. A2 may be a central area of the line pattern 188 in the matrix 118. The line width of the central area may be a constant value, and may in particular correspond to the line width in the illumination pattern. The central area may have a smaller line width compared to the full line width. For example, the central area may have a line width from 0.1 to 0.9 of the full line width, preferably from 0.4 to 0.6 of the full line width. The line pattern 188 may be segmented in the matrix 118. Each of the columns may comprise center information of intensity in the central area of the line pattern 188 and edge information of intensity from regions extending further outwards from the central area to edge regions of the line pattern 188.

Figure 5A:
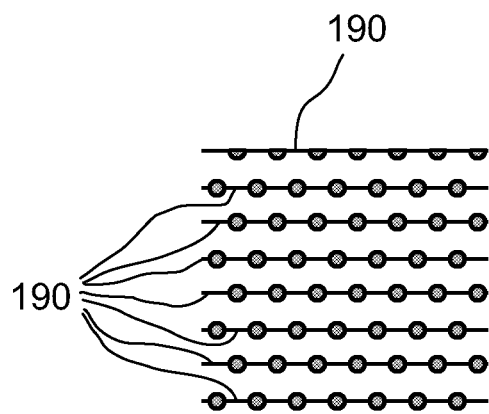
FIGS. 5A to C show three embodiments of a hexagonal illumination pattern.
Figure 5B:
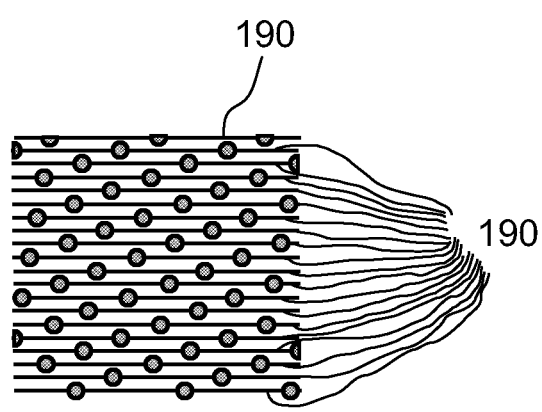
Figure 5C:
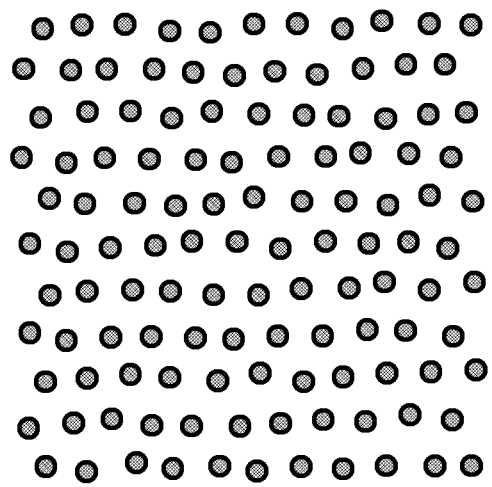

FIGS. 5A to C show three embodiments of a hexagonal illumination pattern. The illumination source 124 may be adapted to generate at least one illumination pattern for illuminating the object 112. Additionally or alternatively, the illumination pattern may be generated by at least one ambient light source. Specifically, the illumination source 124 may comprise at least one laser and/or laser source. Various types of lasers may be employed, such as semiconductor lasers. Additionally or alternatively, non-laser light sources may be used, such as LEDs and/or light bulbs. The illumination pattern may comprise at least one feature such as a point or symbol. The illumination pattern may comprise a plurality of features. The illumination pattern may comprise an arrangement of periodic or non-periodic features. The illumination pattern may be generated by ambient light, such as by at least one ambient light source, or by the at least one illumination source. The illumination pattern may comprise at least one pattern selected from the group consisting of: at least one point pattern, in particular a pseudo-random point pattern, a random point pattern or a quasi random pattern; at least one Sobol pattern; at least one quasiperiodic pattern; at least one pattern comprising at least one preknown feature; at least one regular pattern; at least one triangular pattern; at least one hexagonal pattern; at least one rectangular pattern at least one pattern comprising convex uniform tilings; at least one line pattern comprising at least one line; at least one line pattern comprising at least two lines such as parallel or crossing lines. For example, the illumination source may be adapted to generate and/or to project a cloud of points. The illumination pattern may comprise regular and/or constant and/or periodic pattern such as a triangular pattern, a rectangular pattern, a hexagonal pattern, or a pattern comprising further convex tilings. The illumination pattern may comprise as much as possible features per area such that hexagonal pattern may be preferred. A distance between two features of the illumination pattern and/or an area of the at least one illumination feature may depend on the circle of confusion in the image.

Figure 6:
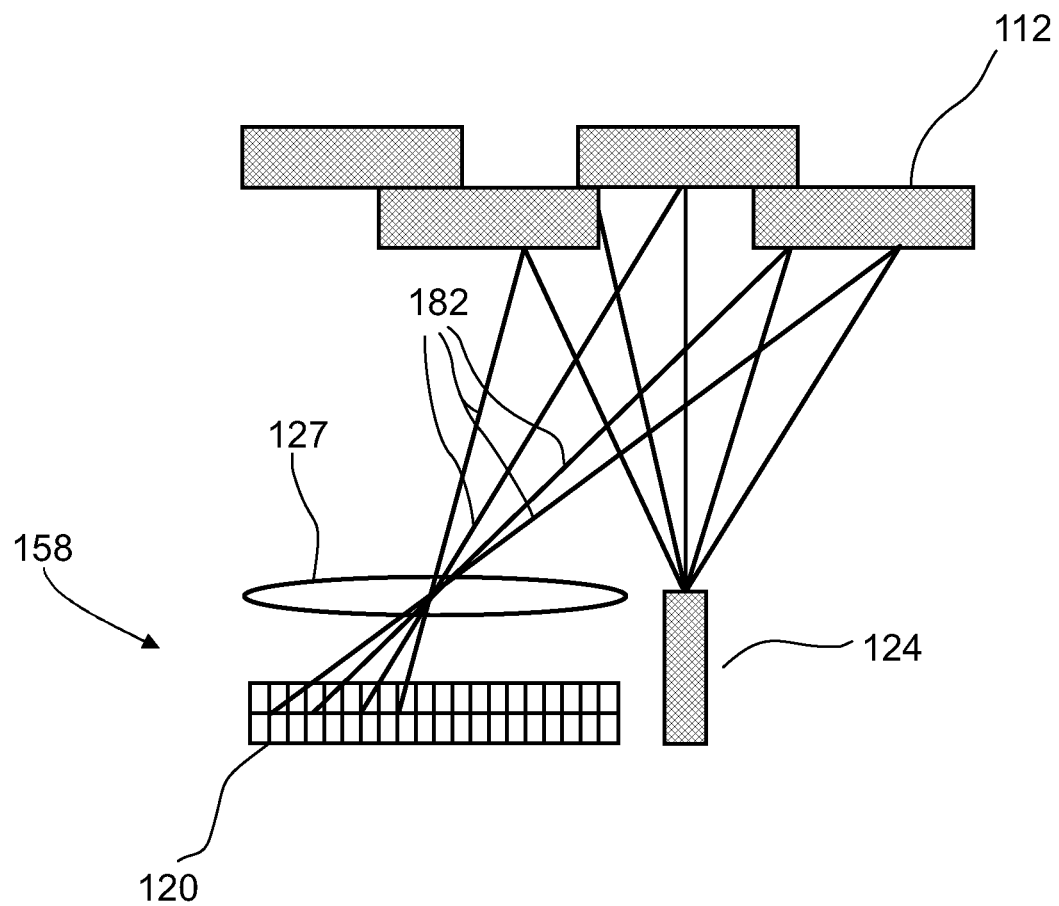
FIG. 6 shows an embodiment of a scanning system.

The illumination features of the illumination pattern may be arranged such that only few reference features are positioned on an epipolar line. As shown in FIG. 5A, the illumination pattern may comprise at least one hexagonal pattern, wherein the individual points are positioned on epipolar lines 190. As shown in FIG. 5B, the illumination pattern may comprise at least one hexagonal pattern, wherein the pattern is rotated relative to the baseline. Such a positioning of the illumination features allows enhancing distance between the individual points on each epipolar line. For example as shown in FIG. 5C, the illumination pattern may comprise at least one displaced hexagonal pattern, wherein individual points of the hexagonal pattern are displaced by a random distance from the regular position, for example orthogonal to the epipolar line of the point. The displacement of the individual points may be smaller than half of the distance between two parallel epipolar lines, preferably smaller than one fourth of the distance between two parallel epipolar lines. The displacement of the individual points may be as such that two points are not displaced above each other FIG. 6 shows an embodiment of a scanning system 158. The scanning system 158 may be adapted as a line scanning device. In particular, the scanning system 158 may comprise at least one sensor line or row of optical sensors 120. Furthermore, the scanning system 158 may comprise the at least one transfer device 127 and the at least one illumination source 124. Triangulation systems require a sufficient baseline, however due to the baseline in the near filed no detection may be possible. Near field detection may be possible if the light spot is tilted in direction of the transfer device. However, the tilting leads to that the light spot will move out of the field of view which limits detection in far field regions. Thus, in triangulation systems, the non-zero baseline will always lead to a substantial reduction in the measurement range, in the near field, and/or in the far field. Reducing the baseline as possible with the detector according to the present invention will thus always increase the measurement range. Further, these near field and far field problems can be overcome by using the scanning system 158 of FIG. 6. The scanning system 158 may be adapted to detect a plurality of light beams 182 propagating from the object 112 to the scanning system 158 on the CMOS line. The light beams 182 may be generated at different position on the object 112 or by movement of the object 112. The scanning system 158 may be adapted to determine at least one longitudinal coordinate for each of the light points by determining the combined signal Q as described above.

LIST OF REFERENCE NUMBERS

110 Detector
112 Object
114 object positions
116 sensor element
118 Matrix
120 optical sensor
122 light sensitive area
124 illumination source
126 reflection image
127 transfer device
128 evaluation device
129 selected reflection feature
130 longitudinal region
131 Crossing
132 displacement region
134 reference image
136 epipolar line
138 straight line
140 epipolar plane
142 first sensor element
144 second sensor element
146 Camera
148 detector system
150 beacon devices
152 human-machine-interface
154 entertainment device
156 tracking system
158 scanning system
160 Divider
162 position evaluation device
164 Connector
166 Housing
168 control device
170 User
172 Opening
174 optical axis
176 direction of view
178 coordinate system
182 reflection light beam
184 Machine 186 track controller
188 Line pattern
190 Epipolar line

CITED DOCUMENTS

US 2008/0240502 A1
US 2010/0118123 A1
WO 2012/110924 A1
WO 2014/097181 A1
WO 2014/198629 A1
R. A. Street (Ed.): Technology and Applications of Amorphous Silicon, Springer-Verlag Heidelberg, 2010, pp. 346-349 X. Jiang, H. Bunke: "Dreidimensionales Computersehen" Springer, Berlin Heidelberg, 1997, chapter 2

The invention claimed is:

1. A detector for determining a position of at least one object, the detector comprising
at least one sensor element having a matrix of optical sensors, the optical sensors each having a light-sensitive area, wherein each optical sensor is designed to generate at least one sensor signal in response to an illumination of its respective light-sensitive area by a reflection light beam propagating from the object to the detector, wherein the sensor element is adapted to determine at least one reflection image; and
at least one evaluation device, wherein the evaluation device is adapted to select at least one reflection feature of the reflection image, wherein the evaluation device is configured for determining at least one longitudinal region of the selected reflection feature of the reflection image by evaluating a combined signal Q from the sensor signals, wherein the evaluation device is adapted to determine at least one displacement region in at least one reference image corresponding to the longitudinal region, wherein the evaluation device is adapted to match the selected reflection feature with at least one reference feature within the displacement region.

2. The detector according to claim 1, wherein the evaluation device is adapted to determine a displacement of the matched reference feature and the selected reflection feature, wherein the evaluation device is adapted to determine a longitudinal information of the matched feature using a predetermined relationship between a longitudinal coordinate and the displacement.

3. The detector according to claim 1, wherein the evaluation device is configured for deriving the combined signal Q by one or more of dividing the sensor signals, dividing multiples of the sensor signals, dividing linear combinations of the sensor signals.

4. The detector according to claim 1, wherein the evaluation device is configured for using at least one predetermined relationship between the combined signal Q and the longitudinal region for determining the longitudinal region.

5. The detector according to claim 1, wherein the evaluation device is adapted to determine at least one longitudinal coordinate z of the selected reflection feature by evaluating the combined signal Q, wherein the longitudinal region (130) is given by the longitudinal coordinate z and an error interval ±ε.

6. The detector according to claim 1, wherein the reference image and the reflection image are images of the object determined at different spatial positions having a fixed distance, wherein the evaluation device is adapted to determine an epipolar line in the reference image.

7. The detector according claim 5, wherein the displacement region extends along the epipolar line, wherein the evaluation device is adapted to determine the reference feature along the epipolar line corresponding to the longitudinal coordinate z and to determine an extent of the displacement region along the epipolar line corresponding to the error interval ±ε.

8. The detector according to claim 7, wherein the evaluation device is configured to perform the following steps:
determining the displacement region for the image position of each reflection feature;
assigning an epipolar line to the displacement region of each reflection feature such as by assigning the epipolar line closest to a displacement region and/or within a displacement region and/or closest to a displacement region along a direction orthogonal to the epipolar line;
assigning and/or determining at least one reference feature to each reflection feature such as by assigning the reference feature closest to the assigned displacement region and/or within the assigned displacement region and/or closest to the assigned displacement region along the assigned epipolar line and/or within the assigned displacement region along the assigned epipolar line.

9. The detector according to claim 1, wherein the evaluation device is adapted to match the selected feature of the reflection image with the reference feature within the displacement region by using at least one evaluation algorithm considering the determined longitudinal coordinate z, wherein the evaluation algorithm is a linear scaling algorithm.

10. The detector according to claim 1, wherein the evaluation device is configured for deriving the combined signal Q by $$Q(z_O) = \frac{\int\int_{A_1} E(x, y; z_O)dxdy}{\int\int_{A_2} E(x, y; z_O)dxdy}$$

wherein x and y are transversal coordinates, A1 and A2 are different areas of at least one beam profile of the reflection light beam at the sensor position, and E(x,y, zo) denotes the beam profile given at the object distance $z_o$, wherein each of the sensor signals comprises at least one information of at least one area of the beam profile of the reflection light beam.

11. The detector according to claim 10, wherein the light-sensitive areas are arranged such that a first sensor signal comprises information of a first area of the beam profiles and a second sensor signal comprises information of a second area of the beam profile, wherein the first area of the beam profile and the second area of the beam profile are one or both of adjacent or overlapping regions.

12. The detector according to claim 11, wherein the evaluation device is configured to determine the first area of the beam profile and the second area of the beam profile, wherein the first area of the beam profile comprises essentially edge information of the beam profile and the second area of the beam profile comprises essentially center information of the beam profile, wherein the edge information comprises information relating to a number of photons in the first area of the beam profile and the center information comprises information relating to a number of photons in the second area of the beam profile.

13. The detector according to claim 1, wherein the at least one evaluation device is configured for evaluating the sensor signals, by
- determining at least one optical sensor having the highest sensor signal and forming at least one center signal;
- evaluating the sensor signals of the optical sensors of the matrix and forming at least one sum signal;
- determining at least one combined signal by combining the center signal and the sum signal; and
- determining the longitudinal region by evaluating the combined signal.

14. The detector according to claim 13, wherein the combined signal is a quotient signal Q, derived by one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa.

15. The detector according to claim 1, wherein the detector comprises at least one illumination source, wherein the illumination source is adapted to generate at least one illumination pattern for illumination of the object, wherein the illumination pattern comprises at least one pattern selected from the group consisting of: at least one point pattern, in particular a pseudo-random point pattern; at least one pattern comprising at least one pre-known feature.

16. The detector according to claim 15, wherein the sensor element is adapted to determine at least one reflection pattern, wherein the evaluation device is adapted to select at least one feature of the reflection pattern and to determine the longitudinal region of the selected feature of the reflection pattern by evaluating the combined signal Q from the sensor signals.

17. The detector according to claim 16, wherein the reference image is an image of the illumination pattern at an image plane at a position of the illumination source, wherein the evaluation device is adapted to determine the displacement region in the reference image corresponding to the longitudinal region of the selected feature of the reflection pattern, wherein the evaluation device is adapted to match the selected feature of the reflection pattern with at least one feature of the reference pattern within the displacement region.

18. The detector according to claim 1, wherein the detector comprises at least two sensor elements each having a matrix of optical sensors, where at least one first sensor element and at least one second sensor element are positioned at different spatial positions, wherein a relative distance between the first sensor element and the second element is fixed, wherein the at least one first sensor element is adapted to determine at least one first reflection pattern and the at least one second sensor element is adapted to determine at least one second reflection pattern, wherein the evaluation device is adapted to select at least one image determined by the first sensor element or the second sensor element as reflection image and to select at least one image determined by the other one of the first sensor element or the second sensor element as reference image.

19. A detector system for determining a position of at least one object, the detector system comprising at least one detector according to claim 1, the detector system further comprising at least one beacon device adapted to direct at least one light beam towards the detector, wherein the beacon device is at least one of attachable to the object, holdable by the object and integratable into the object.

20. A human-machine interface for exchanging at least one item of information between a user and a machine, wherein the human-machine interface comprises at least one detector system according to claim 19, wherein the at least one beacon device is adapted to be at least one of directly or indirectly attached to the user and held by the user, wherein the human-machine interface is designed to determine at least one position of the user by means of the detector system, wherein the human-machine interface is designed to assign to the position at least one item of information.

21. An entertainment device for carrying out at least one entertainment function, wherein the entertainment device comprises at least one human-machine interface according to claim 20, wherein the entertainment device is designed to enable at least one item of information to be input by a player by means of the human-machine interface, wherein the entertainment device is designed to vary the entertainment function in accordance with the information.

22. A tracking system for tracking a position of at least one movable object, the tracking system comprising at least one detector system according to claim 19, the tracking system further comprising at least one track controller, wherein the track controller is adapted to track a series of positions of the object at specific points in time.

23. A scanning system for determining a depth profile of a scenery, the scanning system comprising at least one detector according to claim 1, the scanning system further comprising at least one illumination source adapted to scan the scenery with at least one light beam.

24. A camera for imaging at least one object, the camera comprising at least one detector according to claim 1.

25. A method for determining a position of at least one object by using at least one detector according to claim 1, the method comprising the following steps:
- generating at least two sensor signals in response to an illumination of at least one sensor element having a matrix of optical sensors by at least one reflection light beam propagating from the object to the detector, the optical sensors each having a light-sensitive area;
- determining at least one reflection image by using the sensor element;
- selecting at least one reflection feature of the reflection image and evaluating the sensor signals by using at least one evaluation device, thereby, determining at least one longitudinal region of the selected reflection feature, wherein the evaluating comprises evaluating a combined signal Q from the sensor signals;
- determining at least one displacement region in at least one reference image corresponding to the longitudinal region;
- matching the selected reflection feature with at least one reference feature within the displacement region.

* * * * *